(12) United States Patent
Nashiki et al.

(10) Patent No.: US 8,803,376 B2
(45) Date of Patent: Aug. 12, 2014

(54) AC MOTOR AND CONTROL APPARATUS FOR THE SAME

(75) Inventors: Masayuki Nashiki, Komaki (JP); Tomokazu Ishikawa, Nagoya (JP)

(73) Assignee: Denso Corporation, Kariya (JP)

( * ) Notice: Subject to any disclaimer, the term of this patent is extended or adjusted under 35 U.S.C. 154(b) by 195 days.

(21) Appl. No.: 13/105,190

(22) Filed: May 11, 2011

(65) Prior Publication Data
US 2012/0091940 A1  Apr. 19, 2012

(30) Foreign Application Priority Data
May 11, 2010  (JP) ................................. 2010-109581

(51) Int. Cl.
*H02K 37/02* (2006.01)
*H02K 37/04* (2006.01)
*H02K 19/10* (2006.01)
*H02P 25/08* (2006.01)
*H02P 6/14* (2006.01)

(52) U.S. Cl.
CPC .............. *H02K 19/103* (2013.01); *H02P 25/08* (2013.01); *H02P 6/14* (2013.01); *H02K 37/02* (2013.01); *H02K 37/04* (2013.01)
USPC ...... 310/49.43; 310/12.18; 310/168; 310/216.075; 310/216.107; 310/208; 310/179; 310/185; 310/269; 318/701

(58) Field of Classification Search
CPC ..... H02K 37/02; H02K 19/103; H02K 37/04; H02P 6/14; H02P 25/08
USPC .......... 310/49.43, 156.55, 208, 216.008, 268, 310/12.18, 168, 179, 185, 216.075, 310/216.107, 269; 318/701

IPC ................................. H02K 37/00,37/02, 37/04
See application file for complete search history.

(56) References Cited

U.S. PATENT DOCUMENTS 3,476,996 A * 11/1969 Fredriksen .................... 318/696
4,134,054 A * 1/1979 Akamatsu ..................... 318/685
(Continued)

FOREIGN PATENT DOCUMENTS

JP         4041443       11/2007
JP      2009-273216      11/2009
(Continued)

OTHER PUBLICATIONS

Japanese Office Action dated May 29, 2012, issued in corresponding Japanese Application No. 2010-109581 with English translation.

*Primary Examiner* — John K Kim
(74) *Attorney, Agent, or Firm* — Nixon & Vanderhye P.C.

(57) ABSTRACT

An AC motor is provided. In the AC motor, there are M pieces (M is an integer of 3 or more) of stator pole groups SPG are arranged in a rotor axis direction, where each of the stator poles groups is composed of a plurality of stator poles which are for the same phase and arranged in a circumferential direction of the motor. Between the stator pole groups SPG, "M−1" pieces of annular windings WR are arranged which allow one-way current to flow therethrough. The windings WR are arranged such that the directions of current passing therethrough are reversed in turn in the rotor axis direction. The stator pole groups SPG are excited to generate magnetic fluxes φG directed in a one way. The excited directions of the magnetic fluxes φG are reversed in turn in the rotor axis direction.

18 Claims, 28 Drawing Sheets

(56) References Cited

U.S. PATENT DOCUMENTS

| | | | |
|---|---|---|---|
| 5,485,046 A * | 1/1996 | Kaplan et al. | 310/166 |
| 5,719,452 A * | 2/1998 | Sugiura | 310/49.19 |
| 5,760,503 A * | 6/1998 | Tsuchida et al. | 310/49.19 |
| 6,014,001 A * | 1/2000 | Guinet | 318/701 |
| 6,897,595 B1 * | 5/2005 | Chiarenza | 310/216.043 |
| 7,105,974 B2 * | 9/2006 | Nashiki | 310/185 |
| 7,466,057 B2 | 12/2008 | Imai et al. | |
| 7,646,126 B2 * | 1/2010 | Trzynadlowski et al. | 310/168 |
| 7,816,822 B2 * | 10/2010 | Nashiki | 310/49.23 |
| 7,911,107 B2 * | 3/2011 | Nashiki | 310/208 |
| 8,120,215 B2 * | 2/2012 | Nashiki | 310/49.45 |
| 2002/0089303 A1 * | 7/2002 | Aiello et al. | 318/727 |
| 2005/0099082 A1 * | 5/2005 | Nashiki | 310/164 |
| 2008/0067880 A1 * | 3/2008 | Usui et al. | 310/49 R |
| 2009/0021089 A1 | 1/2009 | Nashiki | |
| 2012/0091940 A1 * | 4/2012 | Nashiki et al. | 318/701 |

FOREIGN PATENT DOCUMENTS

| | | |
|---|---|---|
| JP | 2010-119263 | 5/2010 |
| JP | 2010-268632 | 11/2010 |
| WO | WO 2006/123659 | 11/2006 |

\* cited by examiner

EA-EA

EB-EB

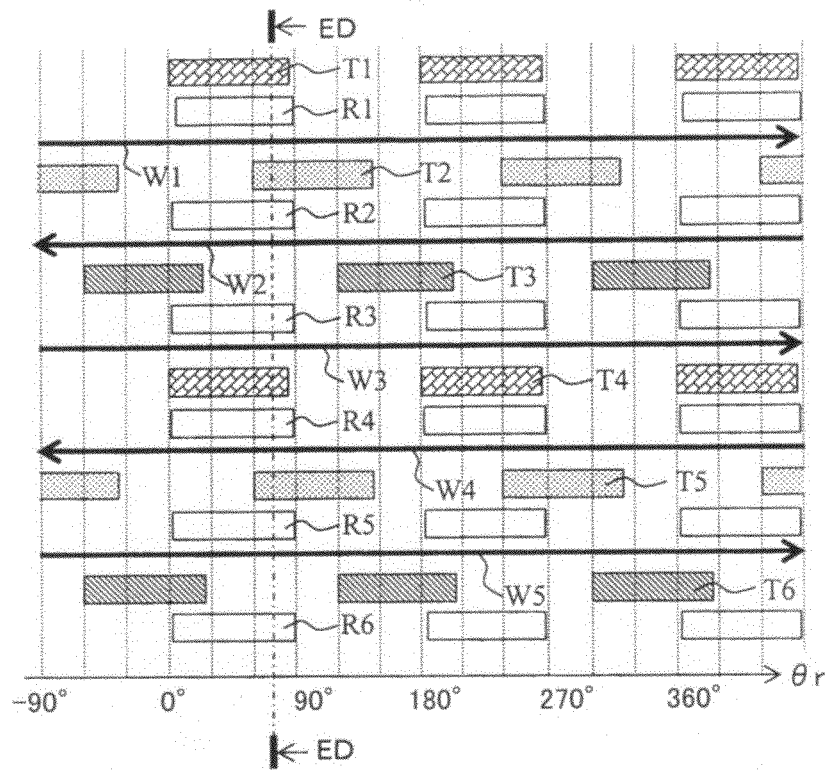
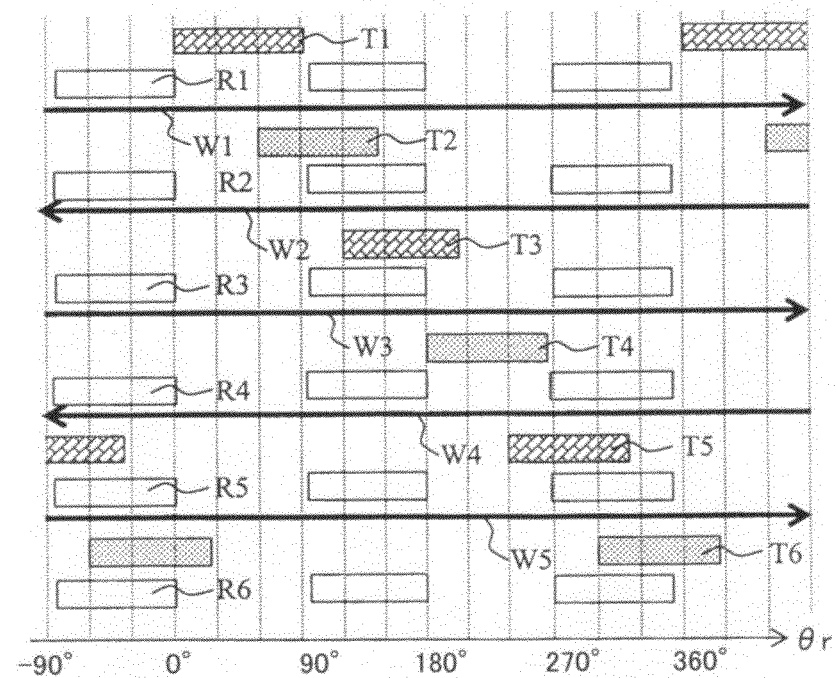

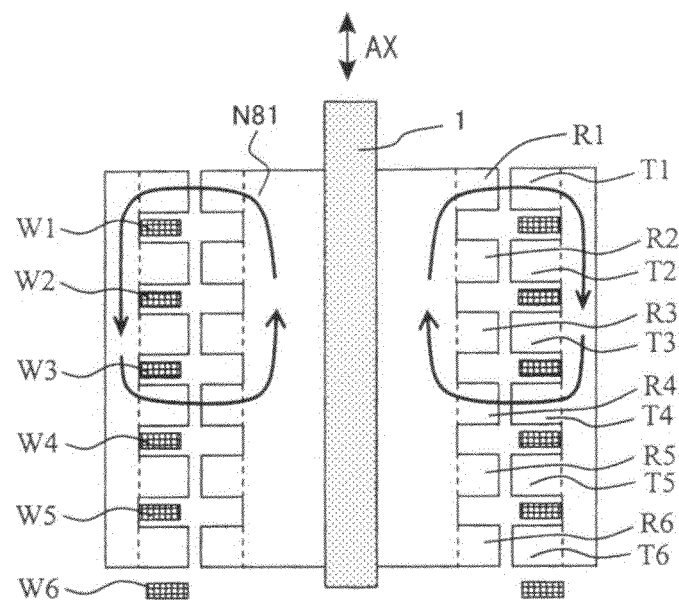
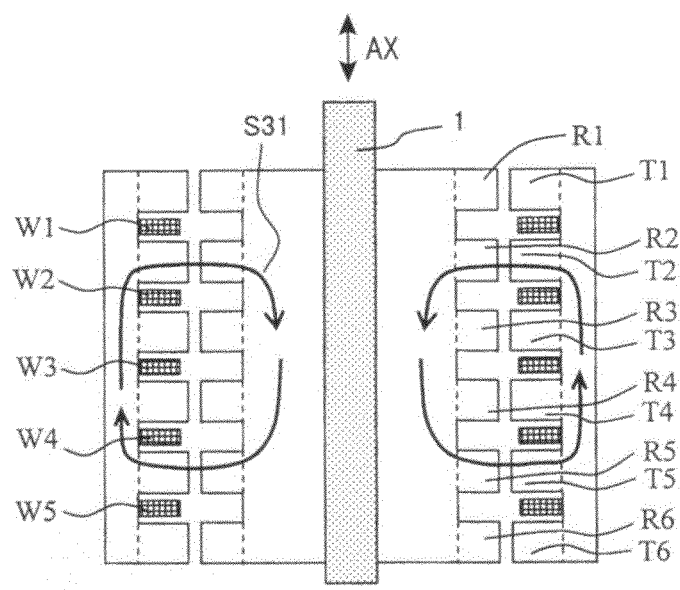

AC MOTOR AND CONTROL APPARATUS FOR THE SAME

CROSS-REFERENCE TO RELATED APPLICATION

This application is based on and claims the benefit of priority from earlier Japanese Patent Application No. 2010-109581 filed May 11, 2010, the description of which is incorporated herein by reference.

BACKGROUND OF THE INVENTION

1. Technical Field

The present invention relates to an AC (alternating current) motor mounted on automobiles, trucks, and others and a control apparatus for the AC motor, and in particular to, an AC motor known as a reluctance motor and a control apparatus for the control apparatus.

2. Related Art

Conventionally, as exemplified in a patent reference 1: Japanese Patent Laid-open publication 2009-273216, three-phase AC motors are widely used. Additionally, in a patent reference 2: Japanese Patent No. 40414343, there is shown an AC motor driven on multi-phase AC currents and produced to have ring-shape windings.

FIG. 43 shows an example from the patent reference 1, which shows a longitudinal section outlining the configuration of a three-phase AC motor. This three-phase AC motor is provided with a stator ST and a rotor RT. The rotor RT has a motor output shaft 431, a rotor core 432, and N-pole permanent magnets 437 and S-pole permanent magnets 438 which are attached on a rotor surface. The motor output shaft 431 is rotatably supported by bearings 433 of the stator ST. The stator ST has a motor case 436 and a stator core 434 with windings. A reference 435 shows coil ends of the windings.

FIG. 44 is a cross section laterally cut along a section AA-AA in FIG. 43. The motor is a motor of AC three-phase, bipoles and 6-slot type. The windings are wound in a full-pitch and concentrated winding manner. The stator has teeth 441, 442, 443, 444, 445 and 446 arranged in a circumferential direction CR.

Respective slots, each being between mutually adjacent teeth, allow three-phase windings to be wound therethrough, in which a U-phase winding is wound to be routed as shown by a winding from a reference 447 to a reference 44A, a V-phase winding is wound to be routed as shown by a winding from a reference 449 to a reference 44C, and a W-phase winding is wound to be routed as shown by a winding from a reference 44B to a reference 448. The respective windings are wound at an electrical angle of 180 degrees.

Though FIGS. 43 and 44 exemplify bipolar motors, this type of motor is frequently used as multiple motors having four or more poles. In addition, through the examples show the concentrated winding with which the winding for each phase is wound through one slot, full-pitch winding motors commonly adopt a distributed winding manner with which the winding for each phase is distributed into two or more slots.

FIG. 45 shows a configuration for driving the foregoing three-phase AC motors with the use of a three-phase AC inverter. A reference 45E shows a U-phase winding to allow U-phase current Iu to pass therethrough. A reference 45F shows a V-phase winding to allow V-phase current Iv to pass therethrough. A reference 45G shows a W-phase winding to allow W-phase current Iw to pass therethrough. A reference 2E shows a DC voltage source which is composed of a battery, for instance, references 51, 452, 453, 454, 455 and 456 show power transistors, and references 457, 458, 459, 45A, 45B, 45C show diodes arranged parallely with the respective power transistors. The transistors can be a variety of power semiconductor devices including IGBTs and FETs.

FIG. 46 shows the configuration of a three-phase AC motor in which the permanent magnet type of rotor using the permanent magnets 437 and 438 shown in FIG. 44 is replaced by a reluctance rotor 461 using a soft magnetic member. A reference 463 indicates a space, thereby producing a larger magnetic resistance. This drives the reluctance motor to generate torque depending on a difference in degrees of the magnetic resistance.

A three-phase AC inverter shown in FIG. 45 is used to cause torque to be generated in the counterclockwise direction CCW. If the rotor currently presents a rotation position shown in FIG. 46, the inverter is used to make a positive current Iu pass though the U-phase windings 447 and 44A and make a negative current Iv pass through the V-phase windings 449 and 44C. When current passing through the W-phase windings 44B and 448 becomes zero, a magnetomotive force is generated in a direction shown by a dotted arrow 462.

A magnetomotive force generated in the direction passing through the teeth 441 and 444 of the stator, which are stator poles, becomes zero, because magnetomotive forces on the U-phase current Iu and the V-phase current Iv are canceled out due to their mutually opposite directions. Thus, in FIG. 46, magnetomotive forces are generated in directions from the teeth 445 and 446 to the teeth 442, 443 respectively, so that a magnetic flux 464 mainly passes from the tooth 445 to the 442. An attraction force generated between the teeth of the stator and the rotor 461 generates a torque in the counterclockwise direction CCW, which is shown by an arrow 465.

In synchronization with the rotation of the rotor 461, three-phase AC currents are supplied in turn to the respective phase windings to rotate the direction of the magnetomotive force 462. This enables the reluctance motor shown in FIG. 46 to rotate continuously.

The reluctance motor shown in FIG. 46 does not use permanent magnets which are expensive, allowing this motor to be produced at relatively less cost. However, the inverter shown in FIG. 45 needs 6 power transistors to drive one motor, resulting in a drawback of increasing production cost. It is thus desired to raise, as a set, competitiveness of the motor and the inverter in terms of their performances, sizes, and production cost.

The stators shown in FIGS. 44 and 46 employ the full pitch winding, thus making the motors larger in size owing to the coil end portions of the respective phase windings overlapped on one another.

Additionally the motor shown by the patent reference 2, which is driven by multi-phase AC currents, needs an inverter provided with which many power transistors, raising production cost thereof.

SUMMARY

In light of the foregoing situations, it is desired to lower the production cost of an overall AC motor provided with a control circuit and make the motor smaller in size and lighter in weight.

According to a first embodiment, there is provided an AC motor comprising: M pieces (M is an integer equal to or higher than 3) of stator pole groups SPG arranged in a rotor axial direction, each of the stator pole groups being composed of a plurality of stator poles for the same phase arranged in a circumferential direction; a back yoke mutually magnetically connects the stator pole groups; "M−1" pieces of annular slots SR each formed between two of the stator pole groups SPG; "M−1" pieces of annular windings WR arranged in the slots SR respectively and supplied with one-way currents; and current supply means for supplying the one-way currents to the windings WR, wherein directions of currents supplied through the windings ER are opposite to each other in turn in the rotor axial direction, and magnetic fluxes φG induced by the stator pole groups SPG are directed in one ways and the directions of the magnetic fluxes φG are opposite to each other in turn in the rotor axial direction.

According to the above configuration, the annular windings can be used to produce the motor, thus simplifying the motor structure. This facilitates the production of the motor and lowers the production cost. Further, since the annular windings are used, the motor has no coil ends. This is especially advantageous to producing thin types of motors, making such motors compact in size.

In addition, the windings can be driven by one-way currents, i.e., DC currents, thus resulting in a simplified drive circuit, thus leading to lower-cost and compact production of the motor.

Each of the stator poles is magnetically excited by two annular windings located mutually adjacently in the rotor axial direction AX. This means that each annular winding can be used in a shared manner to magnetically excite two stator poles located on both sides of each annular winding in the rotor axial direction AX. Sharing each annular winding makes it possible to use in a shared manner transistors which drive the windings. As a result, power supply paths from a power supply to the motor can be in parallel to each other, thus lowering a current capacity necessary for transistors of a drive circuit. As a result, the whole drive circuit can be made smaller in its current capacity, leading to lower production cost and more compact size.

According to a second embodiment, in the motor of the first embodiment, the number M of stator pole groups SPG is an even number which is 4 or more; the stator pole groups SPG are faced with rotor pole groups RPG via an air gap, each of the rotor pole groups having K pieces of rotor poles arranged in a range defined by an electrical angle of 360 degrees in the circumferential direction, the number K being an even number which is 2 or more; the windings WR include a winding electrically connected in series, but mutually oppositely in directions, to another winding arranged by M/2 pieces in the rotor axial direction; and the windings WR are supplied with the one-way currents.

In this configuration, a designated winding and another winding through which DC current passes, whose phase is opposite to current passing through the certain winding, are connected inversely in series. The number of transistors to drive the currents can be reduced, leading to a simplified and less-cost production.

According to a third embodiment, in the motor of the first embodiment, the number M of stator pole groups SPG is an even number which is 4 or more; and the stator pole groups SPG are faced with rotor pole groups RPG via an air gap, each of the rotor pole groups having K pieces of rotor poles arranged in a range defined by an electrical angle of 360 degrees in the circumferential direction, the number K being one.

This configuration can reduce the number of stator pole groups SPG down to small amounts, such as 4 groups. This will lead to a simplified and less-cost production of the motor. When the number of stator pole groups SPG is allowed to be larger, such as 6, 8, or 10 groups, stator pole groups are added in the rotor axial direction AX.

According to a fourth embodiment, in the motor of the first embodiment, the number M of stator pole groups SPG is an odd number which is 3 or more; and the stator pole groups SPG are faced with rotor pole groups RPG via an air gap, each of the rotor pole groups having K pieces of rotor poles arranged in a range defined by an electrical angle of 360 degrees in the circumferential direction, the number K being one.

According to this configuration, the stator pole groups can made smaller in number, which will lead to a simplified and less-cost production of the motor According to a fifth embodiment, in the motor of the second embodiment, the stator pole group among the stator pole groups, which is located at one end in the rotor axial direction, is divided into two stator pole groups SPGA and SPGB, the stator pole group SPGB being arranged at the other end in the rotor axial direction; and an annular winding WR is additionally arranged in a slot produced with the stator pole group SPGB.

In this configuration, the magnetomotive force being generated outside the motor in the rotor axial direction can be made zero.

According to a sixth embodiment, in the motor of the first embodiment, a permanent magnet is arranged between teeth of the stator pole groups, the teeth extending in the circumferential direction.

This configuration is advantageous in that magnetic fluxes passing through the teeth of the stator are biased inversely by the permanent magnets. It is thus possible to make it larger rotation change rates of magnetic fluxes passing through the stator teeth and interlinking with the windings, whereby torque being outputted can be raised.

According to a seventh embodiment, in the motor of the first embodiment, the stator pole groups SPG are faced with rotor pole groups RPG via an air gap, and a permanent magnet is arranged between salient poles of the rotor pole groups, the salient poles extending in the circumferential direction.

This configuration is advantageous in that magnetic fluxes passing through the salient poles of the rotor are biased inversely by the permanent magnets. It is thus possible to increase rotation change rates of magnetic fluxes passing through the rotor salient poles and interlinking with the windings, whereby torque being outputted can be raised.

According to an eighth embodiment, in the motor of the first embodiment, the M pieces of stator pole groups SPG include one stator pole group SPGC adjacent to another stator pole group SPGD in the motor axial direction, a permanent magnet being arranged been the two stator pole groups mutually adjacent.

This configuration is advantageous in that magnetic fluxes passing through the teeth of the stator are biased inversely by the permanent magnets. It is thus possible to increase rotation change rates of magnetic fluxes passing through the stator teeth and interlinking with the windings, whereby torque being outputted can be raised. Additionally leakage fluxes between teeth of the stator can be reduced, thus preventing torque being lowered.

According to a ninth embodiment, in the motor of the first embodiment, the stator pole groups SPG has teeth each having a permanent magnet.

This configuration makes it possible to improve a power factor of the motor because the permanent magnets are used for magnetic excitation in the motor. It is also possible to make the rotor using only a soft magnetic member, thus making the rotor more rigid, thus enabling the rotor to be rotated at higher speeds.

According to a tenth embodiment, in the motor of the first embodiment, the motor includes teeth ST2 provided at the stator pole groups SPG and formed to have permanent magnets; and teeth ST3 provided at the stator pole groups SPG so as to be arranged along a same circumference and formed to have no permanent magnets.

This configuration makes it possible to realize a motor whose characteristics are between a motor characteristic with higher efficiency, due to arrangement of permanent magnets, and a motor characteristic which is easy to obtain, due to a weakened field based on reluctance characteristics.

According to an eleventh embodiment, in the motor of the first embodiment, the motor has field windings WRF arranged parallel to the annular windings WR.

This configuration includes the field winding WRF, so that field magnetic energy can be circulated within the field winding. This improves a power factor, facilitates an increase and decrease in the currents flowing through the windings, and increases torque being generated at higher rotation speeds.

According to a twelfth embodiment, an AC motor apparatus includes an AC motor MM1 set forth in claim 1; an AC motor MM2 driven on DC currents, which is different from the AC motor Mm1; and power supply means ST that selectively supply voltage and current to the respective motors.

In this configuration in which there is a system to control plural motors driven by DC current, the shared drive circuit and the selectively operated power supply means ST can be used for controlling such motors. Thus the whole control circuit can be simplified in structure, which will lead to a lower-cost and more compact production of the system.

BRIEF DESCRIPTION OF THE DRAWINGS

In the accompanying drawings:

FIG. 9 is a linearly developed view showing a circumferential plane at which stator poles and rotor salient poles face with each other of the motor shown in FIG. 4;

FIG. 10 is a linearly developed view showing a circumferential plane at which stator poles and rotor salient poles face with each other of the motor shown in FIG. 4;

FIG. 11 is a longitudinal sectional view of the motor showing magnetic flux paths in FIG. 8;

FIG. 12 is a longitudinal sectional view of the motor showing magnetic flux paths in FIG. 9;

DETAILED DESCRIPTION OF PREFERRED EMBODIMENTS

Aspects for reducing the present invention will now be described in detail by the following embodiments.

Prior to description of AC motors according to the present invention, a motor shown in FIG. 1 will be described which has an electromagnetic characteristics which are similar to the other AC motors, though being different in structure therefrom.

Figure 1:
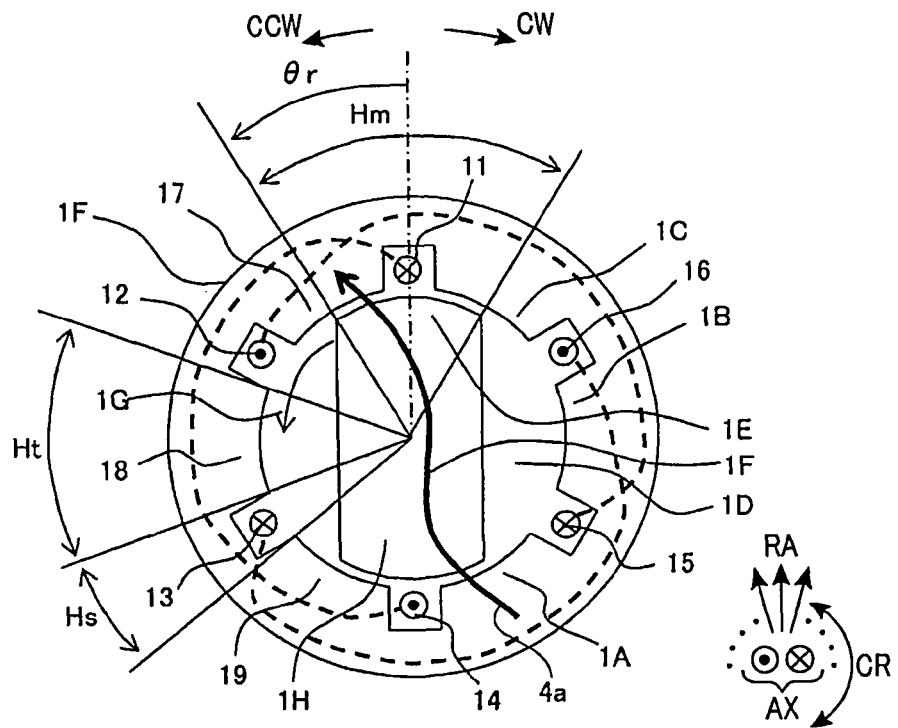
FIG. 1 is a view showing, together with an example of magnetic flux, a longitudinal section of a three-phase DC type of reluctance motor driven by one-way currents.

The AC motor shown in FIG. 1 is structured to have bipoles and full-pitch and concentrated windings through each of which a one-way current, that is, a DC (direct current) current is supplied for drive thereof. This AC motor has a stator ST and a rotor RT facing the stator ST with a gap therebetween. This AC motor has an axial direction AX defined as a direction along the rotary shaft of the rotor RT and a circumferential direction CR and a radial direction RA defined around the axial direction AX.

The stator RT has stator poles 17, 18, 19, 1A, 1B and 1C. These elements act electromagnetically on the rotor, so that these elements are called "stator poles", but actually structured as teeth.

There are provided slots each formed between stator salient poles and a winding is wound through each slot. References 11 and 14 show an A-phase winding and a winding path at a coil end portion of this winding is shown by a dashed line.

As shown by current symbols, control is performed such that a one-way current is supplied through each phase winding. In other words, the motor is controlled by DC currents, not AC currents. References 13 and 16 show a B-phase winding and a winding path at a coil end portion of this winding is shown by a dashed line. References 15 and 12 show a C-phase winding and a winding path at a coil end portion of this winding is shown by a dashed line. These windings are wound with a full pitch winding having an electrical angle of 180 degrees, and a concentrated winding which allows each winding to be wound in each slot in a concentrated manner.

References 1E and 1H show rotor poles which constitute salient poles made of soft magnetic materials. This rotor is provided as a bipolar rotor.

Incidentally, for the sake of a visually easier understanding of electromagnetic actions, the construction of FIG. 1 exemplifies the bipolar motor. Alternatively multiple pole motor configurations, such as 8-pole motors, can be used so that the motors can be made compact.

A rotor rotation position $\theta r$ can be defined as an angle from the positive winding center of the A-phase to the edge of the rotor pole in the counterclockwise direction CCW. The width of each stator pole in the circumferential direction CR is Ht, the width of each slot in the circumferential direction CR is Hs, and the width of each rotor salient pole in the circumferential direction CR is Hm, and sizes of these widths can be selected depending on characteristics desired for each motor.

The motor shown in FIG. 1 is a reluctance motor which generates torque by utilizing differences of magnetic resistance of the rotor depending on its directions. This motor is inexpensive in its production, thanks to not employing permanent magnets. The direction passing the salient poles 1E and 1H presents a smaller amount of magnetic resistance, while directions passing through spaces 1D presents larger amounts of magnetic resistance.

When it is required to generate torque in the counterclockwise direction CCW, as shown by an arrow 1G from the rotation position $\theta r$ shown in FIG. 1, currents are supplied through the A-phase windings 11 and 14 and the C-phase windings 15 and 12 as depicted by the current symbols. This will cause magnetic flux $\phi a$, shown by an arrow 1F, to be induced in a direction going from the stator pole 1A to the stator pole 17. As a result, between stator poles and the rotor salient poles, that is, between the poles 1A and 1H and between the poles 17 and 1E, an attraction force is generated, which leads to generation of torque shown by the arrow 1G in the CCW direction. As the rotation of the rotor advances, such an attraction force is generated at sequentially shifted positions in the circumferential direction, leading to continuous rotation torque. As will be described later, if permanent magnets are implemented in the motor shown in FIG. 1, the power factor can be improved, the torque can be increased, and the efficiency can be increased.

A circuit to drive the motor shown in FIG. 1 will now be described with reference to FIG. 2.

A reference 2E shows a DC voltage supply such as a battery. A reference 2C shows a capacitor which stores therein regenerated energy coming from the motor. The electric charge in the capacitor 2C is discharged as current Ig to a choke coil Ldcc in response to switching on a transistor 2A. Switching off the transistor 2A allows the current Ig to be supplied to the DC voltage supply 2E via a diode 2B so that the current Ig charges the DC voltage supply 2E. The charging energy of the capacitor 2C is transferred to the DC voltage supply 2E. The transistor 2A, the choke coil Ldcc, and the diode 2B are provided as, what is called, a DC-DC converter. A reference VL shows a common potential in the circuit shown in FIG. 2, a reference VM shows a potential corresponding to the output voltage of the DC voltage supply 2E, and a reference VH shows a charging potential of the capacitor 2C.

A reference 21 shows the A-phase winding 11, 14 shown in FIG. 1. By switching on a transistor 24, the voltage of the DC voltage supply 2E is applied to the A-phase winding 21 so as to supply a one-way current, that is, an A-phase current Ia, thereto. When the transistor 24 is switched off, the A-phase current Ia through the A-phase winding 21 charges the capacitor 2C via a diode 27. At this time, the magnetic energy owned by the A-phase winding 21 is regenerated into the capacitor 2C.

A reference 22 shows the B-phase winding 13, 16 shown in FIG. 1. By switching on a transistor 25, the voltage of the DC voltage supply 2E is applied to the B-phase winding 22 so as to supply a one-way current, that is, a B-phase current Ib, thereto. When the transistor 25 is switched off, the B-phase current Ib through the B-phase winding 22 charges the capacitor 2C via a diode 28.

A reference 23 shows the C-phase winding 15, 12 shown in FIG. 1. By switching on a transistor 26, the voltage of the DC voltage supply 2E is applied to the C-phase winding 23 so as to supply a one-way current, that is, a C-phase current Ic, thereto. When the transistor 26 is switched off, the C-phase current Ic through the C-phase winding 23 charges the capacitor 2C via a diode 29.

How the motor shown in FIG. 1 operates will now be described with reference to FIG. 3.

An example will be described in which the width Ht of each stator pole in the circumferential direction CR is 60 degrees and the width Hs of each slot in the circumferential direction CR is 20 degrees.

Figure 3:
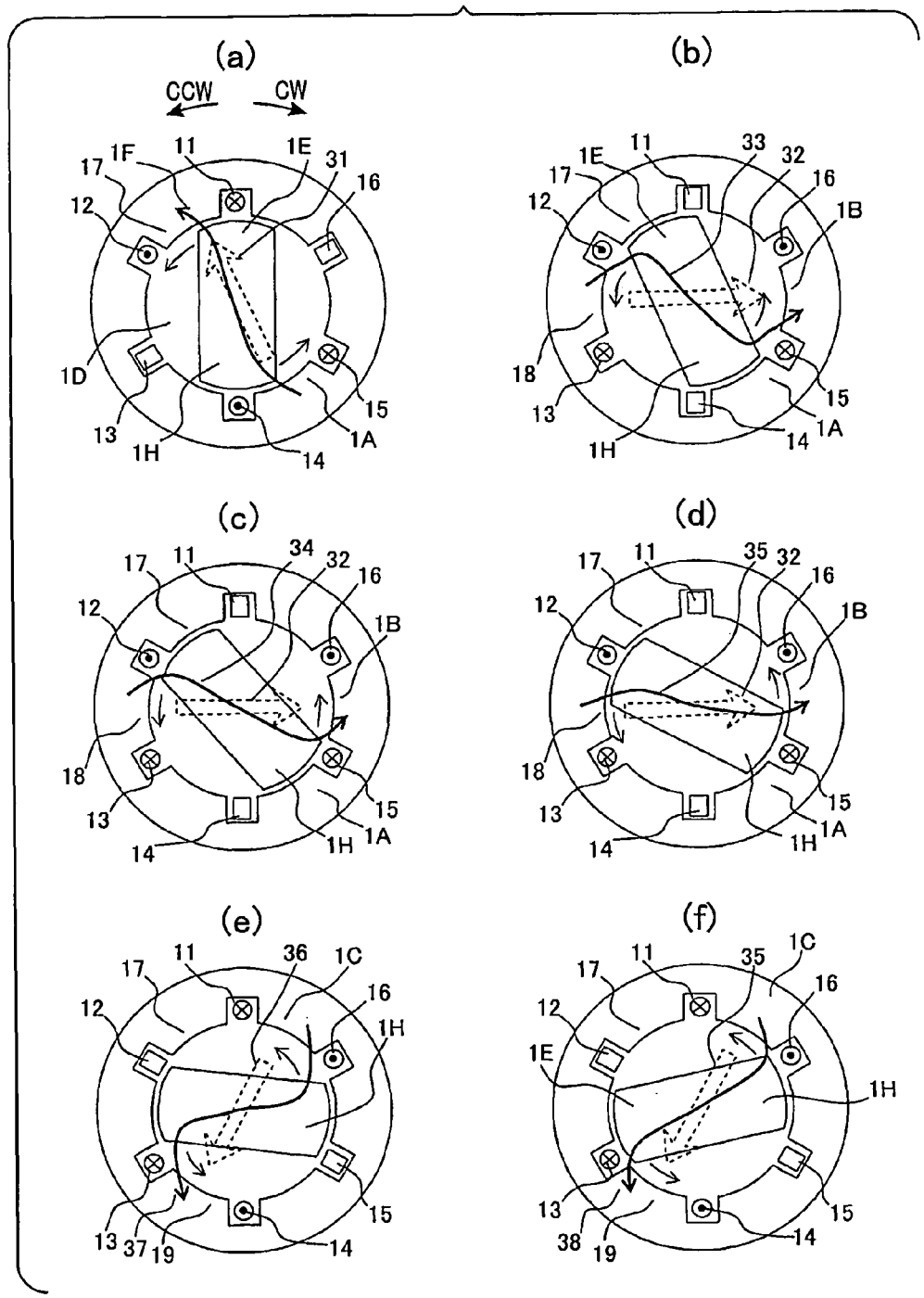
FIG. 3 is a view showing current for each phase of the motor and directions of magnetic flux and torque at each of rotation positions of the motor shown in FIG. 1.

In (a) of FIG. 3, the rotor rotation position θr is 30 degrees which is the same as that shown in FIG. 1. The A-phase current Ia is supplied to the A-phase winding 11, 14 and the C-phase current Ic is supplied to the C-phase winding 15, 12, as shown by the current symbols, in which those currents are equal in amplitude to each other. In response to this current supply, a magnetomotive force is generated in a direction shown by a dashed arrow 31, because a circuital integral of a magnetic field H in the direction becomes "Ia+Ic" according to Ampere's law. The magnetomotive force will induce a magnetic flux 1F, leading to an attraction force between the stator pole 1A and the rotor salient pole 1H and an attraction force between the stator pole 17 and the rotor salient pole 1E, leading to torque generated in the counterclockwise direction CCW.

The magnetic flux 1F makes a closed loop via the back York of the stator. In the direction orthogonal to the arrow 31, there is caused no magnetomotive force, as the circuital integral of the magnetic field H in the orthogonal direction according to Ampere's law is "Ia−Ic"=0.

Figure 46:
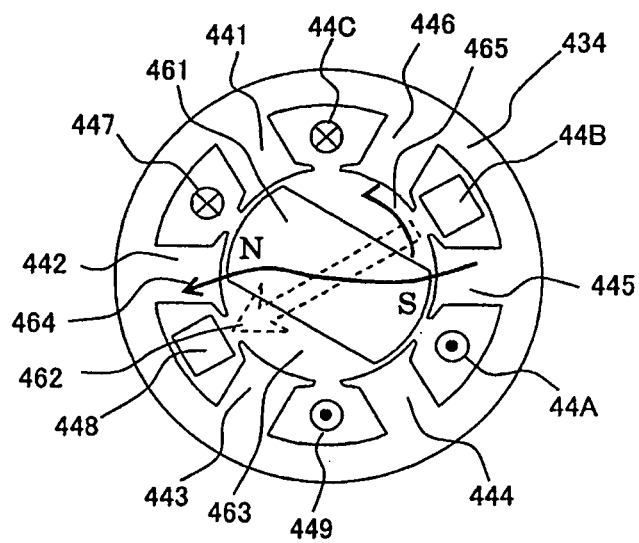
FIG. 46 is a lateral view showing a conventional three-phase reluctance motor.

Accordingly, in cases where the A-phase and C-phase currents Ia and Ic are equal in their amplitudes to each other and the B-phase current is zero, the magnetomotive force is selectively generated in the direction extending from the stator pole 1A to the stator pole 17, and there is no magnetomotive force generated in the directions passing the other stator poles. This characteristic is inherent to this embodiment, differently from the operations of the AC motors shown in FIGS. 44 and 46.

In (b) of FIG. 3, there is shown a rotor rotation position θr of 50 degrees. The B-phase current Ib is supplied to the B-phase winding 13, 16 and the C-phase current Ic is supplied to the C-phase winding 15, 12, as shown by the current symbols, in which those currents are equal in amplitude to each other. In response to this current supply, a magnetomotive force is generated in a direction shown by a dashed arrow 32, because a circuital integral of a magnetic field H in the direction becomes "Ib+Ic" according to Ampere's law. The magnetomotive force will induce a magnetic flux 33, leading to an attraction force between the stator pole 18 and the rotor salient pole 1E and an attraction force between the stator pole 1B and the rotor salient pole 1H, leading to torque generated in the counterclockwise direction CCW. In the direction orthogonal to the arrow 32, there is caused no magnetomotive force, as the circuital integral of the magnetic field H in the orthogonal direction according to Ampere's law is "Ib−Ic"=0.

In (c) of FIG. 3, there is shown a rotor rotation position θr of 70 degrees. In the same manner as that shown in (b) of FIG. 3, the B-phase current Ib is supplied to the B-phase winding 13, 16 and the C-phase current Ic is supplied to the C-phase winding 15, 12, as shown by the current symbols, in which those currents are equal in amplitude to each other. As s result, a magnetic flux 34 is induced, which causes an attraction force between the stator pole 18 and the rotor salient pole 1E and an attraction force between the stator pole 1B and the rotor salient pole 1H. This will generates torque in the counterclockwise direction CCW.

In (d) of FIG. 3, there is shown a rotor rotation position θr of 90 degrees. In the same manner as that shown in (c) of FIG. 3, the B-phase current Ib is supplied to the B-phase winding 13, 16 and the C-phase current Ic is supplied to the C-phase winding 15, 12, as shown by the current symbols, in which those currents are equal in amplitude to each other. As s result, a magnetic flux 35 is induced, which causes an attraction force between the stator pole 18 and the rotor salient pole 1E and an attraction force between the stator pole 1B and the rotor salient pole 1H. This will generates torque in the counterclockwise direction CCW.

In (e) of FIG. 3, there is shown a rotor rotation position θr of 110 degrees. The A-phase current Ia is supplied to the A-phase winding 11, 14 and the B-phase current Ib is supplied to the B-phase winding 13, 16, as shown by the current symbols, in which those currents are equal in amplitude to each other. In response to this current supply, a magnetomotive force is generated in a direction shown by a dashed arrow 36, because a circuital integral of a magnetic field H in this direction becomes "Ia+Ib" according to Ampere's law. The magnetomotive force will induce a magnetic flux 37, leading to an attraction force between the stator pole 1C and the rotor salient pole 1H and an attraction force between the stator pole 19 and the rotor salient pole 1E, leading to torque generated in the counterclockwise direction CCW. In the direction orthogonal to the arrow 36, there is caused no magnetomotive force, as the circuital integral of the magnetic field H in the orthogonal direction according to Ampere's law is "Ia−Ib"=0.

In (f) of FIG. 3, there is shown a rotor rotation position θr of 130 degrees. The A-phase current Ia is supplied to the A-phase winding 11, 14 and the B-phase current Ib is supplied to the B-phase winding 13, 16, as shown by the current symbols, in which those currents are equal in amplitude to each other. In response to this current supply, a magnetomotive force is generated in the direction shown by a dashed line 36, leading to induction of a magnetic flux 38. This will cause an attraction force between the stator pole 1C and the rotor salient pole 1H and an attraction force between the stator pole 19 and the rotor salient pole 1E. This generates torque in the counterclockwise direction CCW.

In the same manner as the above, the A-, B- and C-phase DC currents Ia, Ib and Ic are selectively supplied depending on the rotor rotation position θr, so that the rotor can be rotated. The attraction force can generate torque in both the counterclockwise and clockwise directions. Hence, the rotor can rotate in both directions, thus enabling power running and regeneration in each rotational direction.

The motor shown in FIGS. 1 and 3 can have various features which include: the magnetic flux passing through each stator pole is not induced alternately, but induced in a one-way; currents supplied to the respective phase windings are DC currents and are used in common for magnetically exciting two stator poles which are mutually adjacent with a slot therebetween; two windings subjected to current supply generates jointly the same interlinkage magnetic flux; and the total current capacity required for a drive circuit can be lowered. These features are different from the conventional AC current motor shown in FIGS. 44 and 46.

Figure 26:
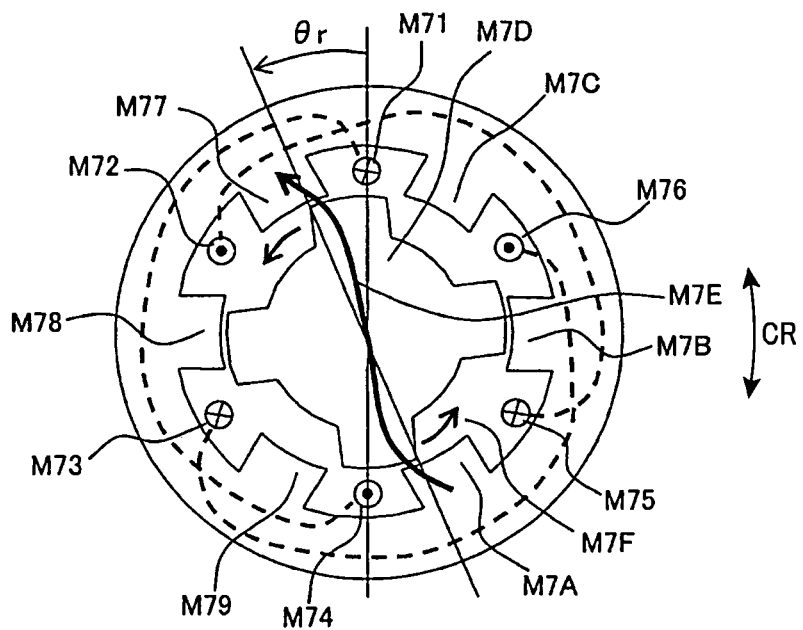
FIG. 26 is a lateral sectional view, together with an example of flow of magnetic flux, of a three-phase DC reluctance motor driven on one-way currents.

Incidentally techniques and structures of the motors shown in FIGS. 1 and 3 and FIG. 26 are known from Japanese Patent Laid-open Publication Nos. 2010-119263 and 2010-268632.

First Embodiment

Figure 4:
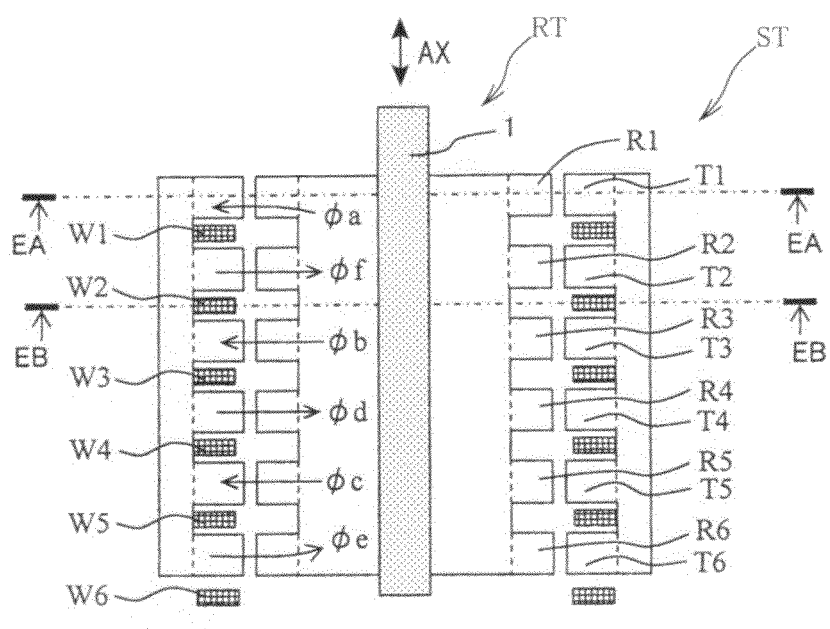
FIG. 4 is a view showing a longitudinal section of a motor having annular windings, which is according to the present invention.

Referring to FIG. 4, a first embodiment of the AC motor according to the present invention will now be described.

Figure 5:
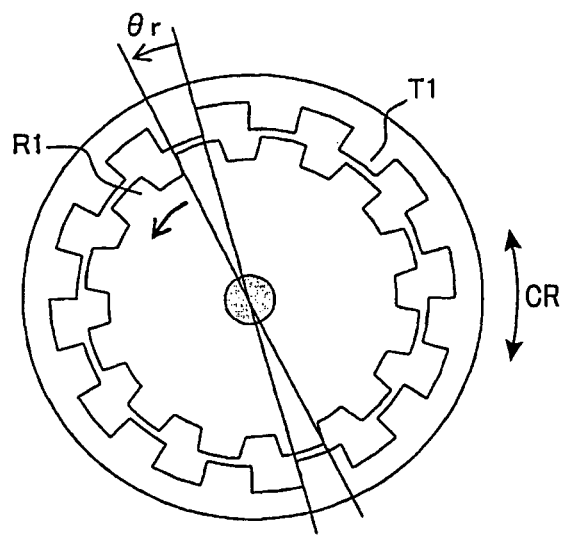
FIG. 5 exemplifies a lateral section passing stator pole groups in the motor shown in FIG. 4.

A reference 1 shows a rotor shaft, a reference R1 shows rotor salient poles for an A phase, a reference R2 shows rotor salient poles for a −C phase, a reference R3 shows rotor salient poles for a B phase, a reference R4 shows rotor salient poles for a −A phase, a reference R5 shows rotor salient poles for a C-phase, and a reference R6 shows rotor salient poles for −B phase. The rotor salient poles R1 have a shape of which section along a line EA-EA is shown by FIG. 5, and are exemplified as 12 poles in the circumferential direction CR.

A reference T1 shows stator salient poles for the A phase, a reference T2 shows stator salient poles for the −C phase, a reference T3 shows stator salient poles for the B phase, a reference T4 shows stator salient poles for the −A phase, a reference T5 shows stator salient poles for the C phase, and a reference T6 shows stator salient poles for the −B phase. The stator salient poles T1 have a shape of which section along a line EA-EA is shown by FIG. 5, and are exemplified as 12 poles in the circumferential direction CR.

Figure 6:
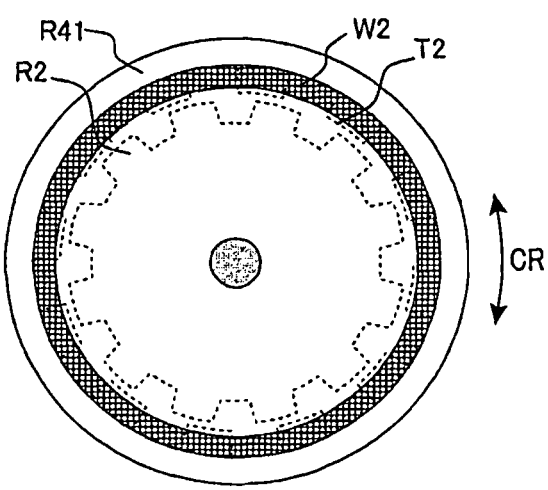
FIG. 6 exemplifies a lateral section passing stator pole groups in the motor shown in FIG. 4.
Figure 43:
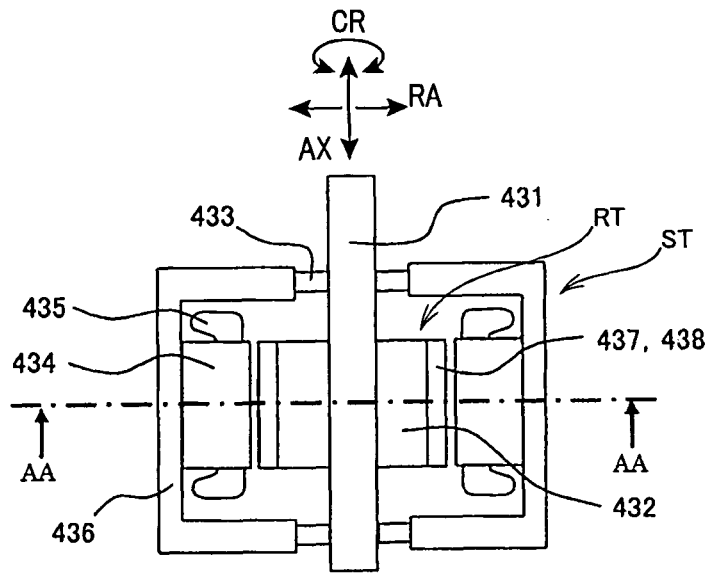
FIG. 43 is a longitudinal section of a conventional three-phase AC brushless motor.

Respective windings are composed of windings shown by references W1, W2, W3, W4, W5 and W6, from the top in FIG. 4, as shown therein. The winding W2 is wound to be annular, of which section along a lone EB-EB is shown in FIG. 6. The shape is very simple, so that, compared with the windings of the conventional motors shown in FIGS. 43, 44 and 46, the production can be easier, the space factor of the winding can be raised, and there are no coil ends. Thus, production cost can be reduced, and the motor can be made compact. The shapes shown by dashed lines in FIG. 6 show the stator salient poles T2 and the rotor salient poles R2 which are positioned behind the winding W2. These dashed lines are not along the section EB-EB, but depicted just for reference.

In addition, the winding W6 is arranged outside the magnetic circuit of the motor, that is, this winding is stayed aloft. Hence, the magnetic resistance of the magnetic circuit, which is a closed circuit, is larger, thus being less electromagnetic actions on the moor, thus less influence in generating torque even if being omitted. Thus the winding W6 is normally omitted from being arranged. Meanwhile, in some applications in which there a problem that iron adheres to both ends of the rotor shaft due to magnetomotive forces acting thereto, arrangement of the winding W6 is advantageous in that the magnetomotive forces can be canceled out to be zero in the axial direction AX of the rotor.

Figure 7:
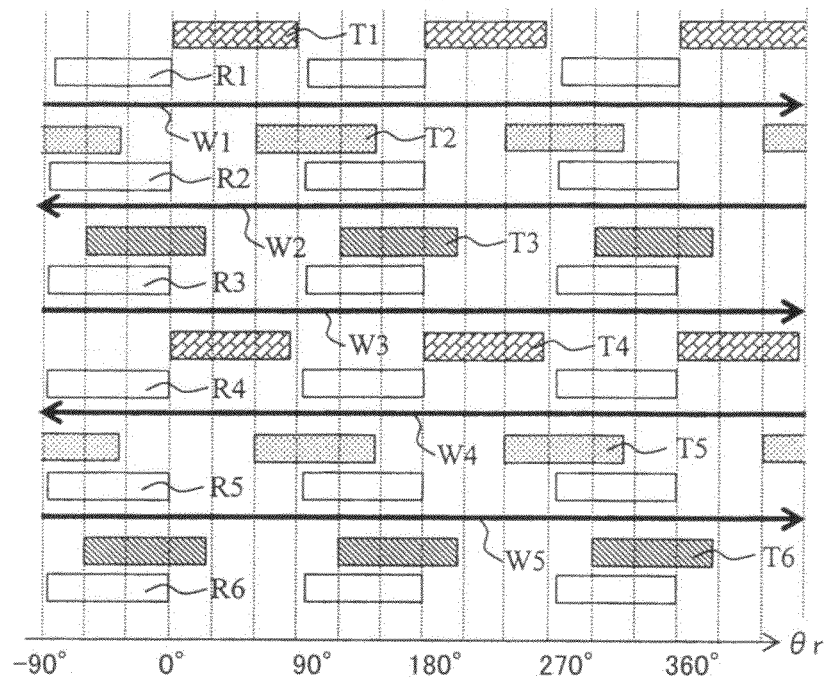
FIG. 7 is a linearly developed view showing a circumferential plane at which stator poles and rotor salient poles face with each other of the motor shown in FIG. 4.

FIG. 7 shows a lateral spread of shape of an air gap plane (which is in the circumferential direction CR) between the stator and the rotor of the motor shown in FIG. 4. In FIG. 7, the lateral axis shows angles in the circumferential direction CR as electrical angles, in which the stator poles and the rotor poles are arranged at pitches having an electrical angle of 180 degrees. The longitudinal axis of the FIG. 7 shows the axial direction AX of the rotor. Since the stator and rotor poles having the same phase are opposed with each other, it is difficult to clearly draw them in the laterally spread illustration, and therefore those poles are shifted in the vertical direction in the drawing. For example, the stator salient pole T1 and the rotor salient pole R1 are arranged to be opposed with each other in the motor, but they are illustrated by being shifted vertically in the drawing.

In FIG. 7, the stator salient poles T1, T2, T3, T4, T5 and T6 for the respective phases are arranged, phase by phase, to have phase differences of an electrical angle of 60 degrees in the circumferential direction CR. In contrast, all of the rotor salient poles R1, R2, R3, R4, R5 and R6 for the respective phases are arranged to have the same phase.

It is assumed in the drawing that a relative positional relationship between the stator and the rotor is such that the stator stays on the front side of the drawing paper and the rotor poles stay on the rear side of the drawing paper. The windings W1, W2, W3, W4 and W5 are arranged respectively in slots each formed between the stator salient poles for the respective phases, and subject to current supply to allow currents to be passed therethrough as illustrated by arrows in the drawing. When it is decided that the upper side of the rotor shaft 1 in FIG. 4 acts as an output shaft, the direction of current through the winding W1 is a counterclockwise direction CCW and that through the winding W2 is a clockwise direction CW, around the output shaft when being viewed from the top.

Relationships between respective portions and respective currents of the motor shown in FIGS. 4 and 7 will now be described.

A stator pole group GT1 is composed of the plural stator salient poles T1 made of soft magnetic material and arranged along the same circumference. A stator pole group GT2 is composed of the plural stator salient poles T2 made of soft magnetic material and arranged along the same circumference. A stator pole group GT3 is composed of the plural stator salient poles T3 made of soft magnetic material and arranged along the same circumference. A stator pole group GT4 is composed of the plural stator salient poles T4 made of soft magnetic material and arranged along the same circumference. A stator pole group GT5 is composed of the plural stator salient poles T5 made of soft magnetic material and arranged along the same circumference. And a stator pole group GT6 is composed of the plural stator salient poles T6 made of soft magnetic material and arranged along the same circumference. The six stator pole groups are arranged parallel with each other in the rotor axial direction AX.

The respective stator pole groups GT1, GT2, GT3, GT4, GT5 and GT6 have back yokes magnetically connected to each other so as to have a lower magnetic resistance. Gaps each formed between stator pole groups among the stator pole groups GT1, GT2, GT3, GT4, GT5 and GT6 in the rotor axial direction AX provide 5 slots SL1, SL2, SL3, SL4 and SL5 in each of which the annular windings are arranged.

The annular windings W1, W2, W3, W4 and W5 are wound to go around the rotor shaft in the respective file slots in the circumferential direction CR. Additionally the winding W6 is arranged outside the stator pole groups. This winding W6 can be omitted.

One-way currents, that is, DC currents I1, I2, I3, I4, I5 and I6, are supplied to the six windings. The directions of the currents flowing through the six windings are alternately opposite to each other in the rotor axial direction AX. Hence, the directions of the currents flowing through mutually adjacent annular windings in the rotor axial direction AX are opposite to each other. Each of the stator pole groups each composed of the stator salient poles is electromagnetically excited by currents flowing through two annular windings mutually adjacent in the rotor axial direction AX. The stator pole group located at an end in the rotor axial direction AX can be excited without using the annular winding located outside the stator.

A rotor pole group RT1 is composed of the plural rotor salient poles R1 made of soft magnetic material and arranged along the same circumference. A rotor pole group RT2 is composed of the plural rotor salient poles R2 made of soft magnetic material and arranged along the same circumference. A rotor pole group RT3 is composed of the plural rotor salient poles R3 made of soft magnetic material and arranged along the same circumference. A rotor pole group RT4 is composed of the plural rotor salient poles R4 made of soft magnetic material and arranged along the same circumference. A rotor pole group RT5 is composed of the plural rotor salient poles R5 made of soft magnetic material and arranged along the same circumference. And a rotor pole group RT6 is composed of the plural rotor salient poles R6 made of soft magnetic material and arranged along the same circumference. The six rotor pole groups are arranged parallel with each other in the rotor axial direction AX. The respective rotor pole groups RT1, RT2, RT3, RT4, RT5 and RT6 have back yokes magnetically connected to each other so as to have a lower magnetic resistance.

By the way, in the above rotor pole groups GR1, GR2, GR3, GR4, GR5 and GR6, the salient poles assigned to the same phase in the circumferential direction CR, which are among the six rotor salient poles R1, R2, R3, R4, R5 and R6, can be produced into a one integrated member extending along the rotor axial direction AX.

The stator salient poles in the rotor axial direction AX can be modified into various shapes such that the widths of the stator salient poles are made larger than those in FIG. 4 in the axial direction AX, for example. Electromagnetic actions between the stator salient poles and the rotor salient poles are generated depending on their relative positional relationships. As a result, it is sufficient that a desired relationship of phases of, phase by phase, between the stator and rotor salient poles in the circumferential direction is kept, being not restricted by circumferential phase relationships of other phases. The stator and rotor salient poles for each phase can be arranged at a circumferential phase relationship free from other phases.

Though the description here exemplifies the six stator pole groups, the motor can be produced to have a different number of stator pole groups, which is other than 6. Especially, an even number of stator pole groups makes it easier to produce the motor with pole pitches of an electrical angle of 180 degrees. In this case, an electromagnetic symmetry can be maintained. In addition, as the soft magnetic material, a laminated member of magnetic steel sheets, a structure made by bending magnetic steel sheets, a ferrite soft magnetic member, a powder magnetic core, and others can be used.

The stator and rotor salient poles and windings can be modified into various shapes as long the electromagnetic relationships are maintained. For example, since it is sufficient that the salient poles have differences in phase, the salient poles can also be produced by forming recesses at intervals in the circumferential direction CR or by alternately arranging higher and lower magnetic permeability materials in the circumferential direction CR. The annular windings can also be shaped in a wave-formed serpentine shape. The annular windings may be wound to extend into each space between rotor salient poles.

The operations of the motor shown in FIG. 4 will now be described.

The currents supplied to the respective annular windings are set to one-way currents and controlled properly, whereby the directions of magnetic flux passing through the stator and rotor poles for the respective phases can be controlled to stay constant. As illustrated by flux directions in FIG. 4, a magnetic flux φa for the A phase passes between the stator salient pole T1 and the rotor salient pole R1, a magnetic flux φb for the B phase passes between the stator salient pole T3 and the rotor salient pole R3, and a magnetic flux φc for the C phase passes between the stator salient pole T5 and the rotor salient pole R5. A magnetic flux φd between the stator salient pole T4 and the rotor salient pole R4, and this magnetic flux φd is controlled to become a negative A-phase magnetic flux −φa. A magnetic flux φe between the stator salient pole T6 and the rotor salient pole R6, and this magnetic flux φe is controlled to become a negative B-phase magnetic flux −φb. Further, a magnetic flux φf between the stator salient pole T2 and the rotor salient pole R2, and this magnetic flux φf is controlled to become a negative C-phase magnetic flux −φc.

How to supply the currents to the respective windings will now be described.

Figure 13:
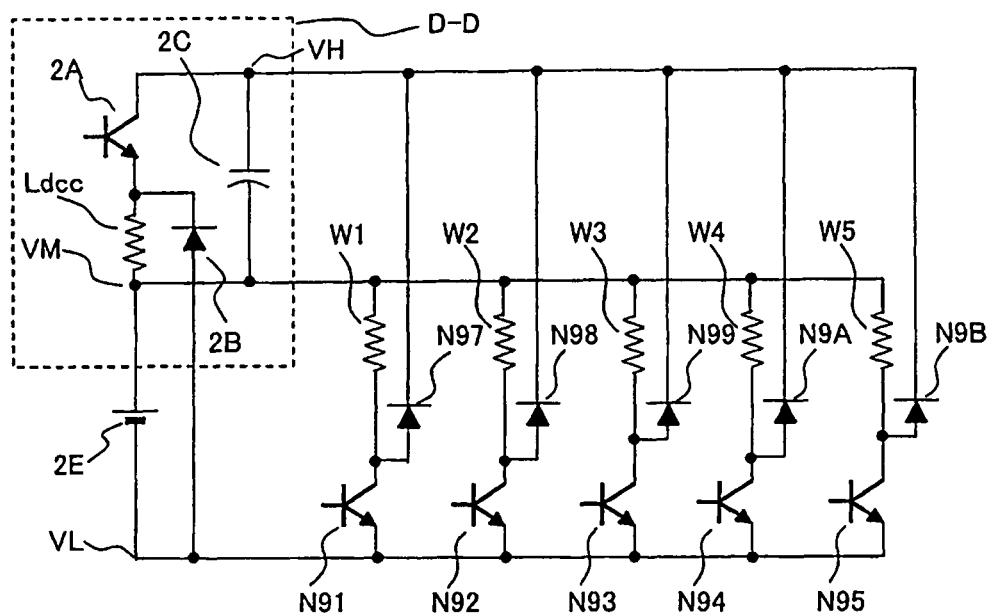
FIG. 13 is an example of a circuit to drive the motors shown in FIG. 4 etc., which motors are according to the present invention.

FIG. 13 exemplifies a circuit to supply currents to the windings of the motor shown in FIG. 4. A reference 2E shows a DC voltage supply, which has a circuit portion enclosed a dashed line D-D, which circuit portion is functionally the same as the DC-DC converter shown in FIG. 2. The DC-DC converter normally cannot be negligible in its cost and size when being designed, but their burden from the cost and size can be reduced in the design when one DC-DC converter is used in common for driving a plurality of motors.

The respective windings W1, W2, W3, W4 and W5 are eclectically connected to allow the currents to flow in the directions as shown in FIG. 7. A transistor N91 is switched on to make current I1 flow through the winding W1, while the transistor N91 is switched off so that the current I1 flowing through the winding W1 so far starts to flow through a diode N97 and charges a capacitor 2C.

A transistor N92 is switched on to make current I2 flow through the winding W2, while the transistor N92 is switched off so that the current I2 flowing through the winding W2 so far becomes to flow through a diode N98 and charges the capacitor 2C. A transistor N93 is switched on to make current I3 flow through the winding W3, while the transistor N93 is switched off so that the current I3 flowing through the winding W3 so far starts to flow through a diode N99 and charges the capacitor 2C.

A transistor N94 is switched on to make current I4 flow through the winding W4, while the transistor N94 is switched off so that the current I4 flowing through the winding W4 so far becomes to flow through a diode N9A and charges the capacitor 2C. A transistor N95 is switched on to make current I5 flow through the winding W5, while the transistor N95 is switched off so that the current I5 flowing through the winding W5 so far starts to flow through a diode N9B and charges the capacitor 2C.

Figure 14:
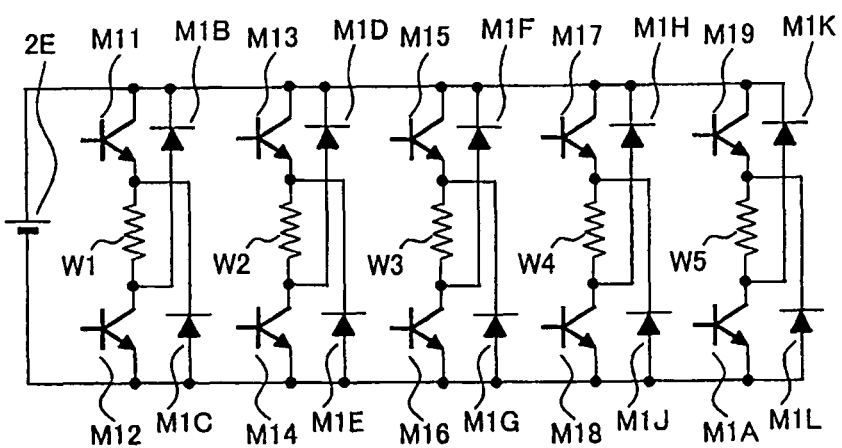
FIG. 14 is an example of a circuit to drive the motors shown in FIG. 4 etc., which motors are according to the present invention.

In addition, FIG. 14 exemplifies another circuit to supply the currents to the respective windings. In this circuit, when the current is required to be supplied to the winding W1, transistors M11 and M12 are switched on such that the voltage of the DC voltage supply 2E is applied to the winding W1, allowing the current I1 to flow therethrough. Switching off the transistors M11 and M12 makes it possible that the current I1 flowing through the winding W1 so far becomes to flow through diodes M1C and M1B. As a result, the current I1 returns to the DC voltage supply 2E for regeneration.

Of the two transistors, one can be switched on and the other can be switched off, which establishes a flow of flywheel current. For example, when the transistor M11 is switched on and the other transistor M12 is switched off, the current I1 which has flown via the winding W1 is changed to circulate via the transistor M11 and the diode M1B, producing a closed loop for a flow of current I1. Regarding the other windings W2, W3, W4 and W5, transistors and diodes corresponding to those windings can be used to control supply of currents I2, I3, I4 and I5 for the other phases of the motor. Besides this, various modifications of DC current drive circuits, such as modifications of the foregoing circuits, may be adopted.

How to supply the currents to generate torque will now be described with respect to the motor shown in FIG. 4. As understood from FIG. 7, the A-phase stator pole T1 has a phase which is the same as that of the D-phase stator pole, and, as understood from FIG. 4, the A-phase magnetic flux φa is opposite in directions to the D-phase magnetic flux φd. The rotation position θr of the A-phase rotor salient pole R1 is 0 degrees. And suppose that, from this rotation position θr=0°, the rotor shown in FIG. 5 is desired to be rotated in the counterclockwise direction CCW, that is, the rotor salient pole R1 shown in FIG. 7 is shifted rightwards in the drawing. In the state shown in FIG. 7, a magnetic flux φa is generated which makes a loop passing the rotor salient pole R1, the stator salient pole T1, the back yoke of the stator, the stator salient pole T4, and the rotor salient pole R4, and then returns to the rotor salient pole R1.

Figure 8:
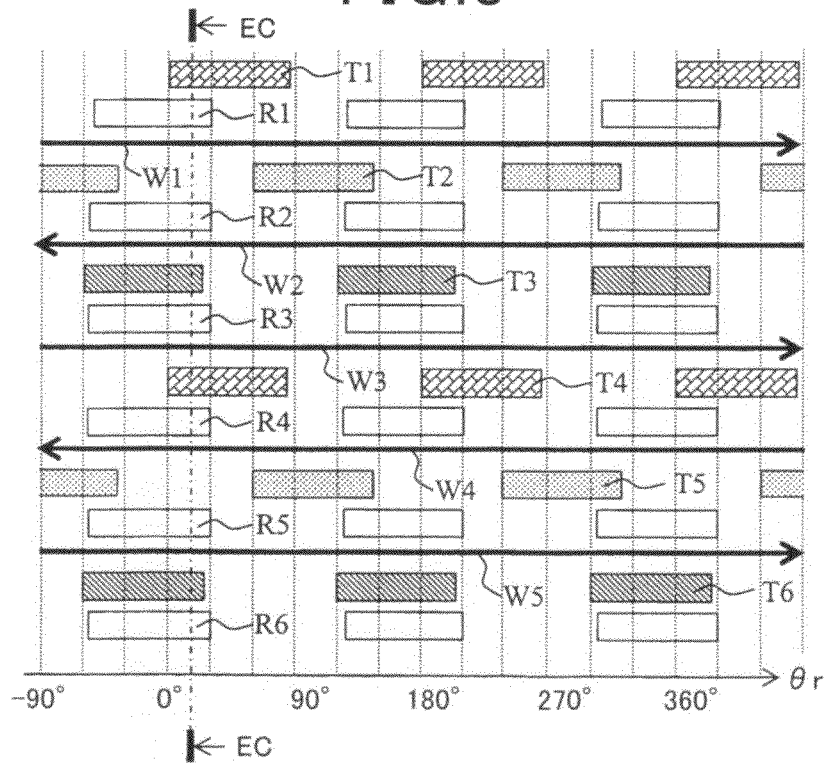
FIG. 8 is a linearly developed view showing a circumferential plane at which stator poles and rotor salient poles face with each other of the motor shown in FIG. 4.

FIG. 8 shows a state realized by shifting the rotor salient pole R1 rightward by 30 degrees in the drawing from the state shown in FIG. 7. A magnetic flux along a section EC-EC in FIG. 8 has a distribution shown by a magnetic flux N81 in FIG. 11 where a longitudinal section of the motor is depicted. In this state, torque is thus generated in this magnetic flux N81 shown in FIG. 11, which is the magnetic flux at the rotor rotation position θr=30° shown in FIG. 8. At a timing when the stator and rotor salient poles which are about to meet with each other according to the rotor ration, the currents are supplied to magnetically excite both salient poles. This generates an attraction force that forces the magnetic flux between both salient poles to increase, thereby generating torque Tm. Accordingly, as a matter of course, the torque is generated in different directions depending on relative positions between the same-phase stator and rotor salient poles in the circumferential direction CR. In this way, in each predetermined range of the rotor rotation positions θr, the necessary currents are supplied to generate the magnetic flux in each phase, thus generating a desired amount of torque.

Practically, at the rotation position θr shown in FIGS. 8 and 11, the currents I1, I3 and I4 passing through the windings W1, W3 and W4 are set to flow in the directions shown in FIG. 7 and to have the same amplitude. By changing the amplitude of the currents, amounts of generated torque can be changed. In this case, the currents to the other windings W2 and W5 are set to be zero. The magnetomotive force caused by the currents I1, I3 and I4 does not affect magnetic paths passing via the other stator salient poles T2, T3, T5 and T6. This can be proved based on Ampere's law. That is, an amount of currents interlinking with the paths to be proved is calculated. An amount of currents interlinking with the paths of the magnetic circuit made by the flux N81 is 2×I1, while that interlinking with the other paths is zero in total. In this case, currents are I1=I3=I4 with the same amplitude.

The motor shown in FIGS. 4 and 11 has the annular windings which generate magnetic fluxes, which pass three-dimensionally in the radial direction or circumferential direction CR as well as the rotor axial direction AX as shown by the magnetic flux N81, thus causing complicated electromagnetic actions on the paths. Meanwhile, though the motor shown in FIGS. 1 and 3 differs in shape, construction, and features from that shown in FIG. 4, both motors are, in part, similar in their electromagnetic actions, and it is easier to understand or explain by depicting the electromagnetic actions in plan views, as shown by FIG. 3. With considering this, the electromagnetic actions according to FIGS. 11 and 13 will now be described with comparison with FIG. 3.

The motor shown in FIG. 4 according to the present invention will now be compared with the motor shown in FIG. 1.

The respective stator salient motors T1, T2, T3, T4, T5 and T6 correspond to the stator poles 17, 18, 19, 1A, 1B and 1C in FIG. 1, respectively. However, the structure shown in FIG. 4 corresponds to a structure where the back yoke of the stator is magnetically divided at the winding 11 to right and left. The windings W1, W2, W3, W4, W5 and W6 correspond to the windings 12, 13, 14, 15, 16 and 11, respectively. If the back yoke of the stator is magnetically divided at the winding 11 to right and left, the winding 11 should be located outside the magnetic circuit of the motor in FIG. 1, providing extremely less electromagnetic actions. This is similar to the electromagnetic actions of the winding W6 of the motor in FIG. 4. The respective rotor salient poles R1, R2, R3, R4, R5 and R6 correspond to the rotor salient poles 1E and 1H shown in FIG. 1.

The motor shown in FIG. 4 has points different from the motor shown in FIG. 1. Such points include the followings. The stator salient poles in FIG. 4 are arranged, as the same-phase stator poles, at pitches of, an electrical angle of 360 degrees on the same circumference; the width of each stator pole in the circumferential direction CR can be made larger up to a width corresponding to an electrical angle of 90 degrees; the respective windings are annular windings; and the stator back yoke is not endless in directions along which currents having different phases pass through the respective windings. The amount of each phase current and the magnetic flux N81 in FIG. 11, which has been described, correspond to the amount of each phase current and the magnetic flux 1F in (a) of FIG. 3. FIG. 3 (a) is understood more easily with respect to a combination of the direction along which the magnetomotive force is active and the stator poles and a combination of directions along which the magnetomotive force is inactive, from a visual viewpoint based on Ampere's law.

FIG. 9 shows a state where, from the state of FIG. 8, the rotor salient pole R1 is further shifted 60 degrees rightward in the drawing so that the rotation angle θr=90° is realized. At this rotation position, how to rotate the rotor in FIG. 5 in the counterclockwise direction CCW, that is, how to shift the rotor salient pole R1 shown in FIG. 9 to the right in the drawing will be considered.

To realize the rotation state shown in FIG. 9, a magnetic flux φc is generated to pass through the rotor salient pole R5, the stator salient pole T5, the stator back yoke, the stator salient pole T2, and to the rotor salient pole R2, and returns to the rotor salient pole R5. This provides a closed loop of the magnetic flux φc. The magnetic flux along a section ED-ED in FIG. 9 has a distribution corresponding to a magnetic flux S31 shown in a longitudinal section of the motor.

As practical currents to generate the magnetic flux S31, currents I4 and I5 respectively passing through the windings W4 and W5 and currents I1 and I2 respectively passing through the windings W1 and W2 are set to be directed as shown in FIG. 7 and have the same current amplitude. Changing the amplitude of the currents makes it possible to change amounts of torque being generated. In this case, the magnetomotive force caused by the currents I1, I2, I4 and I5 does not affect magnetic paths passing via the other stator salient poles T1, T3, T4 and T6. The currents are I1=I2=I4=I5 with the same amplitude.

The amount of each phase current and the magnetic flux N81 in FIG. 11, which has been described, correspond to the amount of each phase current and the magnetic flux 35 in (d) of FIG. 3. In (d) of FIG. 3, the magnetomotive force is not active for the four stator poles other than the corresponding stator poles 18 and 1B, causing no magnetic flux.

Figure 44:
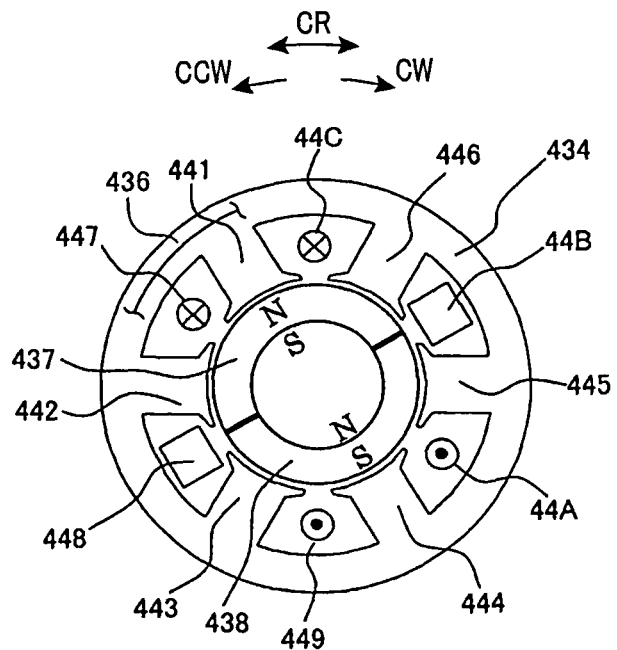
FIG. 44 shows a lateral section of the conventional brushless motor shown in FIG. 43.

The motor shown in FIG. 4 is a motor that gains torque using a force resultant from reluctance, and the stator teeth for each phase are shaped as salient poles so as to provide stator pole functions to each phase. Similarly, the rotor salient poles are provided as rotor poles. By way of example, the brushless motor shown in FIG. 44 is provided as a cylindrical surface magnet type motor, in which permanent magnets compose rotor poles, instead of using the rotor salient poles. Concerning the stator of FIG. 4, its inner surface is approximately cylindrical, without the stator poles having salient shapes as shown by the motor in FIG. 5.

Differences between the motors shown in FIGS. 1 and 4 will now be described.

The motor shown in FIG. 1 is structured such that six stator poles are arranged in a range in which the two salient poles of the rotor are present, i.e., in a range of an electrical angle of 360 degrees, and one stator pole for each phase is arranged in a range an electrical angle of 360 degrees. When structurally comparing the motor in FIG. 1 with that in FIG. 4, there are provided stator salient poles and rotor salient poles, which are shown in FIG. 10. This motor shown in FIG. 10 has the stator salient poles whose number is half those of the motor shown in FIG. 7 which is according to the present invention as described before. As a result, torque generated by the motor shown in FIG. 10 is also ½, in comparison with that of the motor shown in FIG. 7. The motor shown in FIG. 7 is produced identically to a structure in which stator salient poles are additionally arranged in vacant spaces of the motor shown in FIG. 10. Hence, it is said that a double amount of torque generated by the motor in FIG. 10 can be provided by the motor in FIG. 7.

The motor in FIG. 7 is produced such that the two stator salient poles for the same phase are arranged in a range of an electrical angle of 360 degrees in the circumferential direction CR. One reason why the stator salient poles can be added in the motor configuration in FIG. 4 is resultant from the fact that each winding current is one-way current, whereby the direction of a magnetic flux passing through each stator pole is one way. This is a significant characteristic of the motor according to the present invention, which makes it possible to increase output torque.

In the three-phase AC motor shown in FIG. 44 which is a conventional brushless motor, one stator pole for each phase is also arranged in a range of an electrical angle of 360 degrees. Additionally, in motors such as two-phase motors, three-phase motors, and four-phase motors being produced by changing the conventional brushless motor into motors with annular windings, only one stator pole for the same phase is arranged in a range of an electrical angle of 360 degrees. In this regard, this kind of motor is also inferior to the motor according to the present invention in generating the torque.

Figure 15:
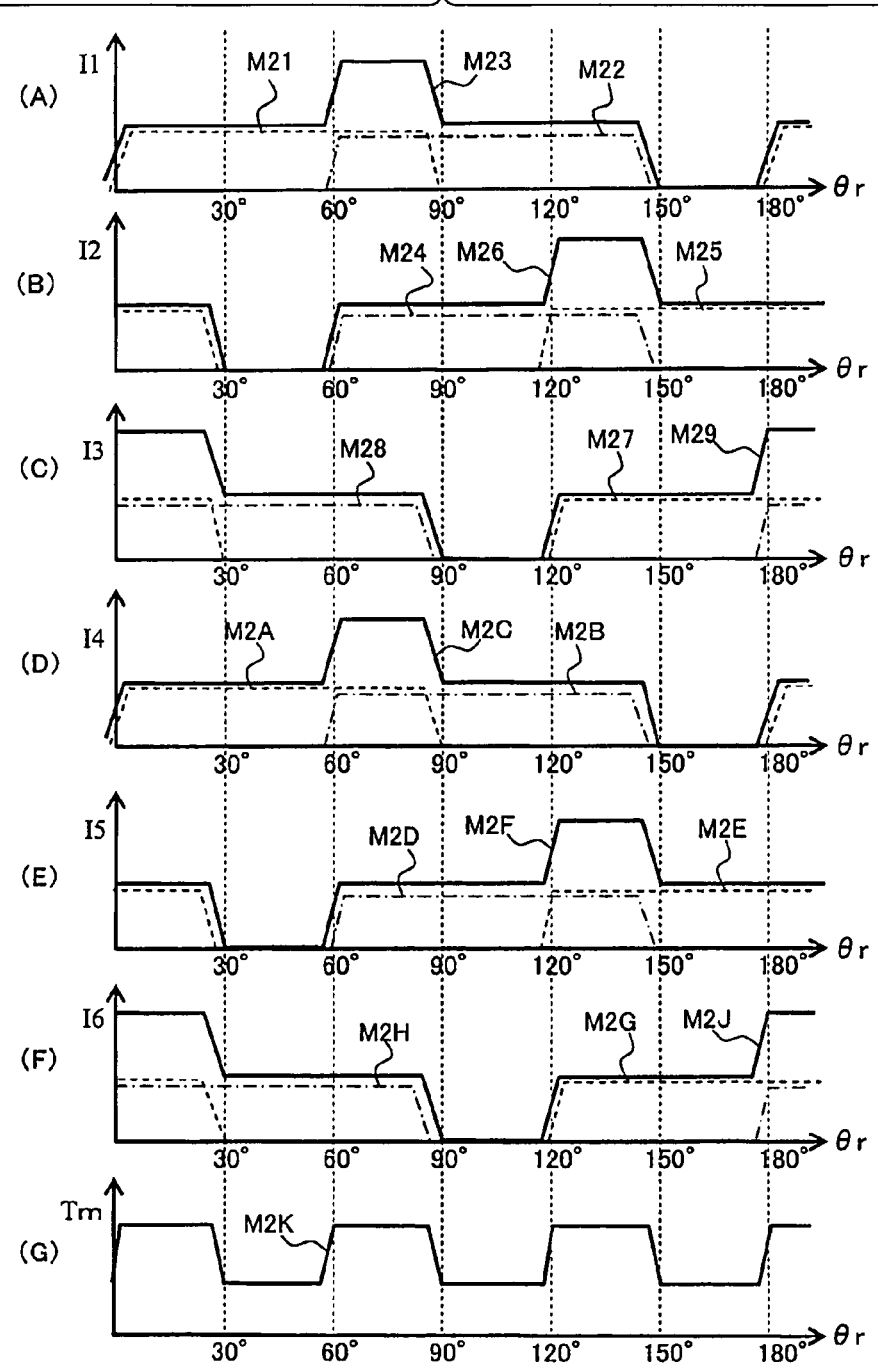
FIG. 15 is a chart exemplifying currents and torque, the currents being driving the motors shown in FIG. 4 etc., which are according to the present invention.

With respect to continuous rotation of the motor shown in FIG. 4, relationships between the currents I1, I2, I3, I4, I5 and I6 and the torque Tm are shown in FIG. 15. The current I6 through the winding W6 may be omitted. The lateral axis indicates the rotor rotation position θr by the electrical angle. Thick solid lines indicate the currents, to each of which components of each current indicated by dashed lines and chain lines are added. The sum of the components becomes the value indicated by each of the solid lines. In FIG. 15, a current component M21 shown in (A) and a current component M2H shown in (F) generate a magnetic flux φa, and a current component M28 shown in (C) and a current component M2A shown in (D) generate a magnetic flux φd. A current component M25 shown in (B) and a current component M27 shown in (C) generate a magnetic flux φd, and a current component M2E shown in (E) and a current component M2G shown in (F) generate a magnetic flux φe. A current component M2B shown in (D) and a current component M2D shown in (E) generate a magnetic flux φc, and a current component M22 shown in (A) and a current component M24 shown in (B) generate a magnetic flux φf.

The sum of the current components produces each of the currents I1, I2, I3, I4, I5 and I6. The currents I1, I2, I3, I4, I5 and I6 correspond to current sums M23, M26, M29, M2C, M2F and M2J, respectively. As explained with division of the current components, magnetic fluxes can be controlled by mutually superposing a plurality of flux components or a plurality of current components as need arises. A reference M2K shown in (G) of FIG. 15 is torque outputted from the motor. The example shown in FIG. 15 provides a drive method of allowing the stator and rotor salient poles to use larger areas for generating the torque, so that the torque Tm has larger average values but has a torque ripple which is only a little larger.

In this way, the motor can generate the rotation torque by switching the currents according to progress in the rotor rotation.

Figure 16:
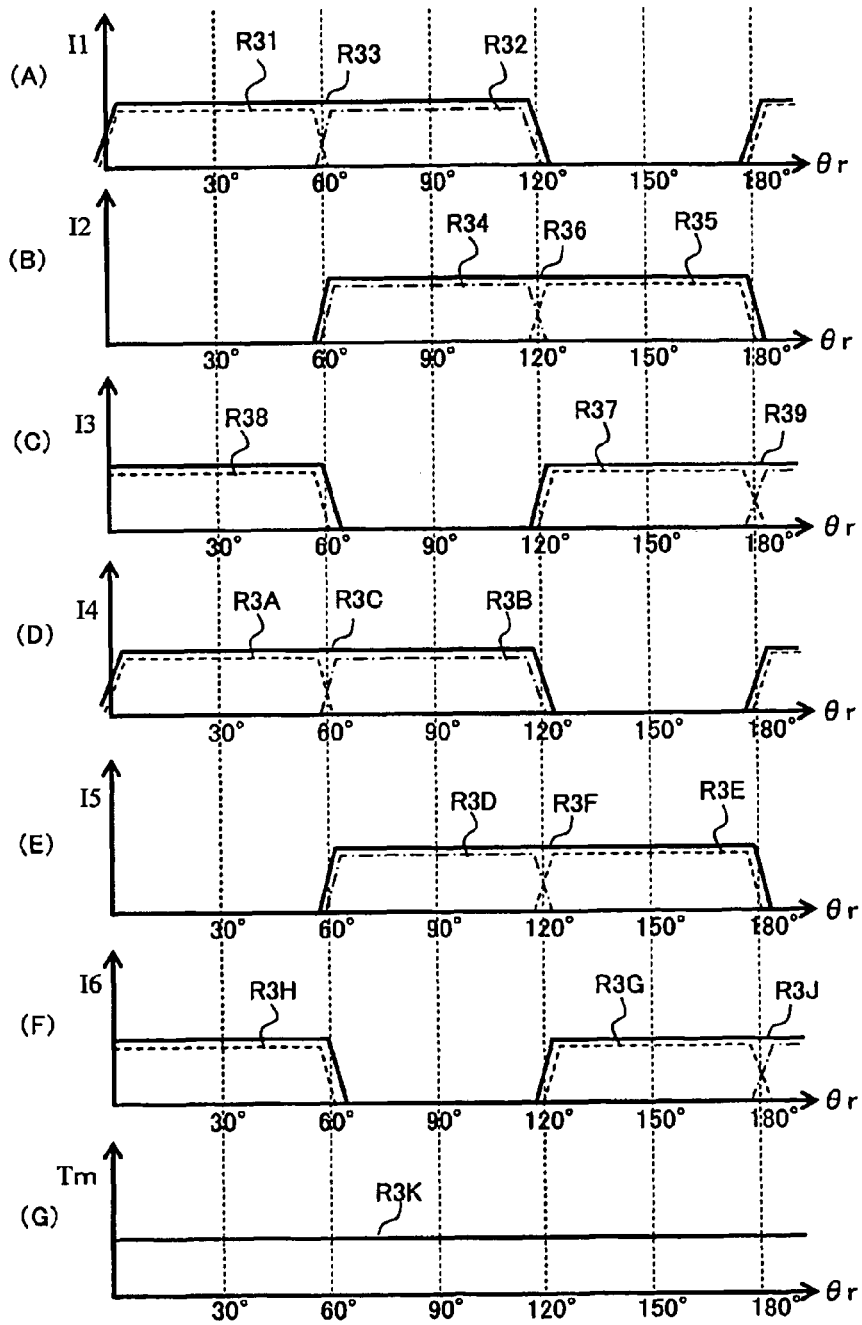
FIG. 16 is a chart exemplifying currents and torque, the currents being driving the motors shown in FIG. 4 etc., which are according to the present invention.

FIG. 16 exemplifies a current drive in the motor according to the present invention.

FIG. 16 exemplifies relationships between the currents I1, I2, I3, I4, I5 and I6 and the torque Tm when making the motor in FIG. 4 rotate continuously. The lateral axis indicates the rotor rotation position θr by the electrical angle. Thick solid lines indicate the currents, to each of which components of each current indicated by dashed lines and chain lines are added. The sum of the components becomes the value indicated by each of the solid lines.

In FIG. 16, a current component R31 shown in (A) and a current component R3H shown in (F) generate the magnetic flux φa, and a current component R38 shown in (C) and a current component R3A shown in (D) generate the magnetic flux φd. A current component R35 shown in (B) and a current component R37 shown in (C) generate the magnetic flux φb, and a current component R3E shown in (E) and a current component R3G shown in (F) generate the magnetic flux φe. A current component R3B shown in (E) and a current component R3D shown in (E) generate the magnetic flux φc, and a current component R32 shown in (A) and a current component R34 shown in (B) generate the magnetic flux φf. The sum of the current components produces each of the currents I1, I2, I3, I4, I5 and I6. The currents I1, I2, I3, I4, I5 and I6 correspond to current sums R33, R36, R39, R3C, R3F and R3J, respectively. As explained with division of the current components, magnetic fluxes can be controlled by mutually superposing a plurality of flux components or a plurality of current components as need arises. A reference R3K shown in (G) of FIG. 16 is a torque Tm outputted from the motor.

In the current drive method shown in FIG. 16, compared with the current drive method shown in FIG. 15, an average torque becomes smaller, down to ⅔, but there can be provided a DC current supply technique of making the torque uniform so that a ripple in torque becomes smaller. Compared with that shown in FIG. 15, the maximums of the respective currents become ½, thus lowering a current capacity necessary for transistors. In this way, the motor can generate the rotation torque with switchovers among the currents according to progress of the motor rotation. If the winding W6 is not provided in the motor, the current I6 may not need as well.

As described above, the motor according to the present invention, which is shown by FIG. 4 and other drawings, the attraction force is used to generate both torque in the counterclockwise direction CCW and torque in the clockwise direction CW. Thus the motor can rotate in both directions and power running and regeneration can be down in each of the directions.

Second Embodiment

An AC motor according to a second embodiment of the present invention will now be described, in which the second embodiment explains claim 2.

Figure 18:
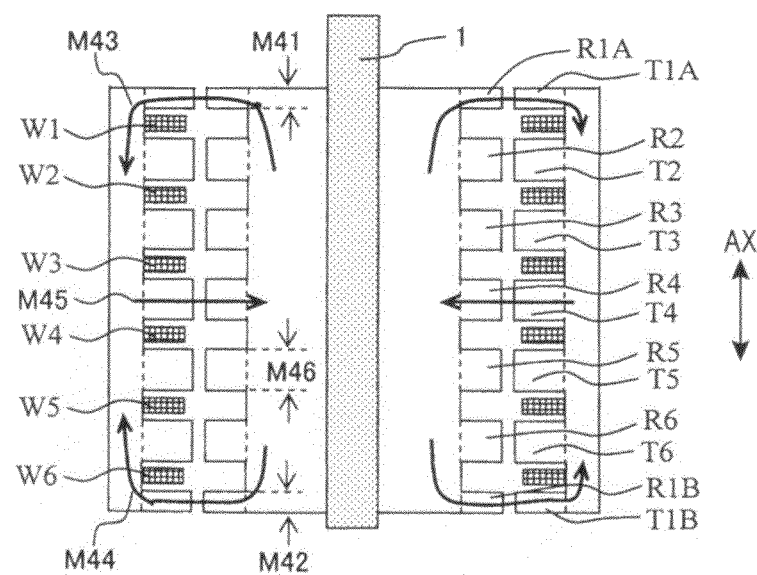
FIG. 18 is a longitudinal sectional view of the motor showing a distribution of magnetic fluxes generated in the state shown in FIG. 17.
Figure 19:
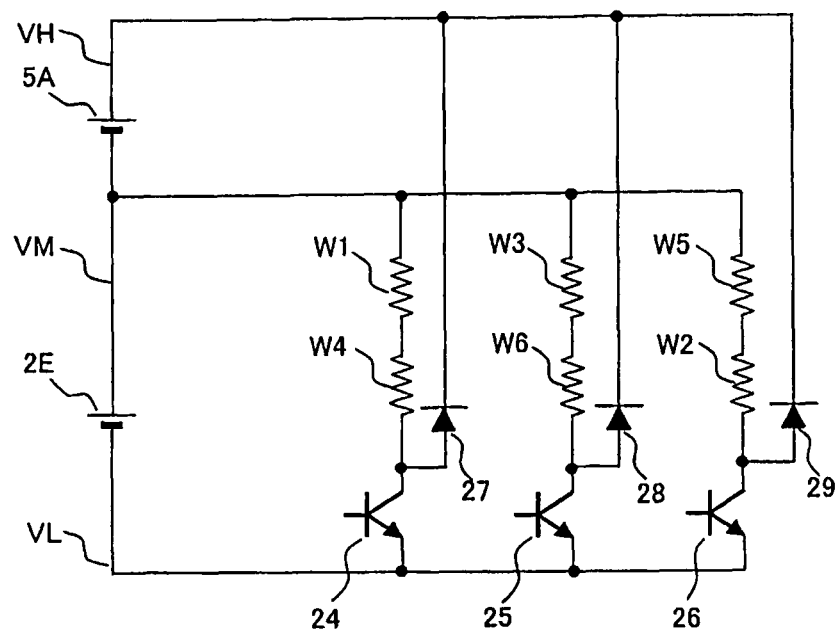
FIG. 19 exemplifies a circuit to drive the motor shown in FIG. 4 or 18.
Figure 20:
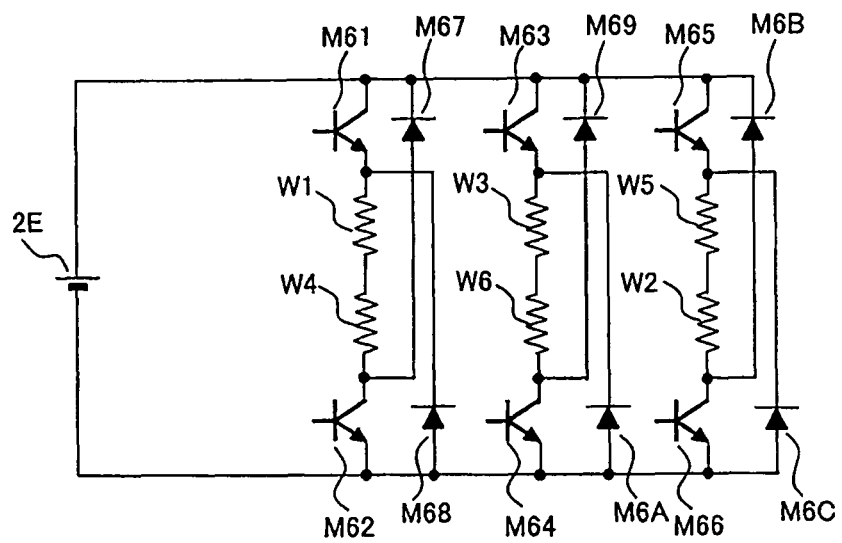
FIG. 20 exemplifies a circuit to drive the motor shown in FIG. 4 or 18.
Figure 21:
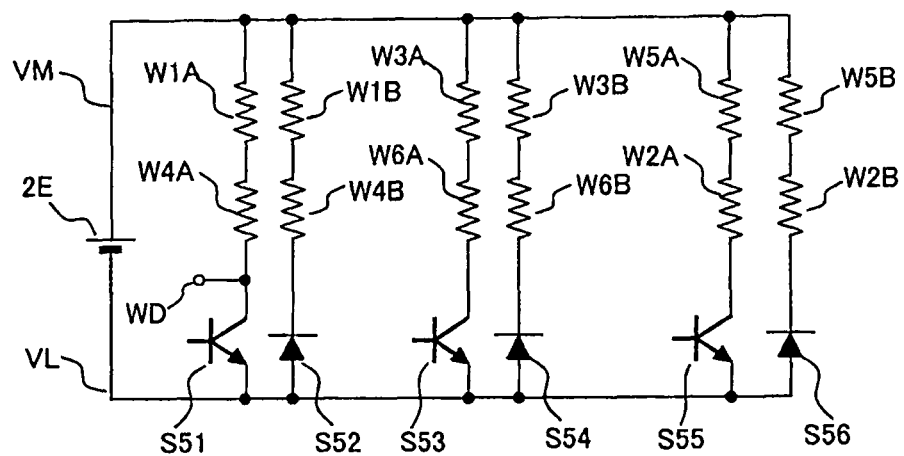
FIG. 21 exemplifies a circuit in which the windings shown in FIG. 19 are wound in a bifilar wounding construction, voltage application is performed by transistors, and regeneration of magnetic energy is performed by diodes.

The motor shown in FIGS. 4 and 18 has been described with use of the winding connection and current drive methods shown in FIGS. 13 and 14, but it is possible to supply currents by using drive circuits shown in FIGS. 19, 20 and 21. In this case, the drive circuits can be simplified in its constructions. Incidentally, the drive circuits shown in FIGS. 13 and 14 are advantageous in, at most, motor control performance, such as torque characteristics or current response, because the winding currents can be controlled at different current values and voltage can be applied to the respective windings.

FIG. 19 exemplifies a circuit to drive the motor shown in FIG. 4 or FIG. 18, in which the DC-DC converter D-D is replaced by a DC voltage supply 5A. The voltage supply can be formed by selectable various configurations. The windings W1 and W4 are connected in series with the same current supply direction, and a transistor 24 and a diode 27 are used to control current and voltage. Switching on the transistor 24 enables the DC voltage supply 2E to apply its voltage to the windings W1 and W4, so that the current increases. Switching off the transistor 24 enables the current to flow to the DC voltage supply 5A via the diode 27, so that the magnetic energy of the windings W1 and W4 is regenerated.

As shown in FIG. 15, the currents I1 and I4 respectively passing through the windings W1 and W4 have the same waveform, whereby those windings can be connected in series for the drive. Further, as shown in FIGS. 11 and 12, the windings W1 and W4 is not subjected to simultaneously large rotation change rates in magnetic fluxes each interlinking therewith. Hence, in theory, the burden of voltage on the windings is not large. Since the windings W1 and W4 can be connected in series and driven, the whole drive circuit can be simplified, which leads to lower production cost and compact-size circuit. Energy Loss in the drive circuit can also be reduced, thereby saving energy consumption for higher energy efficiency. When interlinkage magnetic flux with a winding Wx is denoted by φx, voltage Vx of the winding is obtained by:

$$Vx=Nw \times d\phi x/dt = Nw \times d\phi x/d\theta r \times d\theta r/dt.$$

Accordingly, in FIGS. 11 and 12, the voltage Vx is proportional to a rotation change rate dφx/dθr of the interlinkage magnetic flux φx, so that conditions necessary for the respective transistors 24, 25 and 26 can be considered and calculated. In the expression, Nw is the number of winding times and dθr/dt is a rotation speed of the motor.

Similarly to the above, the windings W5 and W2 are also connected in series with the same current supply direction, and a transistor 26 and a diode 29 are used to control current and voltage. Switching on the transistor 26 enables the DC voltage supply 2E to apply its voltage to the windings W5 and W2, so that the current increases. Switching off the transistor 26 enables the current to flow to the DC voltage supply 5A via the diode 29, so that the magnetic energy of the windings W5 and W2 is regenerated. As shown in FIG. 15, the currents I5 and I2 respectively passing through the windings W5 and W2 have the same waveform, whereby those windings can be connected in series for driving. Further, as shown in FIGS. 11 and 12, the windings W5 and W2 is not subjected to simultaneously large rotation change rates in magnetic fluxes each interlinking therewith. Hence, in theory, the burden of voltage on the windings is not large. Since the windings W2 and W5 can be connected in series and driven, the whole drive circuit can be simplified, which leads to lower production cost and compact-size circuit. Energy Loss in the drive circuit can also be reduced, thereby saving energy consumption for higher energy efficiency.

Similarly, the windings W3 and W6 are also connected in series with the same current supply direction, and a transistor 25 and a diode 28 are used to control current and voltage. Switching on the transistor 25 enables the DC voltage supply 2E to apply its voltage to the windings W3 and W6, so that the current increases. Switching off the transistor 25 enables the current to flow to the DC voltage supply 5A via the diode 28, so that the magnetic energy of the windings W3 and W6 is regenerated. As shown in FIG. 15, the currents I3 and I6 respectively passing through the windings W3 and W6 have the same waveform, whereby those windings can be connected in series for driving. When the winding W6 is omitted from being arranged in the motor in FIG. 4, the winding W6 in FIG. 19 is also omitted from being inserted in the circuit, i.e., short-circuited in that path.

Next, a drive circuit shown in FIG. 20 will be described.

In this drive circuit in FIG. 20, like that shown in FIG. 19, two windings can be connected in series with each other and driven in such a state, so that the drive circuit can be produced at lower cost, made compact in size, and efficient. The windings W1 and W4 are mutually connected in series and subjected to the same current direction. Transistors M61 and M62 and diodes M67 and M68 are employed to control voltage and current of those windings. When the transistors M61 and M62 are switched on, the voltage across the DC voltage supply 2E is applied to the serially connected windings W1 and W4 so that current passing therethrough increases. In contrast, when the transistors M61 and M62 are switched off, the current flows into the DC voltage supply 5A via the diodes M67 and M68, whereby the magnetic energy owned by the windings W1 and W4 is regenerated. In this circuit, of the two transistors, one transistor can be switched on and the other can be switched off, resulting in supply of flywheel current. For example, the one transistor M61 is switched on, while the other transistor M62 is switched off. In response to this switching actions, the current which have passed through the windings W1 and W4 is make a circuit via the transistor M61 and the diode M67, enabling current I to flow through this closed circuit.

Similarly to the above, the windings W5 and W2 are mutually connected in series and subjected to the same current direction. Transistors M65 and M66 and diodes M6B and M6C are employed to control voltage and current of those serially connected windings. When the transistors M65 and M66 are switched on, the voltage across the DC voltage supply 2E is applied to the serially connected windings W5 and W2 so that current passing therethrough increases. In contrast, when the transistors M65 and M66 are switched off, the current flows into the DC voltage supply 5A via the diodes M6B and M6C, whereby the magnetic energy owned by the windings W5 and W2 is regenerated.

Similarly, the windings W3 and W6 are mutually connected in series and subjected to the same current direction. Transistors M63 and M64 and diodes M69 and M6A are employed to control voltage and current of those serially connected windings. When the transistors M63 and M64 are switched on, the voltage across the DC voltage supply 2E is applied to the serially connected windings W3 and W6 so that current passing therethrough increases. In contrast, when the transistors M63 and M64 are switched off, the current flows into the DC voltage supply 5A via the diodes M69 and M6A, whereby the magnetic energy owned by the windings W3 and W6 is regenerated. If there is no winding W6 in a motor, the winding W6 in this circuit is omitted, leaving only the winding W3.

A drive circuit shown in FIG. 21 will be now described.

When this drive circuit is employed, it is necessary to change the windings of the motor shown in FIG. 4 into a bifilar wound construction. Practically, in the bifilar winding, the windings W1 and W2 shown in FIG. 1 are wound to be parallel with each other, so that magnetic fluxes interlinking with two windings W1A and W1B are directed in mutually opposite directions. Ideally, the A-phase magnetic flux $\phi a$ should have a complete interlinkage with both windings W1A and W1B, however a certain amount of leakage flux is caused actually. Concerning the winding W2, windings W2A and W2B are connected to be parallel with each other in mutually opposite directions; concerning the winding W3, windings W3A and W3B are connected to be parallel with each other in mutually opposite directions; concerning the winding W4, windings W4A and W4B are connected to be parallel with each other in mutually opposite directions; concerning the winding W5, windings W5A and W5B are connected to be parallel with each other in mutually opposite directions; and concerning the winding W6, windings W6A and W6B are connected to be parallel with each other in mutually opposite directions.

Further, the windings W1A and W4A are serially connected to each other such that the directions of currents through the windings are the same. A transistor S51 and a diode S52 are employed to control current through the windings. Switching on the transistor S51 allows the DC voltage supply 2E to apply its voltage to the serially connected windings W1A and W4A so that the current increases. By contrast, switching off the transistor S51 allows the current I1B to flow into the DC voltage supply 2E via the diode S52 and the windings W1B and W4B. Thus the magnetic energy owned by the windings W1A and W1B, and W4A and W4B is regenerated into the DC voltage supply 2E. Since the windings W1A and W1B are magnetically interlinked with the same magnetic flux $\phi a$, those windings share the magnetic energy. Similarly to this, since the windings W4A and W4B are magnetically interlinked with the same magnetic flux $\phi d$, those windings share the magnetic energy.

When the number of turns of both windings W1A and W4A is WNA and that of both windings W1B and W4B is WNB, currents I1A and I1B just before and after a time when the transistor S51 is switched from its on state to its off state should meet a condition of "WNA×I1A=WNB×I1B". This is because, theoretically, "current value×the number of turns" provides the same value with regard to the two currents.

Similarly to the above, the windings W5A and W5A are serially connected to each other such that the directions of currents through the windings are the same. A transistor S55 and a diode S56 are employed to control current through the windings. Switching on the transistor S55 allows the DC voltage supply 2E to apply its voltage to the serially connected windings W5A and W2A so that the current increases. By contrast, switching off the transistor S55 allows the current I5B to flow into the DC voltage supply 2E via the diode S56 and the windings W5B and W2B. Thus the magnetic energy owned by the windings W5A and W5B, and W2A and W2B is regenerated into the DC voltage supply 2E.

Similarly, the windings W3A and W6A are serially connected to each other such that the directions of currents through the windings are the same. A transistor S53 and a diode S54 are employed to control current through the windings. Switching on the transistor S53 allows the DC voltage supply 2E to apply its voltage to the serially connected windings W3A and W6A so that the current increases. By contrast, switching off the transistor S53 allows the current I3B to flow into the DC voltage supply 2E via the diode S54 and the windings W3B and W6B. Thus the magnetic energy owned by the windings W3A and W3B, and W6A and W6B is regenerated into the DC voltage supply 2E.

Compared with the circuit shown in FIG. 19, the circuit shown in FIG. 21 is advantageous in that the DC voltage supply 5A becomes unnecessary. Further compared with the circuit shown in FIG. 20, that shown in FIG. 21 is also advantageous in that the number of transistors and diodes can reduced. Further, differently from the circuits shown in FIGS. 13 and 14, the circuit shown in FIG. 21 allows two windings to be connected in series with each other, whereby the drive circuit can be produced at lower cost, made compact in size, and more efficient. These advantages are true of the circuits shown in FIGS. 19 and 20. When a motor has no winding W6, this winding is omitted from the drive circuit. Meanwhile each of the transistors S51, S53, S55 are switched off, there is a possibility that an excessive voltage due to leakage magnetic flux from each winding is applied to the transistor. To avoid this drawback, an excessive voltage protecting circuit, such as a filter or a snubber circuit can be connected to the collector WD of each transistor, for example. It should be noted in the circuit in FIG. 21 that if the windings become complicated in its construction, the energy efficiency of the windings decreases. Furthermore, in a control circuit, various modifications and applications are possible. For example, in the circuit shown in FIG. 19, if the windings of the motor have large amounts of resistance, the voltage of the DC voltage supply 5A can be set to be zero. In other words, this DC voltage supply 5A is removed from the circuit. Alternatively, this DC voltage supply may be replaced with a snubber circuit.

As above, the motors shown in the drawings including FIGS. 4, 7 have been explained as motors having the 6 stator pole groups. In these motors, arranging two rotor salient poles in a range of an electrical angle of 360 degrees provides an electromagnetically symmetric structure in a range of an electrical angle of 180 degrees. Accordingly, currents passing through windings at a difference of phase of an electrical angle 180 degrees have the same amplitude but are directed mutually oppositely to each other, thus being possible to be connected in series for current supply. In the motor shown in FIGS. 4 and 7 in which the number M of stator pole groups is 6, M/2=3 is realized, so that windings located every three slots are connected in series for current supply. For example, the number M of stator pole groups is 8, M/2=4 is realized, so that windings located every four slots are connected in series for current supply. This is also applied to the number M=4, 10 or others. In this case, as long as the number of rotor salient poles is even as shown in FIG. 4 and later-described FIGS. 26, 27, 28 and 29, the same phase relationship is kept.

A capability of supplying electric energy of each of the drive circuits shown in FIGS. 19, 20 and 21 will now be described. This description results in describing how much a current capability of transistors in these circuits is reduced.

At first, voltage, current, power and torque of each of the windings arranged in each of the motors shown in FIGS. 4 and 1 is described. It is assumed that the motor in FIG. 4 rotates at a constant speed, during which the motor arrives at a state shown by FIG. 9. At this state, the magnetic fluxes are realized as shown in FIG. 12. The windings W1 and W4 are mutually connected in series in mutually opposite directions, which connection provides a winding W14 not shown, and the windings W5 and W2 are mutually connected in series in mutually opposite directions, which connection provides a winding W52 not shown. In FIG. 12, the windings W2 and W4 have interlinkage with the magnetic flux S31, while the windings W1 and W5 have no such interlinkage. Hence, the amounts of magnetic fluxes interlinking with the windings W14 and W52 are equal to each other. Incidentally in this case, the current passing through the winding W3 is zero.

When assuming that a magnetic flux density in a portion where each stator salient pole and each rotor salient pole are faced to each other is Bx, the number of winding times of a winding for each phase is Nw, current supplied to each of the windings W14 and W52 is Ix, the voltage across a winding for each phase is Vx, a proportionality coefficient to current having the magnetic flux density is Kb, a thickness of each stator salient pole and each rotor salient pole in the rotor axial direction AX is tc, an angular speed of rotation of the rotor is ωr, and a rotor radius is R, the magnetic flux density Bx and the interlinkage magnetic flux φ are approximately given by the following formulae. The current I3 through winding W3 in FIG. 9 is zero. In the formulae, time is denoted by t and a minute amount is denoted by Δ, so that a minute time is denoted as Δt.

$$\omega r = d\theta r/dt \quad (1)$$

$$Vx = Nw \times d\varphi/dt \quad (2)$$

$$= Nw \times d\varphi/d\theta r \times d\theta r/dt \quad (3)$$

$$= Nw \times d\varphi/d\theta r \times \omega r \quad (4)$$

$$Bx = Kb \times Ix \times Nw \quad (5)$$

A change rate of angle of the rotor, $d\varphi/d\theta r$, to the interlinkage magnetic flux φ, which appears in the formula (4), can be expressed as follows:

$$d\varphi/d\theta r \approx \Delta\varphi/\Delta\theta r = (tc \times \omega r \times \Delta t \times R \times Bx)/(\omega \times \Delta t) \quad (6)$$

$$= \frac{(tc \times \omega r \times \Delta t \times R \times Kb \times Ix \times Nw)}{(\omega r \times \Delta t)}$$

$$= tc \times R \times Kb \times Ix \times Nw, \quad (7)$$

In this case, by assuming that winding resistance Ra is zero, iron loss Pfe is zero, mechanical loss of the motor is zero, and an air gap between the rotor and the stator is sufficiently small, input electric power Pin is expressed by:

$$P\text{in} = 2 \times Vx \times Ix = 2 \times Nw \times d\varphi/dt \times Ix \quad (8),$$

where the coefficient 2 means two times of power calculated for one of the A-phase and C-phase windings, because both the A-phase and C-phase windings are powered at the same time.

In addition, mechanical output Pout is given by the following formula:

$$P\text{out} = T \times \omega r \quad (9)$$

As a result, using the foregoing formulae, torque T of the motor which operates in a liner operation range Aa can be given by the following formula:

$$T = 2 \times Nw \times d\varphi/dt \times Ix/\omega r \quad (10)$$

$$= 2 \times Nw \times d\varphi/d\theta r \times d\theta r/dt \times Ix/\omega r$$

$$= 2 \times Nw \times (tx \times R \times Kb \times Ix \times Nw) \times$$

$$\omega r \times Ix/\omega r$$

$$= 2 \times Nw \times tc \times R \times Kb \times Nw \times Ix^2$$

The torque T in the linear operation range Aa is proportional to the proportionality coefficient Kb of the magnetic flux density and further proportional to a square of the current Ix.

On the other hand, torque T is calculated in non-linear operation ranges given in the vicinity of the air gap where the soft magnetic member is magnetically saturated. Here, a saturated magnetic flux density is denoted as Bsat. The change rate of angle of the rotor, dφ/dθ, to the interlinkage magnetic flux φ is given by the following formula:

$$d\varphi/d\theta r \approx \Delta\varphi/\Delta\theta r \quad (11)$$

$$= (tc \times \omega r \times \Delta t \times R \times Bsat)/(\omega r \times \Delta t)$$

$$= tc \times R \times Bsat$$

The voltage Vx across a winding outputting the torque is given as follows:

$$Vx = Nw \times d\varphi/dt \quad (12)$$

$$= Nw \times d\varphi/d\theta r \times d\theta r/dt$$

$$= Nw \times tc \times R \times Bsat \times \omega r$$

The input power Pin and output torque T of the motor are thus given as follows:

$$Pin = 2 \times Vx \times Ix = T \times \omega r \quad (13)$$

$$= 2 \times Nw \times tc \times R \times Bsat \times Ix \times \omega r \quad (14)$$

$$T = 2 \times Nw \times Vx \times Ix/\omega r \quad (15)$$

$$= 2 \times Nw \times tc \times R \times Bsat \times \omega r \times Ix/\omega r$$

$$= 2 \times Nw \times tc \times R \times Bsat \times Ix$$

In this way, the torque T in the non-liner operation range As of the soft magnetic member is proportional to both the saturated magnetic flux density Bsat and the current Ix. The torque characteristics with respect to the rotor position shown in FIG. 5 shows a range between operating points Tn and Ts. The maximum torque T is naturally proportional to the number Nw of wining times of a winding for each phase, the thickness tc in the motor in the rotor axial direction AX, and the radius R of the rotor, as well.

Modern design of motors in recent years commonly require compactness in size, lower production cost, and weight saving. Therefore, designing magnetic circuits for motors frequently utilizes the magnetically saturated region.

Figure 25:
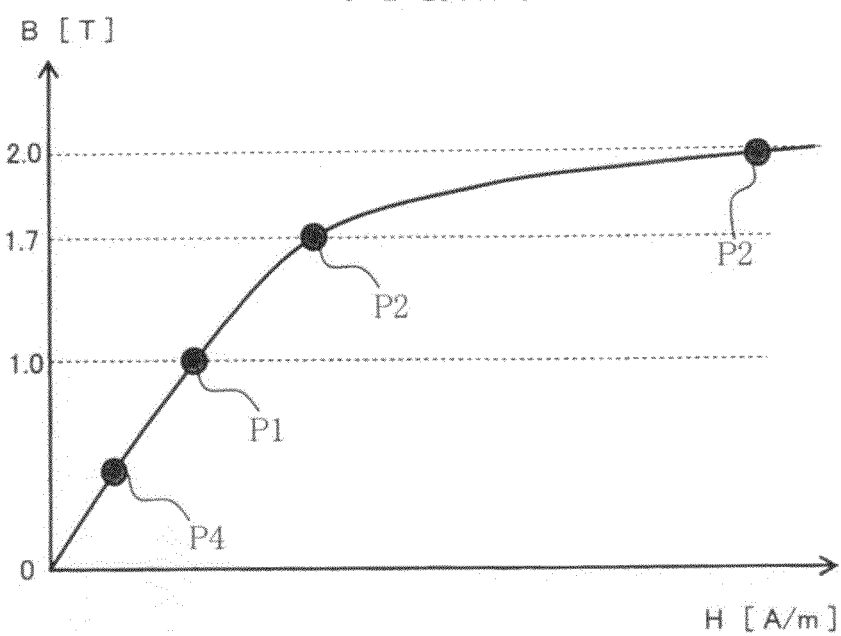
FIG. 25 is a graph showing a magnetic characteristic of silicon steel plate.

FIG. 25 exemplifies a characteristic between a magnetic field strength H [A/m] and a magnetic flux density B [T] of a soft magnetic member made of for example silicon steel sheets. An operating point P1 indicates a 1.0 T or thereabouts which defines a magnetically linear range. Another operating point P2 indicates 1.7 T or thereabouts which define a comparatively magnetically liner range. Another operating point P3 defines a magnetically non-linear range. A motor frequently has an operating point which resides in such a non-linear range when the motor generates a peak torque. The descriptions are made in the embodiments according to the present invention on the assumption that the motor is used in various operating-point ranges including the foregoing electromagnetically non-linear range.

An important issue here is that, when the motor shown in FIG. 4 is driven by the drive circuits shown in FIGS. 19, 20 and 21, it is possible to supply power which is twice as much as the power defined by the current Ix and the voltage Vx of the winding, as shown by formula (8). In addition, the number of transistors in the drive circuits in FIGS. 19 and 21 is three, resulting in a large reduction in a current capacity necessary for each transistor, compared with the drive circuit for the conventional brushless motor shown in FIG. 45. In other words, when the same amount of output is desired to obtain from motors, a total current capacity for the transistors can be reduced ½ or ¼ theoretically in the motor system according to the present invention, compared with the conventional motor systems shown in FIGS. 43, 44, 45 and 46. Additionally the drive circuits can be produced in compact sizes, lower costs, and an energy efficient manner. The reasons for those respects will now be detailed as follows.

Essential features of the motor and its control apparatus according to the present invention, which is shown in FIG. 4 for instance, are that the respective winding currents are DC, the current of each winding can contribute to torque generation at stator poles located adjacently to each winding on both sides, and increasing and decreasing three DC currents enables drive in the four quadrants defined by the clockwise and counterclockwise directions CW and CCW and forward and reverse torques.

Thanks to these features, the motor structure and control apparatus configuration can be linked closely, providing a compact-size control circuit. In this respect, the control apparatus shown in FIG. 19 will be detailed as an example. Assumption is made such that the voltage of the DC voltage supply 2E is 200 V and the current capacity of each transistor is 10 A.

Additionally assume that the rotor of the motor in FIG. 4 rotates at a rotation speed ωr and arrives at a rotation position θr=90° shown in FIG. 9, and a current of 10 A is supplied to the two windings W14 and W52 which are serial connections of two windings W1 and W4 and W5 and W2, respectively. In this case, it is also assumed that a magnetic flux density in a space between mutually faced stator and rotor poles is approximately 2.0 T, which is a saturated magnetic flux density magnetically saturated by supply of the current of 10 A. The voltage Vx of each of the windings W14 and W52 is provided as shown by formula (12). As shown in (a) of FIG. 4, the windings W14 and W52 have the same amount of an interlinkage magnetic flux φ so that an rotation change rate dφ/dt is also the same value at the windings W14 and W52. Assumption is also made that the voltage provided by formula (12) is just 200 V. In this case, a power P1, which is an output from the inverter and also an input to the motor, can be expressed as follows:

$$P1 = (200 \text{ V}) \times (10 \text{ A}) \times (2 \text{ windings}) \quad (16)$$
$$= 4000 \text{ [W]}$$

Figure 45:
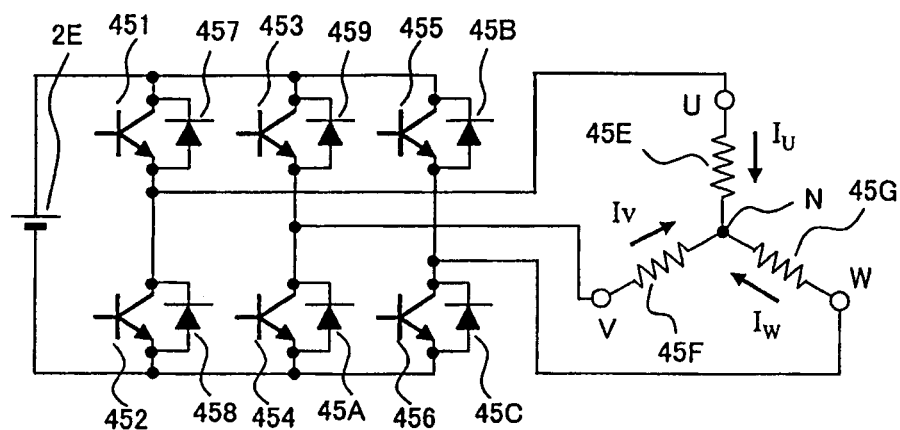
FIG. 45 is a circuit diagram showing the configuration including an inverter to drive the brushless motor shown in FIGS. 43 and 44 and windings.

Meanwhile the conventional three-phase AC control circuit shown in FIG. 45 is well known, and this circuit is used for comparison with the foregoing one. Assume that a three-phase AC motor connected to this control circuit has a star connection. A maximum output from this motor will now be estimated. When a voltage of 200 V is supplied from the DC voltage supply 2E and each transistor is given a current capacity of 10 A, and, as a result, it assumed that a voltage of 200 V is applied from the U-phase winding 45E to the V-phase winding 45F and a maximum current of 10 A is supplied. In this case, an input power P2 to the motor is as follows:

$$P2 = (200 \text{ V}) \times (10 \text{ A}) \quad (17)$$
$$= 2000 \text{ [W]} \quad (18)$$

Incidentally, when the U-phase winding 45 E supplies current, half-and-half, to the V-phase and W-phase windings 45F and 45G, a power which is approximately the same amount as the above case is supplied. That is, in the system shown in FIG. 45, when the motor windings induces a voltage which is close to the voltage of the DC voltage supply 2E, three-phase sine-wave currents are supplied at a degree that the maximum current of transistors now being used becomes equal to the peak currents of the three-phase sine-wave currents. In response to this current supply, although there are phases in the three-phase currents, the motor can provide an output approximately the same lave as the above.

Further, a combination of the motor in FIG. 9 with the control circuit in FIG. 19 is compared with the ordinarily used three-phase AC motor and inverter shown in FIG. 45. In this case, the three transistors provide an output of 4000 W, while the six transistors provide an output of 2000 W. Comparison of the output per transistor shows a quadruple increase in the output power. This means that, under a condition of being an equal output, the comparison shows that the combination of the motor in FIG. 9 and the control apparatus in FIG. 19 can be operated by only three transistors, which is half of the conventional, and the current capacity necessary for each transistor is also half, i.e., 5A, while still outputting a power of 2000 W equal to the conventional. It should be noted that the circuitry shown in FIG. 19 needs arrangement of the DC voltage supply 5A and the transistors 24, 25 and 26 need to have a withstand voltage higher than 200 V. It is also noted that the price of transistors depends largely on their current capacities, not on the withstand voltage so much. That is, for example, making the withstand voltage two-times higher does not always results in an increase in the transistor price which is proportional to withstand voltages.

A motor for auxiliary devices for vehicles, which is driven at an on-vehicle battery voltage 12 V, normally uses transistors from 40 to 100 or more than 100. When the DC-DC converter shown in FIG. 2 is shared by plural motors and each motor is driven by three transistors, the drive apparatus can be simplified greatly.

In vehicles such as electric cars and hybrid cars, two or motors are often used for driving the car. Normally attention is paid to mileage in the urban-area running mode, that is, drive efficiency. Of course, though depending on types of vehicles, torque necessary for drive in the urban-area running mode is often ½ or less than ½ of the maximum torque of a motor. Accordingly, a motor-side generation capacity in the regeneration, that is, a regeneration capacity, is sufficient even if this is ½ or less than ½ of a maximum output capacity necessary for rapid acceleration. When a vehicle is required to be decelerated rapidly, it is preferable that a mechanical brake system be additionally used for enhancing safety.

Figure 2:
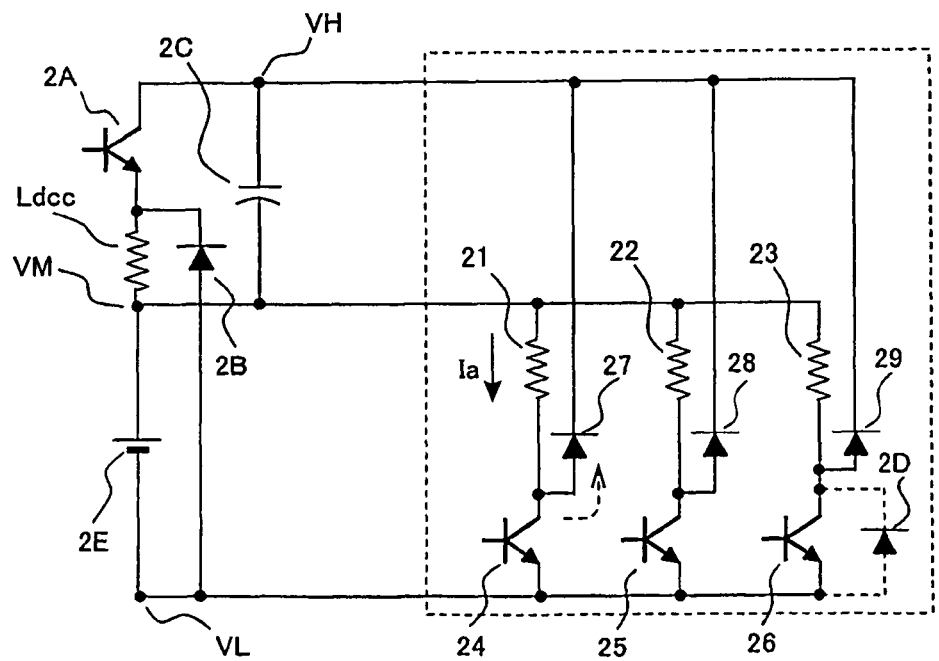
FIG. 2 is a circuit diagram showing a drive circuit for the motor shown in FIG. 1.

From this point of view, the DC-DC converter shown in FIG. 2 can be shared by plural motors, and the drive circuit for driving one motor can be regarded as a configuration provided with three transistors 24, 25 and 26 and three diodes 27, 28 and 29. Hence, the inverter enclosed by a dashed line in FIG. 2 is simplified such that a combination of the three transistors and three diodes can drive the one motor, leading lower production cost. Additionally, a voltage drop in the forward direction on the current and a voltage drop across a diode in the regeneration are approximately ½ compared to the ordinal three-phase AC inverter shown in FIG. 45, thus being efficient in energy consumption and making the inverter more compact due to being less heat generated therefrom.

A drive circuit shown in FIG. 20 will now be described.

As described already, this circuit is a DC three-phase converter. In the control circuit in FIG. 20, the DC-DC converter described with FIG. 19 is unnecessary. Now assumption is made such that, in the driven state shown in FIG. 9, the DC voltage supply 2E supplies a voltage of 200 V and each transistor has a current capacity of 10 A. When the DC voltage supply 2E outputs the maximum voltage and the maximum current to each of the serially connected windings W14 and W52, a maximum output P3 from the power supply side to the motor side is as follows:

$$P3 = (200\ V) \times (10\ A) \times (2\ \text{windings}) \quad (19)$$
$$= 4000\ [W]$$

In the configuration in which the three-phase AC motor is connected to the three-phase AC inverter in FIG. 45 via the star connection, the maximum output P2 was 2000 W, so that a combination of the motor in FIG. 9 and the control apparatus in FIG. 20 can provide an output power which is twice as much as that of the above. Under the output powers being equal to each other, ½ of the current capacity, that is, a current capacity of 5 A is enough. This configuration can also reduce production cost largely, compared with the conventional motor system.

A control circuit shown in FIG. 21 eliminates the use of the DC voltage supply 5A, unlike that shown in FIG. 19, thus lowering production cost largely. However, the windings are wound in the bifilar wound manner, making the construction completed a little, raising winding resistance reducing a current waveform rate. Hence, in actual applications, it is necessary to pay attention to an increase in copper loss which is Joule heat loss.

In driving a DC motor in its variable-speed four quadrants, four transistors are necessary. A control circuit for DC motors is practically configured such that, for example, in FIG. 45, the elements 455, 456, 45B and 45C are removed and the windings 45E and 45F are replaced by windings of a DC motor itself. This will generate torque in the forward and reverse directions. For this torque generation, each of the transistors requires a current capacity which is twice a current capacity required by a transistor employed by the control apparatus according to the present invention which is shown in FIG. 20. The current capacity required by the control circuit of the motor system according to the present invention becomes relatively lower down to 6/(4×2)=6/8 of that required in the conventional, leading to lower production cost and making the structure more compact. Furthermore, the combination of the motor according to the present invention which is shown in FIG. 4 and the control apparatus shown in FIG. 20 consumes a current capacity of, relatively, ⅜ of that consumed by the DC motor, leading to a further reduction in the production cost.

The motor shown in FIG. 4 is featured by various advantages including an advantage that the winding can be produced easily due to the fact that they are annular; an advantage that the motor can be driven on DC currents; and an advantage that the total current capacity needed by a drive circuit can be reduced. The reasons why the total current capacity can be reduced in the control circuit the motor in FIG. 4 lie in the facts that magnetic flux passing through each stator pole does not alternate but passes in only one way; the windings for the respective phases operate on DC currents and each winding is used in common to excite two stator pole groups located adjacently to a slot with the winding mounted therein; and the interlinkage magnetic fluxes from two windings which are active on currents are the same.

Third Embodiment

An AC motor according to a third embodiment of the present invention will now be described, which relates to claim 3.

Figure 22:
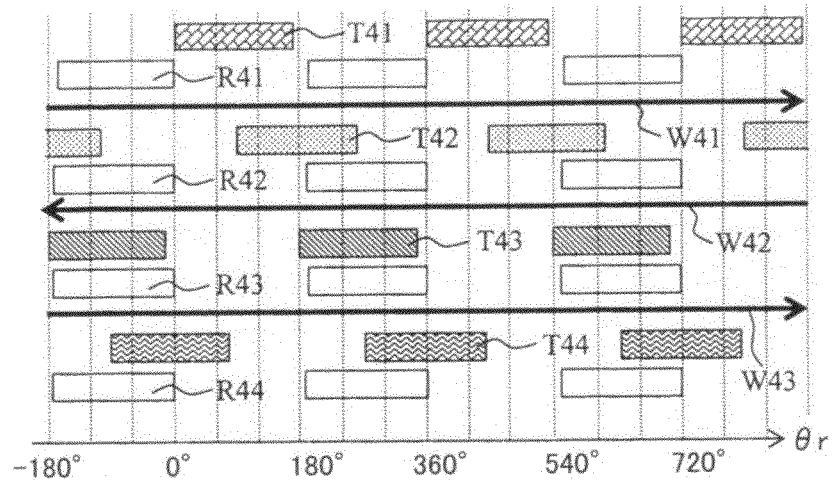
FIG. 22 is a linearly developed view of a circumferential shape of a motor provide with 4 stator pole groups and one rotor salient pole in a range defined by an electrical angle of 360 degrees.

Although FIG. 10 shows that 6 stator salient poles having different phases and two types of rotor salient poles having different phases are present in a range of an electrical angle of 360 degrees, FIG. 22 shows that 4 stator salient poles having different phases and one type of rotor salient poles having different phases are present in a range of an electrical angle of 360 degrees. Stator salient poles T41, T42, T43 and T44 are arranged at positions which provide a phase difference of 90 degrees therebetween, whilst rotor salient poles R41, R42, R43 and R44 are arranged at a position having the same phase. Annular windings W41, W42 and W43 are accommodated in slots each produced between stator pole groups in the rotor axial direction AX, similarly to the motor shown in FIG. 4. In this example, in the range of an electrical angle 360 degrees, the number of stator salient poles arranged is even and one rotor salient pole is arranged.

In the motor shown in FIG. 6, the stator salient pole T42 is magnetically excited at the rotation position of $\theta r=180°$, thus generating a magnetic flux $\phi 42$ passing through the rotor salient pole R42. The magnetic flux becomes an attraction force, and this force exerts a force to move the rotor salient pole R42 rightward in the drawing. The stator salient pole T42 is actually magnetically excited by supplying DC currents I41 and I42 to the windings W41 and W42 in directions shown by arrows. As shown in FIG. 4, the magnetic flux $\phi 42$ passes through the rotor back yoke, the rotor and stator salient poles R43 and T43 or the rotor and stator salient poles R44 and T44, and the stator back yoke, and then return to the stator salient pole T42, thus making the magnetic flux $\phi 42$ go around the closed loop. In this state, the stator salient poles T43 and T44 generate torque oppositely in the direction to that generated by the stator salient pole T42. A sum of magnetic path areas, SS34, of the stator salient poles T43 and T44, which areas face the rotor salient poles, is sufficiently larger than an area SS2 of the stator salient pole T42, which area faces the rotor salient pole T42. Since, the magnetic flux density at the stator salient poles T43 and T44 is sufficiently small, a negative torque generated by the stator salient poles T43 and T44 will cause no practical problem. A magnetic flux density at the areas of the stator salient poles T43 and T44 which faces the rotor becomes "SS2/SS34" of the magnetic flux density at the area of the stator salient pole T42 which faces the rotor.

In the motor shown in FIG. 22, a stator salient pole is magnetically excited to generate torque in a direction in which the motor is desired to rotate. A magnetic flux φ generated responsively to this excitation goes around a closed loop through other stator salient poles and rotor salient poles. In this case, a necessary condition is that a negative torque generated by the other stator salient poles is sufficiently small. When the rotor starts to rotate from the rotor rotation position θr from the rotation state shown in FIG. 22, stator salient poles being magnetically excited are changed in turn to subsequently obtain torque for motor continuous rotation, as explained with FIGS. 7, 8 and 9.

Figure 23:
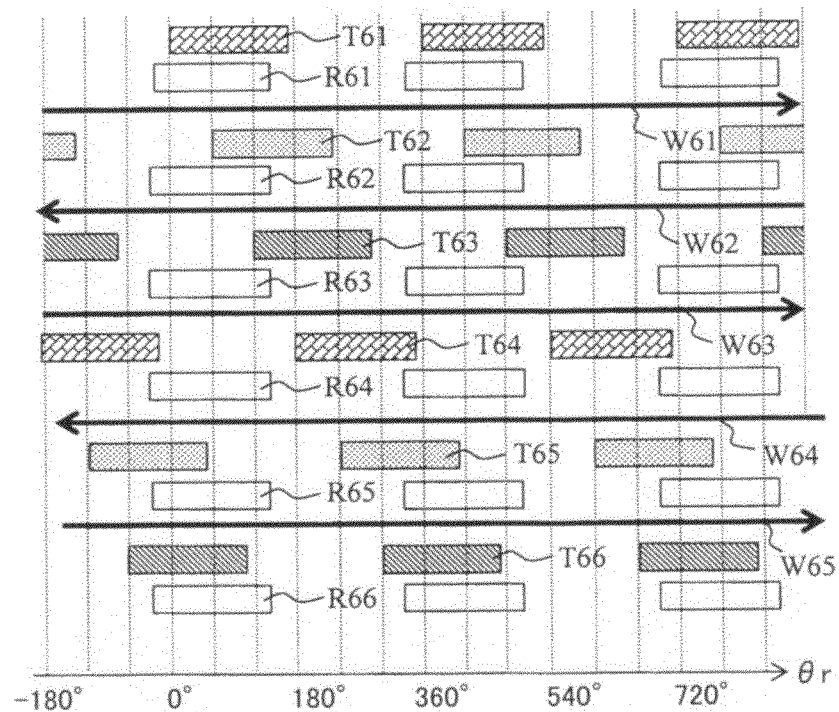
FIG. 23 is a linearly developed view of a circumferential shape of a motor provide with 6 stator pole groups and one rotor salient pole in a range defined by an electrical angle of 360 degrees.

Although FIG. 10 shows that 6 stator salient poles having different phases and two types of rotor salient poles having different phases are present in a range of an electrical angle of 360 degrees, FIG. 23 shows that 6 stator salient poles having different phases and one type of rotor salient poles having different phases are present in a range of an electrical angle of 360 degrees. Stator salient poles T61, T62, T63, T64, T65 and T66 are arranged at positions which provide a phase difference of 60 degrees therebetween, whilst rotor salient poles R61, R62, R63, R64, R65 and R66 are arranged at a position having the same phase. Annular windings W61, W62, W63, W64 and W65 are accommodated in slots each produced between stator pole groups in the rotor axial direction AX, similarly to the motor shown in FIG. 4. In this example, in the range of an electrical angle 360 degrees, the number of stator salient poles arranged is even and one rotor salient pole is arranged.

The motor shown in FIG. 23 operates as follows. At a rotation position θr=150°, the stator salient pole T62 is magnetically excited so that an attraction force is generated between the rotor salient pole R62 and the stator salient pole T62 on account of generation of a magnetic flux φ62 therebetween. This will cause a force exerting on the rotor salient pole R62 such that this pole is shifted rightward in the drawing. In parallel, the stator salient pole T63 is magnetically excited, causing a magnetic flux φ63 between the rotor salient pole R63 and the stator salient pole T73. This magnetic flux results in an attractive force generated therebetween so as to move the rotor salient pole R63 rightward in the drawing.

In order to magnetically excite the stator salient pole T62, DC currents I61 and I62, which are opposite to each other in the directions as shown by arrows, are supplied to the windings W61 and W62 to generate the magnetic flux φ62. Further, for magnetically exciting the stator salient pole T63, DC currents I62 and I63, which are opposite to each other in their directions as shown by arrows, are supplied to the windings W62 and W63 to generate the magnetic flux φ63. The current to the winding W63 is a sum of the foregoing two current components.

The directions of the magnetic fluxes φ62 and φ63 are opposite to each other, the magnetic flux φ63 passes through the stator salient pole T63, the stator back yoke, the stator salient pole T62, the rotor salient pole R62, the rotor back yoke, and the rotor salient pole R63, and returns to the stator salient pole T63. As clearly shown in FIG. 23, with regard to areas of stator and rotor salient poles which are faced with each other and magnetic fluxes passing therethrough, the stator salient pole T62 is larger than the stator salient pole T63 by an amount corresponding to an electrical angle of 60 degrees. Accordingly, roughly, the magnetic flux of "φ62-φ63" is imbalanced, being caused to pass through the stator salient poles T61, T64, T65 and T66. A sum of areas of the stator salient poles T61, T64, T65 and T66, which face the rotor salient poles, is sufficiently large, causing a density of the magnetic flux to be smaller relatively. Hence, a force caused due to the imbalanced magnetic fluxes will be small enough and cause no practical problem.

In the motor shown in FIG. 23, two sets of stator salient poles, which are able to generate torque in a desired rotation direction, are magnetically excited to generate the torque. An imbalanced component of the generated magnetic flux φ is made go around a loop via other stator salient and rotor poles. A condition necessary for this passing of the magnetic flux is that the negative torque generated by the other stator salient poles is sufficiently small. As can be understood from the motor configuration in FIG. 23, magnetically excitation of 2 or 3 stator salient pole groups mutually adjacently located in the rotor axial direction AX enables the respective stator poles to generate the torques in the same rotation direction.

In the state shown in FIG. 23, when the rotor is rotated from the current rotor rotation position θr shown therein, sequentially changing stator salient poles being magnetically excited results in obtaining torque for the continuous rotation, as shown in FIGS. 7, 8 and 9. Although not shown, similarly to the motor system in FIG. 23, an even number of stator salient poles, such as 8 poles or 10 poles, may be arranged in a range of an electrical angle of 360 degrees Fourth Embodiment An AC motor according to a fourth embodiment of the present invention will now be described. This embodiment relates to claim 4.

Figure 24:
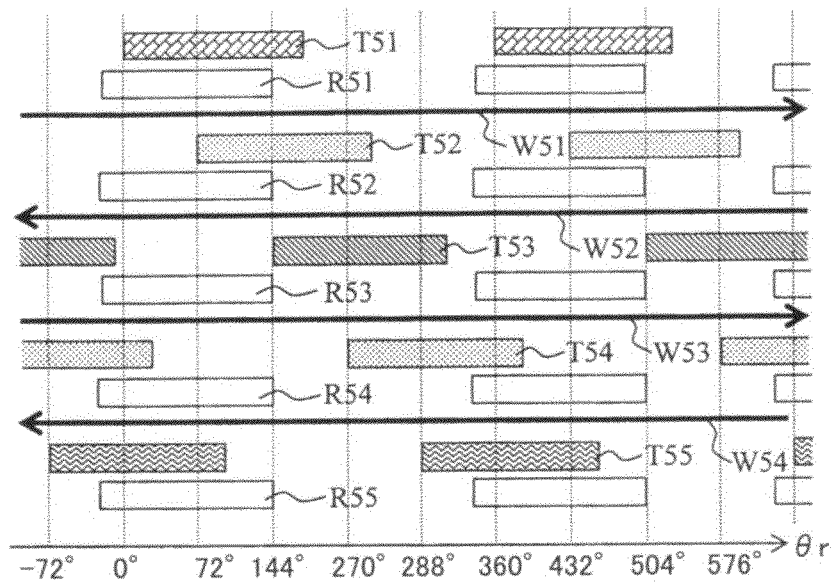
FIG. 24 is a linearly developed view of a circumferential shape of a motor provide with 5 stator pole groups and one rotor salient pole in a range defined by an electrical angle of 360 degrees.

Although FIG. 10 shows that 6 stator salient poles having different phases and two types of rotor salient poles having different phases are present in a range of an electrical angle of 360 degrees, FIG. 24 shows that 5 stator salient poles having different phases and one type of rotor salient poles having different phases are present in a range of an electrical angle of 360 degrees. Stator salient poles T51, T52, T53, T54, and T55 are arranged at positions which provide a phase difference of 72 degrees therebetween, whilst rotor salient poles R51, R52, R53, R54 and R55 are arranged at a position having the same phase. Annular windings W51, W52, W53 and W54 are accommodated in slots each produced between stator pole groups in the rotor axial direction AX, similarly to the motor shown in FIG. 4. In this example, in the range of an electrical angle 360 degrees, the number of stator salient poles arranged is odd and one rotor salient pole is arranged.

The motor shown in FIG. 24 operates as follows. At a rotation position θr=144°, the stator salient pole T52 is magnetically excited so that an attraction force is generated between the rotor salient pole R52 and the stator salient pole T52 on account of generation of a magnetic flux φ52 therebetween. This will cause a force exerting on the rotor salient pole R52 such that this pole is shifted rightward in the drawing. In parallel, the stator salient pole T53 is magnetically excited, causing a magnetic flux φ53 between the rotor salient pole R53 and the stator salient pole T53. This magnetic flux results in an attractive force generated therebetween so as to move the rotor salient pole R53 rightward in the drawing. This is similar to the motor shown in FIG. 23.

In order to magnetically excite the stator salient pole T52, DC currents I51 and I52, which are shown by arrows, are supplied to the windings W61 and W62 to generate the magnetic flux φ52. Further, for magnetically exciting the stator salient pole T53, DC currents I52 and I53, which are shown by arrows, are supplied to the windings W52 and W53 to generate the magnetic flux 53. The current to the winding W53 is a sum of the foregoing two current components.

The directions of the magnetic fluxes φ52 and φ53 are opposite to each other, the magnetic flux φ53 passes through the stator salient pole T53, the stator back yoke, the stator salient pole T52, the rotor salient pole R52, the rotor back yoke, and the rotor salient pole R53, and returns to the stator salient pole T53. As clearly shown in FIG. 24, with regard to areas of stator and rotor salient poles which are faced with each other and magnetic fluxes passing therethrough, the stator salient pole T52 is larger than the stator salient pole T53 by an amount corresponding to an electrical angle of 72 degrees. Accordingly, roughly, the magnetic flux of "φ52-φ53" is imbalanced, being caused to pass through the stator salient poles T51, T54 and T55.

A sum of areas of the stator salient poles T51, T54 and T55, which face the rotor salient poles, is sufficiently large, causing a density of the magnetic flux to be smaller relatively. Hence, a force caused due to the imbalanced magnetic fluxes will be small enough and cause no practical problem.

In the motor shown in FIG. 24, two sets of stator salient poles, which are able to generate torque in a desired rotation direction, are magnetically excited to generate the torque. An imbalanced component of the generated magnetic flux φ is made go around a loop via other stator salient and rotor poles. A condition necessary for this passing of the magnetic flux is that the negative torque generated by the other stator salient poles is sufficiently small. As can be understood from the motor configuration in FIG. 24, magnetically excitation of 2 stator salient pole groups mutually adjacently located in the rotor axial direction AX enables the respective stator poles to generate the torques in the same rotation direction.

In the state shown in FIG. 24, when the rotor is rotated from the current rotor rotation position θr shown therein, sequentially changing stator salient poles being magnetically excited results in obtaining torque for the continuous rotation, as shown in FIGS. 7, 8 and 9.

Although not shown, similarly to the motor system in FIG. 24, an odd number of stator salient poles, such as 7 poles, 9 poles or 11 poles, may be arranged in a range of an electrical angle of 360 degrees Alternatively, in the motor shown in FIG. 23, it is possible to interchange the positions of the start salient poles T61, T63 and T65 induce the same directional magnetic flux. Similarly, it is possible to interchange the positions of the start salient poles T62, T64 and T66 induce the same directional magnetic flux. By arranging the windings such that current components of the respective windings are not allowed to be superposed on one another, the current capacity of each of the transistors can be reduced, response of current can be improved, and copper loss can be reduced. Interchanging the windings and its advantages are also true of the motors shown in FIGS. 22, 24 and others.

With reference to FIG. 26, a motor provided with 6 stator salient poles and 4 rotor salient poles and three sets of windings driven on DC currents will now be described.

In the past, the present inventor(s) discloses Japanese Patent Application Nos. 2008-292142 and 2009-119063, to which the present embodiment is similar to some extent. In addition, the present embodiment has similar points to the motor shown in FIG. 1, but there differences therebetween though.

The motor in FIG. 26 includes stator salient poles M77, M78, M79, M7A, M7B and M7C which have electromagnetic actions on the rotor Each winding is arranged to be wound in each of slots formed between stator salient poles. References M71 and M74 show A-phase windings, and corresponding dashed lines show a path of its coil end portion. As shown by current symbols, one-way current is supplied to each phase winding. That is, the motor is controlled by DC currents, not by AC currents. References M73 and M76 show B-phase windings, and corresponding dashed lines show a path of its coil end portion. Further, references M75 and M72 show C-phase windings, and corresponding dashed lines show a path of its coil end portion. These windings are wound at pitches of an electric angle of 180 degrees in a full-pitch winding manner. The windings are also wound in a concentrated wounding manner.

A rotor M7D is provided with four salient poles made of a soft-magnetic material. In the motor shown in FIG. 1, for the sake of an easier visual understanding of electromagnetic actions, the number of stator and rotor salient poles is minimized to just show an example. It is often to give a multi-polarity construction to the motor, such as 8 poles and 16 poles, for making the motor compact. A rotor rotation position θr can be defined as an angle from the positive winding center of the A-phase to the edge of the rotor pole in the counterclockwise direction CCW. The width of each salient pole of the stator and rotor in the circumferential direction CR is approximately 30 degrees in this example, however this is just an example and may be modified in various manners.

The motor shown in FIG. 26 is a reluctance motor which generates torque by utilizing differences of magnetic resistance of the rotor depending on its directions. The motor shown in FIG. 1 is a reluctance motor which generates torque by utilizing differences of magnetic resistance of the rotor depending on its directions. The direction passing the salient poles 1E and 1H presents a smaller amount of magnetic resistance, while directions passing through spaces 1D presents larger amounts of magnetic resistance. When it is required to generate torque in the counterclockwise direction CCW, as shown by an arrow M7F from the rotation position θr shown in FIG. 26, currents are supplied through the A-phase windings M71 and M74 and the C-phase windings M75 and M72 as depicted by the current symbols. This will cause magnetic flux φa, shown by an arrow M7E, to be induced in a direction going from the stator salient pole M7A to the stator salient pole M77. As a result, between stator poles and the rotor salient poles, an attraction forces is generated, which leads to generation of torque shown by the arrow M7F in the CCW direction. As the rotation of the rotor advances, such an attraction force is generated at sequentially shifted positions in the circumferential direction, leading to continuous rotation torque. As will be described later, if permanent magnets are implemented in the motor shown in FIG. 26, the power factor can be improved, the torque can be increased, and the efficiency can be increased.

Figure 27:
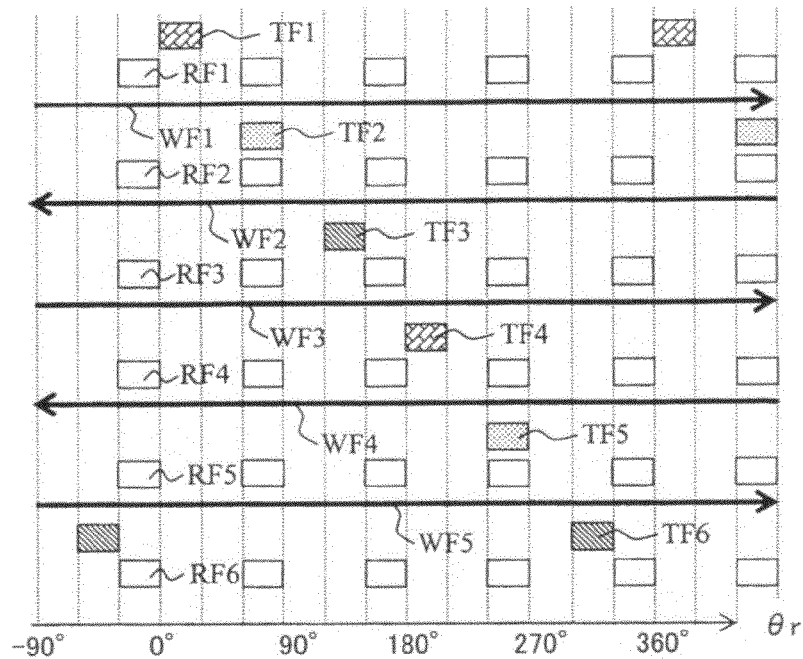
FIG. 27 is a linearly developed view of a circumferential facing plane between stator poles and rotor salient poles of a motor provided with annular windings.

By converting the motor configuration shown in FIG. 26, the motor configuration shown in FIG. 4 can be provided which uses annular windings. FIG. 27 shows a linearly developed view of a plane in the circumferential direction CR, in which the stator and rotor salient poles are opposed to each other with the plane therebetween. The motor in FIG. 27 resembles in its construction that shown in FIG. 7. Stator salient poles TF1, TF2, TF3, TF4, TF5 and TF6 for respective phases are arranged at positions in the circumferential direction CR such that such poles have a phase difference defined by an electrical angle of 60 degrees. Rotor salient poles RF1, RF2, RF3, RF4, RF5 and RF6 are arranged to have the same phase. It is assumed in the drawing that a relative positional relationship between the stator and the rotor is such that the stator and stays on the front side of the drawing paper and the rotor poles stay on the rear side of the drawing paper. The windings WF1, WF2, WF3, WF4 and WF5 are arranged respectively in slots each formed between the stator salient poles for the respective phases, and subject to current supply to allow currents to be passed therethrough as illustrated by arrows in the drawing. When it is decided that the upper side of the rotor shaft 1 in FIG. 4 acts as an output shaft, the direction of current through the winding WF1 is a counterclockwise direction CCW and that through the winding W2 is a clockwise direction CW, around the output shaft when being viewed from the top.

In the motor in FIG. 27, in a range of an electrical angle of 360 degrees, the stator salient pole TF1, TF2, TF3, TF4, TF5 and TF6 for respective phases of the motor are arranged one by, while the rotor salient poles RF1, RF2, RF3, RF4, RF5 and RF6 are arranged four by four. Annular windings WF1, WF2, WF3, WF4 and WF5 are arranged in the respective slots each formed between stator salient poles in the rotor axial direction AX. The motor configuration in FIG. 27 is analogous in electromagnetic actions to the motor in FIG. 26, though some mattes such as shapes are different therefrom.

In the motor configuration in FIG. 27, the directions of winding currents are directions of one-way currents, and each stator salient pole has a magnetic characteristic defined by pass of the same directional magnetic flux. Hence, every rotor salient pole, the same-phase stator salient poles can be added, which is exemplified in FIG. 28 where the stator salient poles TF1, TF2, TF3, TF4, TF5 and TF6 for each phase are increased fourfold. In this state, compared with the motor in FIG. 27, torque being outputted becomes fourfold as well. In this way, the stator salient poles can be added for increasing the torque, which is one of the features of the present invention.

Figure 28:
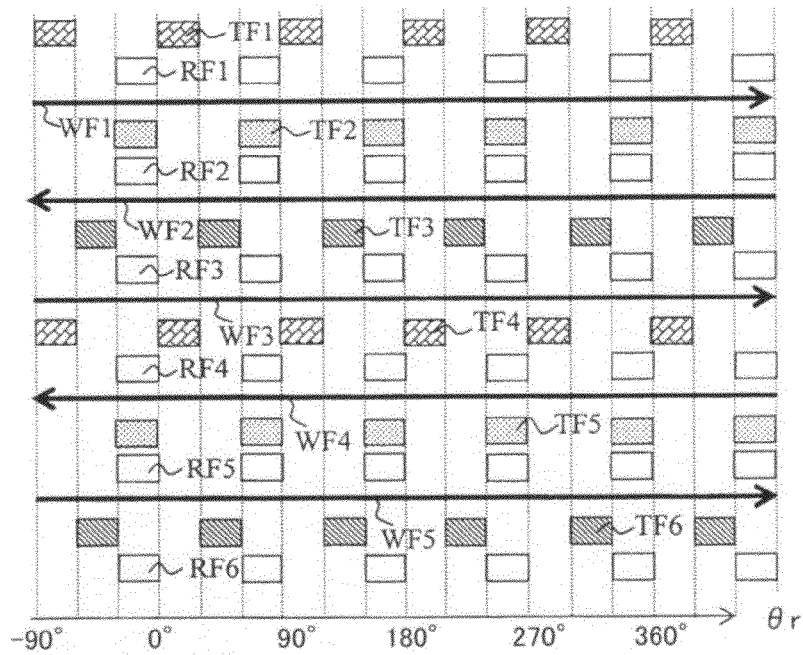
FIG. 28 is a view realized by rotating by 30 degrees from the rotor position in the motor shown in FIG. 27.

A comparison between the motor configurations shown in FIGS. 28 and 7 reveals that both motors are resembled with each other in terms of electromagnetic actions, and provide approximately the same characteristics. Differences of the motor configuration in FIG. 28 from that in FIG. 7 are that the electrical angle at the rotor rotation position θr is ½; the angle of the width of each stator salient pole in the circumferential direction CR is ⅔; the stator salient poles TF2 and TF3 are arranged oppositely in the rotor axial direction; the stator salient poles TF5 and TF6 are arranged oppositely in the rotor axial direction; and, due to the fact that the stator salient poles are arranged differently, timings at which respective currents are supplied differ. These matters are not essential to motors, just differences in addressing and/or design, so that it can be said that both motors in FIGS. 28 and 7 are the same type of motors. In the motors in FIGS. 28 and 7, the stator salient poles can be interchanged in their positions in the rotor axial direction.

How to generate torque which allows the rotor to shift rightward in the drawing of FIG. 28, that is, how to drive the rotor, will now be described. At the rotor rotation position θr=0° in FIG. 28, the stator salient poles TF1 and TF4 are magnetically excited to generate a magnetic flux passing through those stator and rotor salient poles, which causes an attraction force therebetween. This results in generating the torque. Since it is needed to magnetically excite only the stator salient poles TF1 and TF4, the same amount of currents are supplied to the windings WF1, WF3 and WF4 according to the directions shown by arrows. The magnetic flux passing through the stator salient pole TF1 makes a circuit via the stator salient pole TF4. Depending on amplitudes of current, amounts of torque are changed.

At the rotor rotation position θr=45° in FIG. 28 in which torque is required to shift the rotor rightward in the drawing, the stator salient poles TF3 and TF6 are magnetically excited to generate a magnetic flux passing through those stator and rotor salient poles, which causes an attraction force therebetween. This results in generating the torque. Since it is needed to magnetically excite only the stator salient poles TF3 and TF6, the same amount of currents are supplied to the windings WF2, WF3 and WF5 according to the directions shown by arrows. The magnetic flux passing through the stator salient pole TF3 makes a circuit via the stator salient pole TF6. Depending on amplitudes of current, amounts of torque are changed. The electromagnetic actions in FIG. 28 resemble the actions at the rotor rotation position θr=90° in FIG. 9

Figure 29:
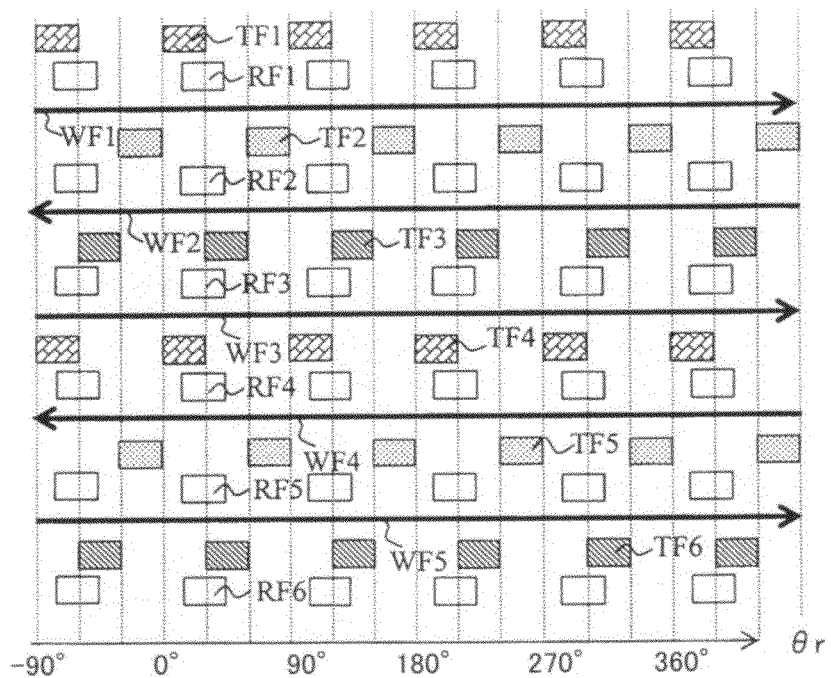
FIG. 29 is a view realized by rotating by 60 degrees from the rotor position in the motor shown in FIG. 27.

Incidentally, it has been described such that, in the motors in FIGS. 7, 29 and other drawings, the amounts of currents to the windings are equal to each other, it is not always necessary to use such currents. This is just for explaining the basic drive method. Practically imbalanced currents can be used to drive windings. When such imbalanced currents are used, magnetic fluxes are induced through the stator and rotor salient poles according to Ampere's law, resulting in a total amount of torque which is a sum of torques induced at various portions. Particularly, for a high-speed rotation, there are various requests for a current supply method to overcome a limitation of the response of currents and lower noise. This current supply method is basically different in a torque generating algorithm from that needed in a low-speed rotation. Through the embodiments, such requests for a high-speed rotation can be met.

Fifth Embodiment

An AC motor according to a fifth embodiment of the present invention will now be described. The present embodiment relates to the invention of claim 5.

Figure 17:
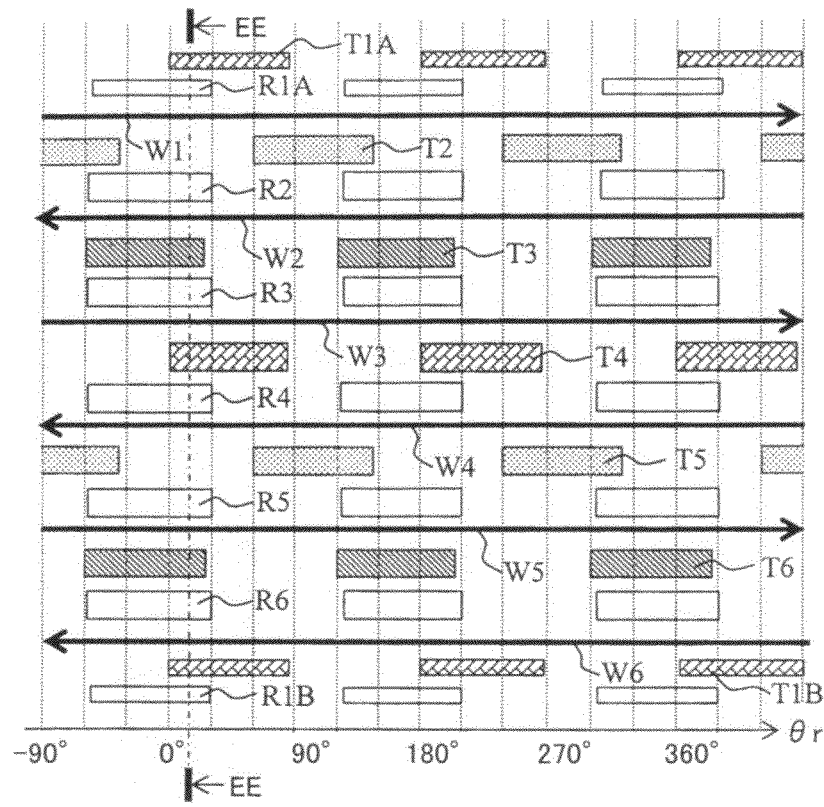
FIG. 17 is a linearly developed view of a circumferential plane at which stator poles and rotor salient poles face with each other in a motor, which has stator poles at one end in the axial direction, which stator poles is changed in shape.

FIG. 17 shows a modification of the motor shown in FIGS. 4, 8 and 11. In the structure in FIG. 17, the stator salient pole T1 shown in FIG. 8 is divided into stator salient poles T1A and T1B, the rotor salient pole R1 in FIG. 8 is divided into rotor salient poles R1A and R1B, and winding W6 is added. The characteristics of the motors shown in FIGS. 4 and 17 are almost identical to each other. A longitudinal view of a section along a line EE-EE is shown in FIG. 18, in which an A-phase magnetic flux φa is divided into magnetic fluxes M43 and M44. A magnetic flux M45 is a d-phase magnetic flux φd. The widths of the divided stator salient poles and the divided rotor salient poles are set to be equal to those of the motor in FIG. 4 in terms of electromagnetic actions, provided that M46=M41+M42 in FIG. 18. The motor configurations in FIGS. 17 and 18, the winding W6 is arranged inside the magnetic circuit, so the winding W6 cannot be omitted from the configuration.

In this way, the winding W6 is required to be arranged, with the result that the drive circuits in FIGS. 13 and 14 should have a transistor and a diode to supply current to the winding W6, similarly to the other windings. The motor configuration in FIG. 18 corresponds to a modification of the motor of FIG. 1, where the stator pole 17 and the back yoke are magnetically divided at a middle point between the windings 11 and 12 in the circumferential direction CR The motors shown in FIGS. 4 and 18 have been described such that the motors have 6 types of stator poles, but can be modified more. For example, in order that conventional motors, such as a motor shown in FIG. 44, can be developed not only into three-phase AC motors but also two-phase AC motors, 4-phase AC motors, and 5-phase motors as developments of the 3-phase motor, types of the stator poles in FIGS. 4 and 18 can be changed into 4 types, 5 types, 7 types, 8 types or others.

Sixth Embodiment

An AC motor according to a sixth embodiment of the present invention will now be described. The present embodiment relates to the invention of claim 7.

Figure 30:
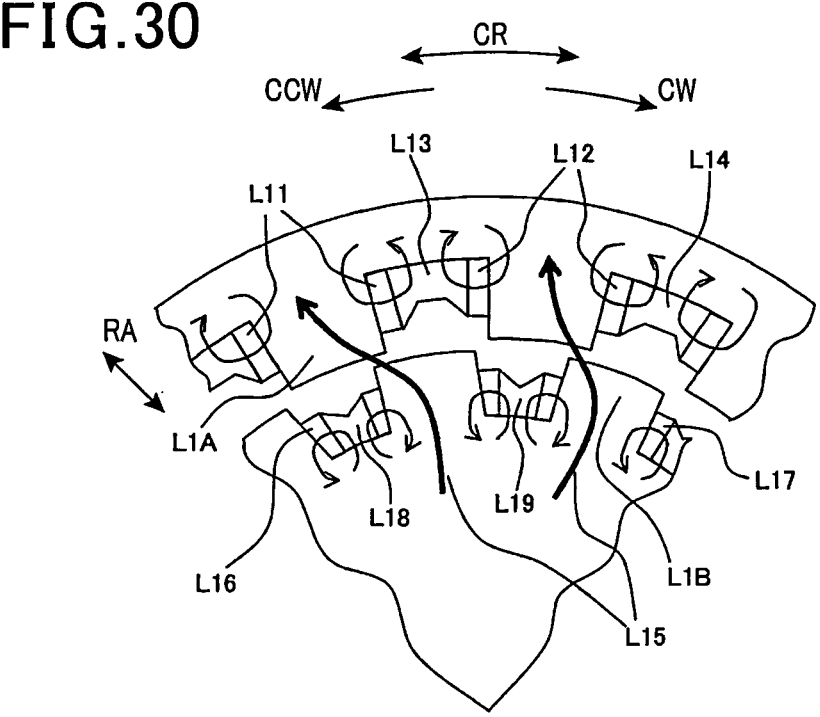
FIG. 30 exemplifies both a construction where permanent magnets and a soft magnetic material are arranged between teeth of the stator pole group in the circumferential direction and a construction where permanent magnets and a soft magnetic material are arranged between rotor salient poles in the circumferential direction.

FIG. 30 shows a view of stator salient poles, which is an enlarged view of part of the cross section shown in FIG. 5. FIG. 30 includes a view of stator salient poles L1A and rotor salient poles L1B both of which belong to the same phase of the motor. This embodiment relates to a technique of increasing torque by increasing a magnetic flux passing through the stator and rotor salient poles L1A and L1B. FIG. 30 also shows a part of the section along the line EA-EA in FIG. 4. The magnetic flux $\phi a$, which is induced by a winding current in FIG. 4, is shown by heavy arrows L15 in FIG. 30. This magnetic flux $\phi a$ generates a torque for the rotor, which acts in the counterclockwise direction CCW in the drawing.

The torque generated by the stator pole group in FIGS. 5 and 30 has a limit, which is due to magnetic saturation of the stator salient pole L1A or magnetic saturation of the rotor salient pole L1B.

In order to reduce the magnetic salutation of the stator salient pole L1A, permanent magnets L11 and L12 and soft magnetic members L13 and L14 are added as shown. Each permanent magnet has magnetic poles which generates a magnetic flux whose direction, which is shown by arrows shown at each permanent magnet, is opposite to a magnetic flux $\phi a$ passing through the stator salient poles L1A. This opposite-directional magnetic flux is realized by arrangement of the permanent magnet.

Figure 32:
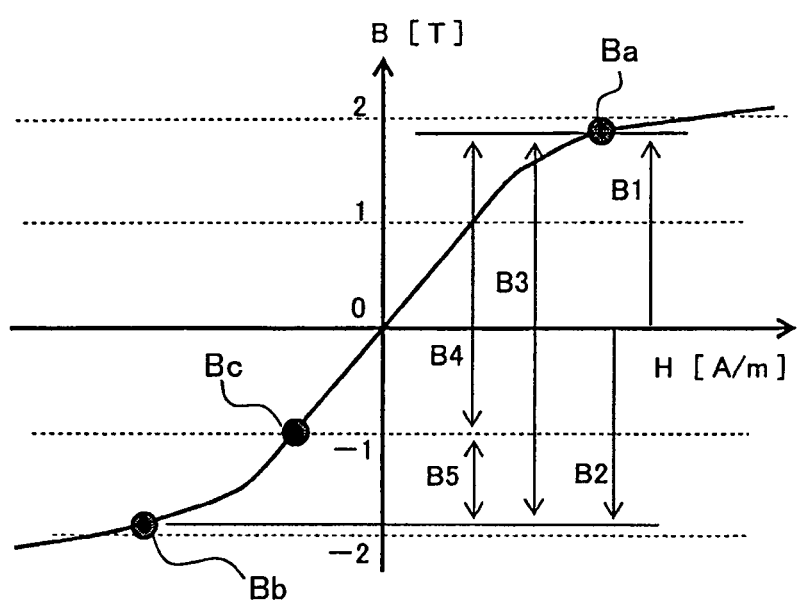
FIG. 32 is a graph showing a magnetic characteristic for the configurations shown in FIGS. 30 and 31.

Now, a magnetic flux density Bg in an air gap between the stator salient poles and the rotor salient poles which are opposed to each other will be examined when a stator salient pole is at a rotor rotation position $\theta r$. In the configuration in FIG. 5, when the magnetomotive force applied to the stator salient pole is zero, the magnetic flux density Bg is zero, but given as Ba, for example, for a larger amount of magnetomotive force. The magnetic flux $\phi a$ passing through the stator salient pole is proportional to a magnetic flux density B1. If it is possible to offset the magnetic flux density of each stator salient pole L1A to a point Bc in FIG. 32 using the permanent magnets L11 and L12, the magnetic flux passing through the stator salient pole L1A can be increased up to a point B4 in FIG. 32. According to a simple theory in this case, adding the permanent magnets enables the torque to increase "B4/B1" times. FIG. 32 shows a magnetic characteristic of a soft magnetic material composing the stator and rotor salient poles, which shows a relationship between the strength H of magnetic field and the density B of magnetic flux.

If the magnetic flux density of the stator salient pole L1A can be offset to a point Bb in FIG. 32 using the permanent magnets L11 and L12, the magnetic flux which can pass through the stator salient pole L1A shall increase to a point B5 in FIG. 32. A simple theory shows that the torque can be increased "B3/B1" times by adding the permanent magnets.

As shown by formulae (10) and (15), the torque is proportional to a magnetic flux density g at a space which has the stator and rotor salient poles opposed to each other. Referring to formula (10), it can also be said that the torque is proportional to a rotation change rate $d\phi/d\theta r$ of the magnetic flux $\phi$ passing through the stator salient pole. Accordingly, as shown by a difference B4 between the points Ba and Bc in FIG. 32, a larger amount of the rotation change rate $d\phi/d\theta r$ makes it possible to increase "torque constant Kt=torque T/current I" and a motor maximum torque. Since the motor current I can be decreased with an increase in the torque constant Kt, the copper loss can be decreased, leading to improvement in the motor efficiency and making the motor more compact in size.

Incidentally, when the currents of the respective windings of the motor are zero, most of the magnetic fluxes induced from the permanent magnets L11 and L12 make closed loops within the stator. As a result, the motor runs idle, iron loess in the motor remains at smaller values. When the motor runs idle due to engine drugging travel or others, the iron loss in the motor may be problems in some applications.

As the soft magnetic members L13 and L14, permanent magnets can be used if the magnets generate magnetic fluxes in the directions as shown. The permanent magnets L11 and L12 can be arranged around the stator salient pole L1A, but may be arranged partially therearound.

The rotor salient poles L1B can adopt the same structure of the stator salient poles L1A, in which permanent magnets L16 and L17 and soft magnetic members L16 and L17 are added to each rotor salient pole. If the magnetic flux density of each rotor salient pole L1B can be offset to the point Bc in FIG. 32 by using the permanent magnets L16 and L17, the magnetic flux which can pass through each rotor salient pole L1B can be increased up to a value indicated by the point B4 in FIG. 32. A simple theory shows that torque can be increased "B4/B1" times by addition of the permanent magnets. Particularly, in the rotor salient poles, there are no windings around the rotor salient poles, with the result that it is easier to secure spaces in which the permanent magnets are installed additionally. In the same way as the rotor side, when the winding currents are zero, most of the magnetic fluxes induced from the permanent magnets L16 and L17 make closed loops within the rotor, causing less iron loss in idling run of the motor. When the torque is increased, it is necessary to increase amounts of magnetic fluxes which can pass through both the stator and rotor sides. Magnetic saturation in either the stator side or the rotor side will lead to a reduction of the torque being generated.

Figure 31:
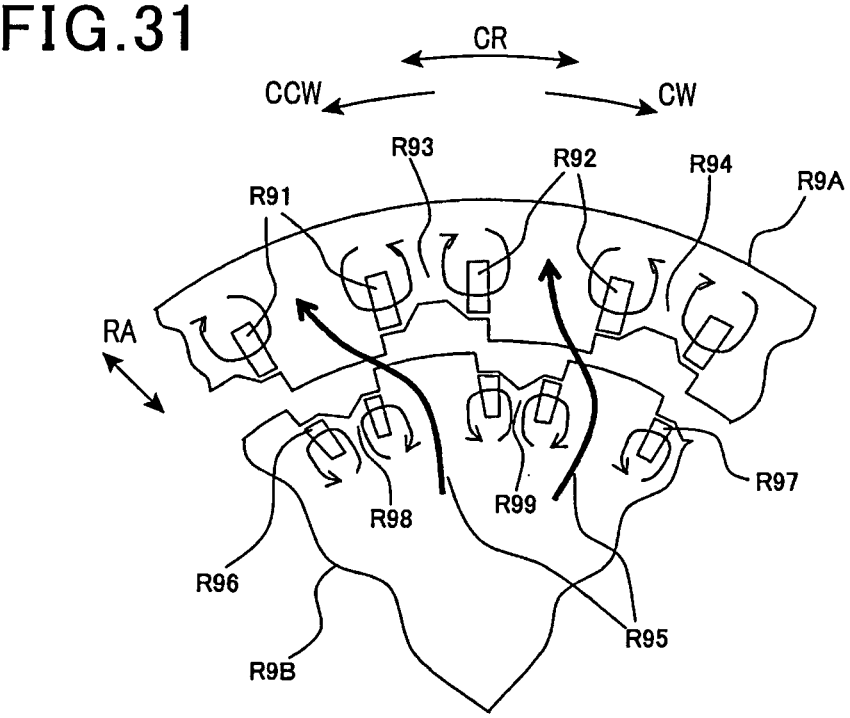
FIG. 31 exemplifies a construction where the permanent magnets of FIG. 30 are embedded in soft magnetic members of the stator and rotor.

Alternatively, as shown in FIG. 31, the permanent magnets L11, L12 and L16, L17, which are shown in FIG. 30, can be embedded in a stator core R9A and a rotor core R9B. This allows the permanent magnets to be secured easily, increasing securing strength therefor. References R91 and R92 shows the permanent magnets and the soft magnetic members R93 are integrated the stator core R9A. In the rotor side, the permanent magnets R96 and R97 are held within the rotor core R9B. Especially a centrifugal force exerts on the rotor, such a holding configuration is advantageous. How to secure the permanent magnets in the stator core R9A or the rotor core R9B is not confined to the securing configuration shown in FIG. 31, but can be modified in various ways. For example, an opening can be formed partially at the portion securing each permanent magnet such that part of the magnetic flux from the permanent magnet is prevented from leaking uselessly into the securing portion. This is advantageous in utilizing the magnetic flux from each permanent magnet.

Seventh Embodiment

An AC motor according to a seventh embodiment of the present invention will now be described. The present embodiment relates to the invention of claim 8.

Figure 33:
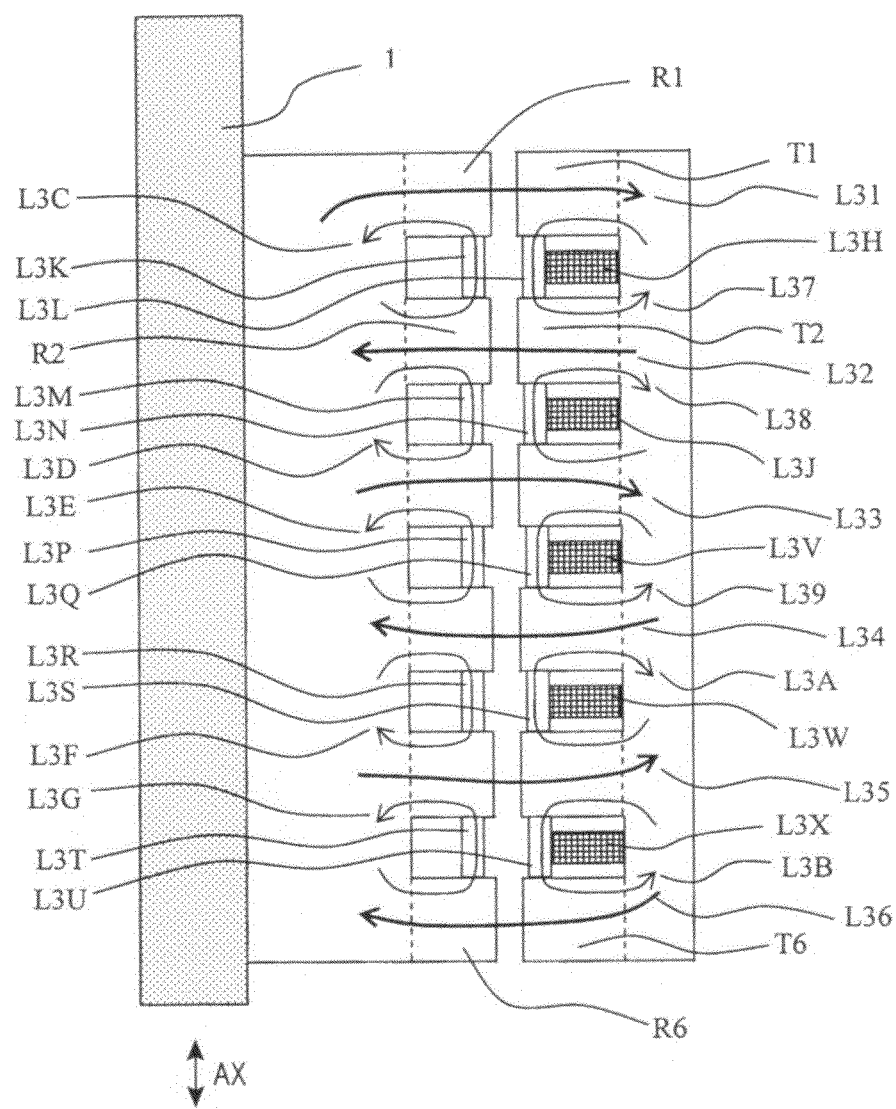
FIG. 33 exemplifies a motor in which, in the motor shown in FIG. 4, permanent magnets are arranged inside the annular windings in the radial direction and permanent magnets are arranged between salient poles of the rotor in the axial direction.

FIG. 33 show an enlarged view of the right half of the cross sectional view of FIG. 4 of the motor according to the present invention, in which permanent magnets are added. A magnetic flux L31 passing through the stator salient pole T1, a magnetic flux L32 passing through the stator salient pole T2, a magnetic flux L33 passing through the stator salient pole T3, a magnetic flux L34 passing through the stator salient pole T4, a magnetic flux L35 passing through the stator salient pole T5, and a magnetic flux L36 passing through the stator salient pole T6 are magnetic fluxes generated one way.

There are provided annular windings L3H, L3J L3V, L3W and L3X are wound in slots each formed between stator salient poles. One-way currents, that is, DC currents to magnetically excite the windings are supplied to control generation of the foregoing magnetic fluxes.

The motor configured in this manner and the motor configuration in FIG. 4 should overcome magnetic saturation of the stator salient poles. The magnetic saturation limits a maximum torque of the motor. For example, assume that a current is supplied to the winding L3H from the front to the rear in the drawing and a current is supplied to the winding L3J from the rear to the front in the drawing so that the magnetic flux L32 is induced to flow from the stator salient pole T2 to the rotor salient pole R2. Hence, the magnetic flux L32 is induced as expected, but at the same time, other magnetic fluxes are also induced. Such other magnetic fluxes are a leakage magnetic flux φL21 flowing from the stator salient pole T2 to the stator salient pole T1 and a leakage magnetic flux φL23 flowing from the stator salient pole T2 to the stator salient pole T3. In consequence, in the stator salient pole T2, there exist the magnetic fluxes L32, φL21 and φL23 which are directed in the same way, thus increasing the magnetic flux density in the stator salient pole T2, thus causing magnetic saturation therein. The leakage magnetic fluxes φL21 and φL23 are reactive fluxes, whereby the power factor of a motor is decreased and a motor voltage is increased.

In order to solve these drawbacks, permanent magnets are arranged between stator salient poles such that the magnetic flux from each permanent magnet becomes opposite to the leakage flux. This arrangement leads to advantages of alleviating the magnetic saturation at the stator salient pole and reducing the leakage flux. As shown in FIG. 33, positions for this arrangement are closer to the rotor than the windings. For example, concerning with the stator salient pole T2, a permanent magnet L3L is arranged by considering the polarity such that a magnetic flux L37 is generated in a direction shown by an arrow, and a permanent magnet L3N is arranged by considering the polarity such that a magnetic flux L38 is generated in a direction shown by an arrow. This alleviates the magnetic saturation of the stator magnetic pole T2 and reduces the leakage fluxes φL21 and φL23. In this case, the magnetic fluxes L37 and L38 from the permanent magnets L3L and L3N are opposite in directions to the leakage fluxes φL21 and φL23.

Hence, the advantages of improving the magnetic saturation can be gained as described with FIG. 32. That is, by adding the permanent magnets L3L and L3N, the operating point in FIG. 32 can be offset from the origin to the point Bc, thereby the operating range for the magnetic flux density of the stator salient poles can be widened from the range B1 to the range B4. Hence, an amount of the magnetic flux L32 flowing into the rotor salient poles from the stator salient poles can be larger. Operations and advantages resulting from these are true of the other permanent magnets L3Q, L3S and L3U arranged respectively between other stator salient poles.

The advantages of the stators-side permanent magnets shown in FIG. 33 can also be true of the rotor side. Between two of rotor salient poles R1, R2, R3, R4, R5 and R6, each of permanent magnets L3K, L3M, L3P, L3R and L3T is arranged such that their magnet poles are oriented to generate magnetic fluxes shown by arrows L3C, L3D, L3E, L3F and L3G. The directions of those fluxes are opposite to the directions of magnetic fluxes L31, L32, L33, L34, L35 and L36 passing through each of the rotor salient poles.

The advantages gained with the configurations shown in FIGS. 30, 31, 32 and 33 are brought as the motor provided with the phase windings driven by DC currents, which is according to the present invention. That is, those advantages can be obtained because the magnetic fluxes passing the respective stator salient poles are one-way fluxes of which directions are set pole by pole. When the winding currents of the motor are zero, the magnetic fluxes emanating from each permanent magnet make closed loops therearound, being fewer in the space between the stator and rotor salient poles. Hence, iron loss for no load during the rotor rotation due to engine drugging travel becomes smaller.

The permanent magnets may be partially added to the motor. For example, only permanent magnets L3N and L3S can be added to the stator in the configuration in FIG. 33. The stator salient poles T1 and T6 at two ends in the rotor axial direction AX have leakage magnetic fluxes each passing on one side in the direction AX. Considering this fact, arranging only the magnets L3N and L3S still meets to a demand of keeping a degree of magnetic saturation obtained by the 6 stator salient poles.

Eighth Embodiment

An AC motor according to an eighth embodiment of the present invention will now be described. The present embodiment relates to the invention of claim 9.

Figure 34:
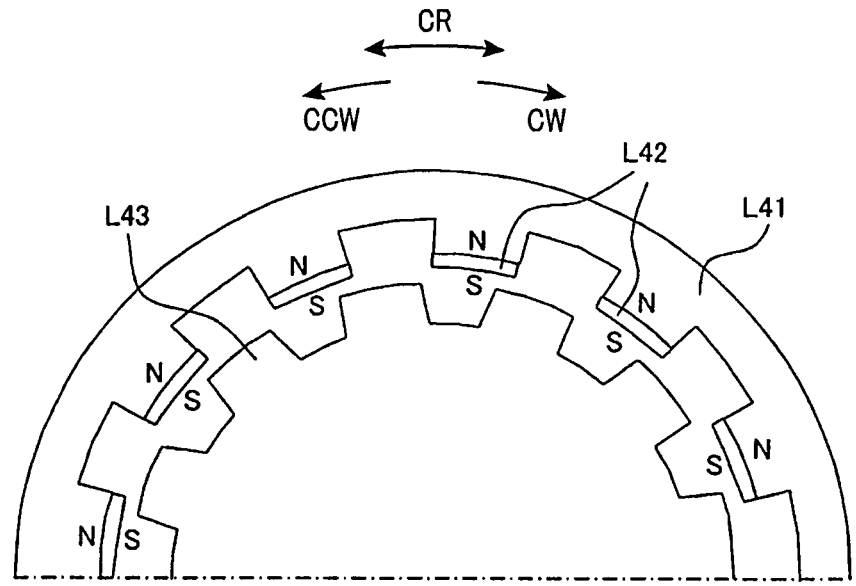
FIG. 34 is a view showing a motor in which permanent magnets are arranged on the surfaces of salient poles, the surfaces facing the rotor.

FIG. 34 is an enlarged view showing the upper half of the construction shown in FIG. 5 which is a section along a line EA-EA in FIG. 4. This shows a motor provided with permanent magnets attached on the surfaces of the stator salient poles, which surfaces are opposed to the rotor. A magnetic flux φa is oriented at this part from the inside to the outside in the radial direction. Hence, the directions of magnetic poles of a permanent magnet L42 on a stator L41 are set to be S-pole on the radially inside and N-pole on the radially outside.

Compared with the construction shown in FIG. 5, the construction of FIG. 34 provides the motor in which permanent magnets L42 are added, thus being able to compensate for currents needed for the excitation magnetic flux with that from the magnets. As a result, torque can be maintained or increased, improving energy efficiency of the motor. Particularly, in small-size motors, an incurring rate of the excitation magnetic flux is larger relatively, so that the advantage obtained from the use of permanent magnets is helpful. Incidentally, in the configuration shown in FIG. 34, the motor can cancel out cogging torque so as to be reduced as a whole, even if each stator pole group generates torque with the cogging torque.

Figure 35:
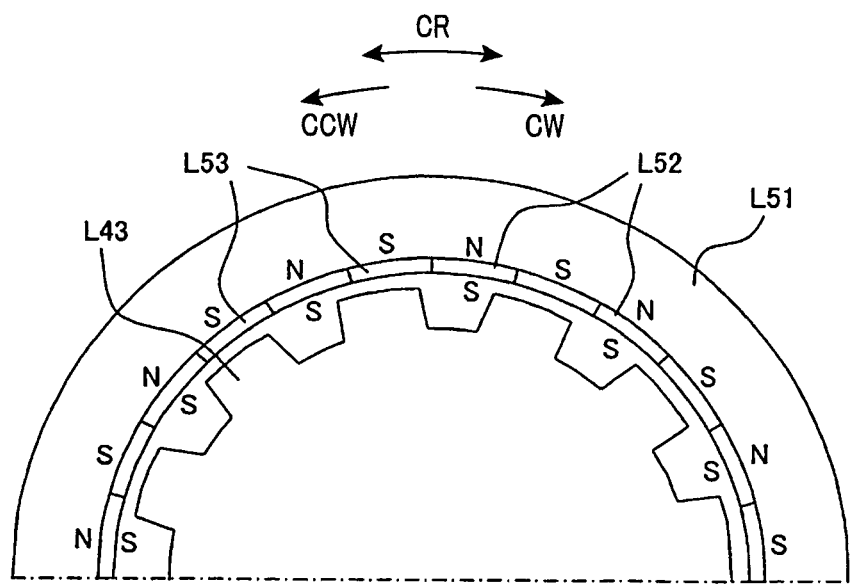
FIG. 35 is a view showing a motor in which N-pole and S-pole permanent magnets are arranged alternately, in the circumferential direction, on the radially inner surfaces of stator poles made of soft magnetic material.

FIG. 35 shows an example modified from the construction shown in FIG. 34. This example show a motor provided with reverse-polarity permanent magnets L53 arranged at recessed portions of the stator shown in FIG. 34.

Hence, as shown, on the inner circumferential side of the stator, N-pole magnets L52 and S-pole magnets L53 are arrayed alternately in the circumferential direction CR. Therefore, the rotation change rate dφ/dθ of a magnetic flux passing through each rotor salient pole L43 is theoretically double in comparison with the construction of FIG. 34. This allows the motor of FIG. 35 to have larger amounts of torque, but being less cogging torque.

Figure 36:
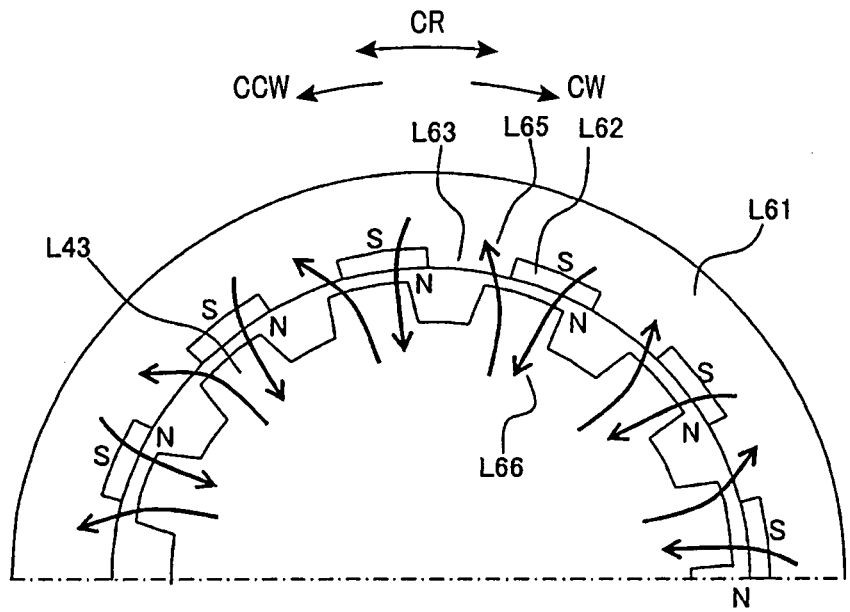
FIG. 36 is a view showing a motor in which N-pole permanent magnets and soft magnetic members are arranged alternately, in the circumferential direction, on the radially inner surfaces of stator poles made of soft magnetic material.

The motor configuration of FIG. 35 can still be modified as shown in FIG. 36, in which the permanent magnets L52 are replaced with soft magnetic members.

Figure 37:
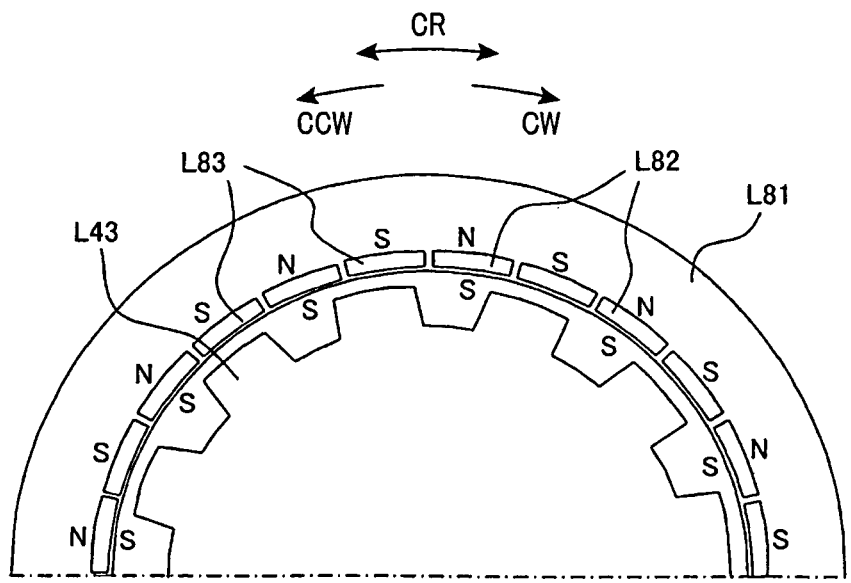
FIG. 37 is a view showing a motor in which the permanent magnets, which correspond to that shown in FIG. 35 are embedded in the stator made of soft magnetic material.
Figure 38:
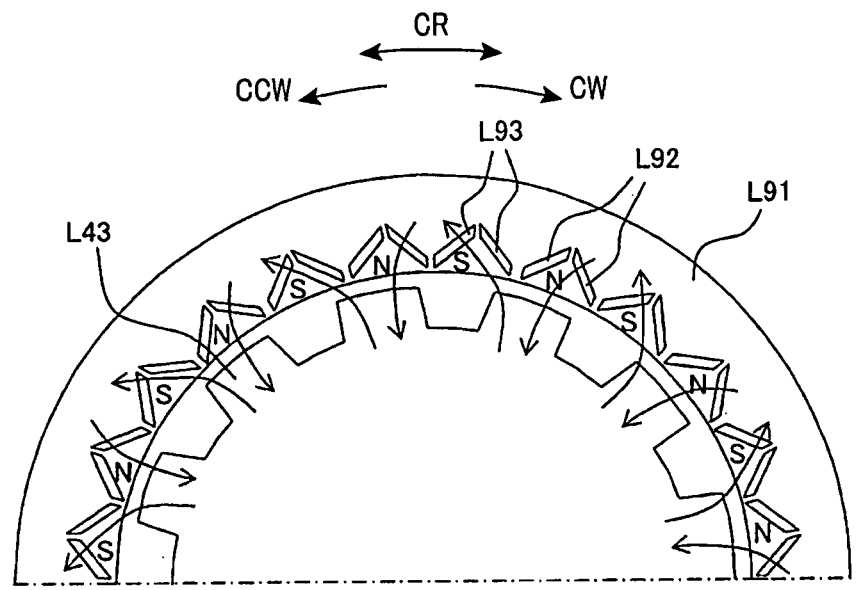
FIG. 38 shows an example in which the permanent magnets, which are shown in FIG. 37, are arranged at different positions.

In this motor construction, supplying currents to windings to generate a magnetic flux L65 makes it possible to obtain the similar operations to the motor shown in FIG. 35. Hence, it is possible to reduce the permanent magnets in half, lowering production cost. Further, the stator salient poles and permanent magnets are structured to be, what is called, surface magnet type in FIG. 35, while the permanent magnets are embedded within the stator salient poles as shown in FIG. 37. In the later, holding and securing the permanent magnets L82 and L83 are easier. Furthermore, as shown in FIG. 38, the permanent magnets L92 and L93 can be arranged in various ways. Although not shown, there motors can have additional magnets attached to the surfaces of the rotor salient poles. Magnets can be additionally arranged to both of the stator and the rotor.

Ninth Embodiment

An AC motor according to a ninth embodiment of the present invention will now be described. The present embodiment relates to the invention of claim 10.

Figure 39:
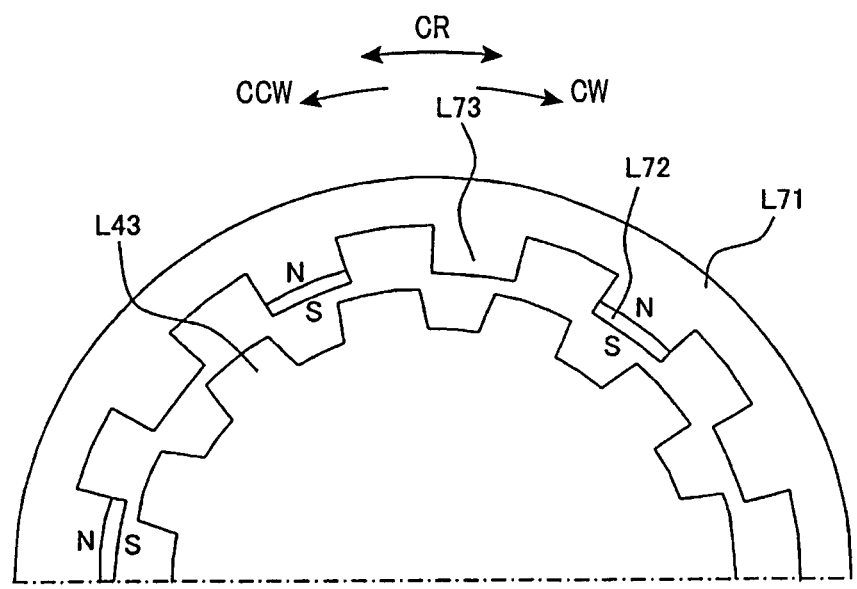
FIG. 39 exemplifies a motor in which the number of magnets, which are arranged on the stator pole surfaces in the construction shown in FIG. 34, is reduced in half.

FIG. 39 shows a motor provided with a stator having stator poles with permanent magnets 72 and other stator poles formed to be salient and made of soft magnetic material but with no permanent magnets. By arranging the magnet magnetic poles and soft-iron magnetic poles in a mixed manner, a motor is able to have intermediate magnetic characteristics between types of constructions with or without magnets. For example, if a motor is required to output a constant power, it is necessary to control magnitudes of field magnetic fluxes. In this regards, appropriately mixing both types of stator magnetic poles in their arrangement makes it easier to design motors having desired characteristics.

Tenth Embodiment

An AC motor according to a tenth embodiment of the present invention will now be described. The present embodiment relates to the invention of claim 11.

Figure 40:
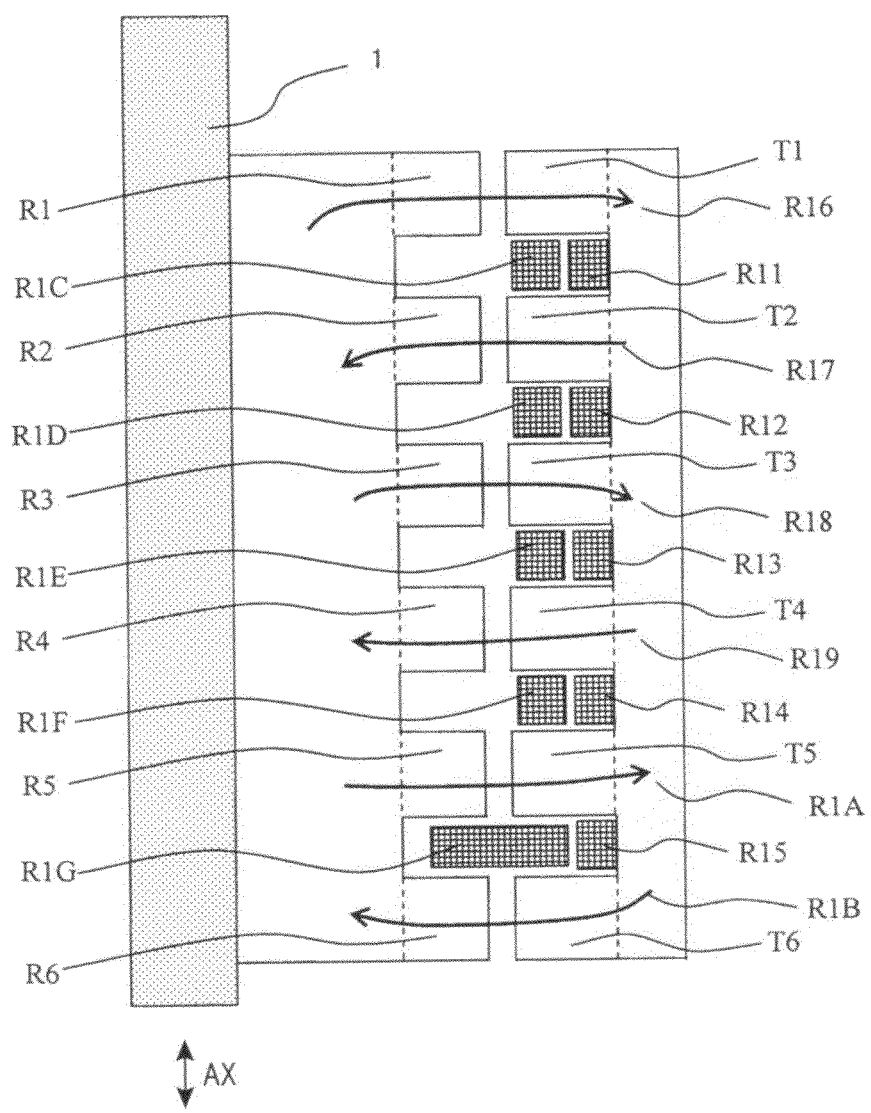
FIG. 40 show a motor in which field winding are added to the construction of the motor shown in FIG. 4.
Figure 41:
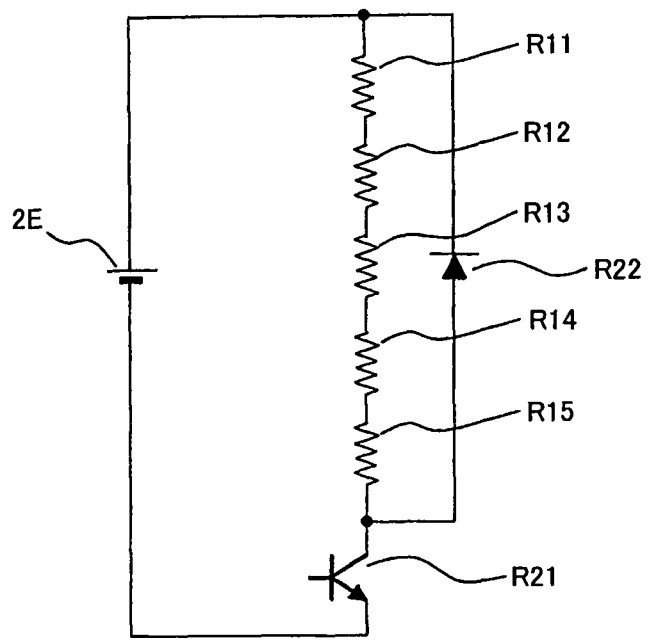
FIG. 41 exemplifies a drive circuit to supply currents to serially connected field windings for the respective phases shown in FIG. 40.

FIG. 40 is an enlarged view of the right half of the section of the motor shown in FIG. 4 according to the present invention, in which field windings R11, R12, R13, R14 and R15 are added. There are also arranged windings R1C, R1D, R1E, R1F and R1G which are mainly for being supplied with currents for torque, but it is possible to additionally supply the field currents thereto. The respective stator salient poles accept passing of magnetic fluxes R16, R17, R18, R19, R1A and R1B, as indicated by flux direction symbols. As shown in FIG. 41, the field windings R11, R12, R13, R14 and R15 are electrically connected in series to each other according to current directions given to the field current. This will apply the same magnetomotive force to all the stator salient poles for generating the field magnetic fields.

The field magnetic current are controlled by the DC voltage supply 2E and the transistor R21 and diode R22. During the rotation of the rotor, the field magnetic flux increases at any of the stator salient poles, while at the same time, the field magnetic flux decreases at another stator salient pole. Hence, field energy can be circulated within the motor via these serially connected windings. The drive of the field current can be simplified. The currents to the windings R1C, R1D, R1E, R1F and R1G for mainly the torque currents are supplied using the control circuits shown in FIGS. 19, 20, 21 or others. In this case, an amount of current corresponding to the field current can be reduced from the torque currents. As a result, the current capacity of the respective transistors can be made smaller, leading to compact control circuit and lowered production cost. Although the control circuit shown FIG. 41 is needed additionally in the present embodiment, the advantage that the control circuit in FIGS. 19, 20, 21 and others can be made compact in its construction can be contributed to the whole motor. Additionally response of the windings R1C, R1D, R1E, R1F and R1G to the currents can be improved, thus raising control performance of the motor.

Eleventh Embodiment

A control apparatus for an AC motor according to an eleventh embodiment of the present invention will now be described. The present embodiment relates to the invention of claim 12.

In a system in which a plurality of motors are driven in an controlled manner, a technique is provided of which control circuit can be simplified in construction, produced as lower production cost and made compact as a whole of the system. The motor here can be driven DC currents, which includes the motors shown in FIGS. 1 and 26 and DC motors.

Figure 42:
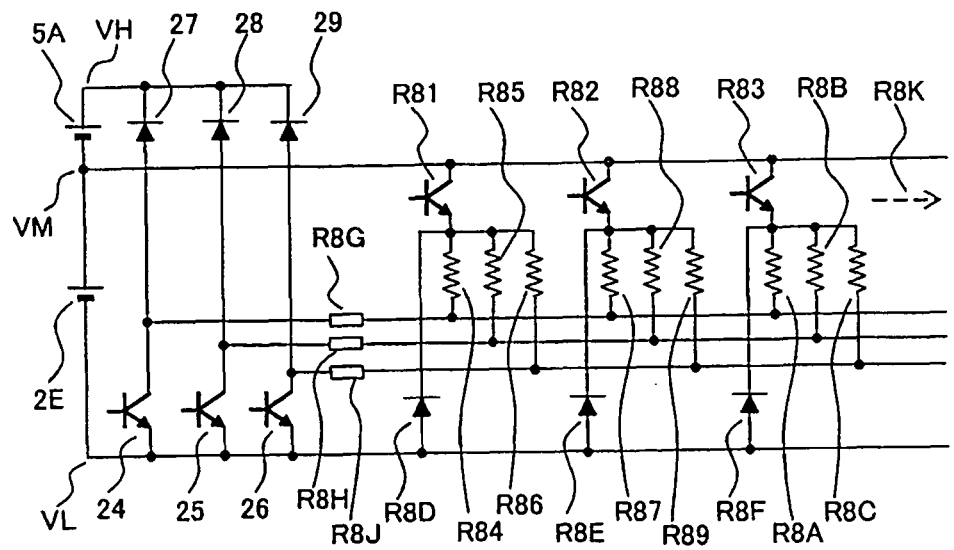
FIG. 42 exemplifies a circuit to drive plural motors according to the present invention.

A practical control circuit is shown in FIG. 42, in which windings for three motors M1, M2 and M3 are provided. There are also provided DC voltage supplies 2E and 5A, which are vehicle's batteries for example. Transistors R81, R82 and R83 function as N-piece power supply means ST to selectively supply voltages and currents to each of the motors, and selects which motor among the three motors M1, M2 and M3 should be driven.

There are provided respective phase windings R84, R85 and R86 for the motor M1, to which one-way currents, that is, DC currents, are supplied. For example, the windings of the motor M1 are composed of the A-phase windings W1, W4, the B-phase windings W3, W6, and the C-phase windings W5, W2 shown in FIG. 19. When the currents are supplied to the respective phase windings of the motor M1, the transistor R81 is switched on, whilst the transistors R82 and R83 are switched off.

There are also provided elements R8G, R8H and R8J serving as current detection means, which detect A-phase, B-phase and C-phase currents Ia, Ib and Ic, respectively. The current detection means can be shared by the plural motors, and if there is no need for detecting currents, the current detection means may be removed from the circuitry.

There are also provided transistors 24, 25 and 26 which serve as phase current supply means to supply DC currents to the phase windings respectively and drive A-phase, B-phase and C-phase currents I1a, I1b and I1c respectively. Also provided are diodes 27, 28 and 29, which allows the A-phase, B-phase and C-phase currents I1a, I1b and I1c to be fed to the DC voltage supply 5A individually such that magnetic energy which has been owned by each phase winding is regenerated to the supply 5A, in response to a switchover of each of the transistors 24, 25 and 26 from its on state to its off state. For example, switching on the transistor 24 allows the A-phase current I1a to be started to be fed to the winding R84. In contrast, responsively to switching off the transistor 24, the A-phase current I1a is sent to the DC power voltage supply 5A via the diode 27, whereby magnetic energy which has been stored in the winding R84 and part of kinetic energy of the motor are regenerated.

There is provided a diode R8D which is for overvoltage protection of the transistor R81. When the transistor R81 is switched off during supply of any of the A-phase, B-phase and C-phase currents I1a, I1b and I1c, an overvoltage is applied to the transistor R81. In such a case, current can be commutated to the diode R8D for the protection. Accordingly, as long as there is no switchover of the transistor R81 from its on to off states during such supply of the phase currents I1a, I1b and I1c, the diode R8D is not always necessary. This diode can be replaced by other overvoltage preventing devices such as voltage absorbers.

Arranging the diode R8D is effective in the sense of actively utilization. That is, this diode can speed up a reduction in overcurrent, especially in controlling larger amounts of currents in high speed rotation ranges. For example, when the transistors R81 and 24 are switched off during a time when the A-phase current I1a is supplied in response to switching on the transistors R81 and 24, the A-phase current I1a is supplied in series to both DC voltage supplies 5A and 2E via the diodes 27 and R8D. This will shorten a current reduction interval because the voltage being regenerated becomes larger. In addition, the regeneration mode can be realized in two modes, in one of which the transistor R81 is switched off and in the other of which the transistor R81 is switched on, being for selective use.

There are also provided respective phase windings R87, R88 and R89 for the motor M2, to which one-way currents, that is, DC currents, are supplied. To supply currents to the respective phase windings R87, R88 and R89 of the motor M2, it is required to switch on the transistor R82 and switch off the transistors R81 and R83. The currents are supplied to the respective phase windings R87, R88 and R89 in the same manner as that for the respective phase windings R84, R85 and R86 of the motor M1.

There are also provided respective phase windings R8A, R8B and R8C for the motor M3, to which one-way currents, that is, DC currents, are supplied. To supply currents to the respective phase windings R8A, R8B and R8C of the motor M3, it is required to switch on the transistor R83 and switch off the transistors R81 and R82. The currents are supplied to the respective phase windings R8A, R8B and R8C in the same manner as that for the respective phase windings R84, R85 and R86 of the motor M1.

Since the function necessary for the transistors R81, R82 and R83 which are selective power supply means ST to a motor, such transistors may be mechanical contacts such as relay contacts or mechanical switches or power semiconductors of types other than transistors, such thyristors. It is also needed for the power supply means ST to prevent a flow of reverse current, the power supply means should be elements to withstand the reverse voltage or connected in series to a diode to prevent the reverse voltage.

In this way, the circuitry shown in FIG. 42 includes the transistors 24, 25 and 26, the current detecting means R8G, R8H and R8J, and the diodes 27, 28 and 29, which are used in common by three motors M1, M2 and M3. Accordingly, the number of elements in the control circuit can be reduced. A practical example is as follows. Concerning the number of transistors, the conventional brushless motor shown in FIG. 45 needs 18 transistors to drive the three motors, while in the circuitry shown in FIG. 42, only 6 transistors are needed to drive the three motors. The number of transistors can be reduced down to ⅓, resulting in lower production cost and a more compact size of the circuitry. Reducing the number of transistors results in a proportional reduction of elements in a periphery circuit of the transistors, including drivers for the transistors, power supplies for the drives, and snubber circuits, accelerating the lower production cost and compactness of the control circuit.

When the control circuit is physically separated from the motor body, the number of electric wires electorally connecting these two members is also an important factor in cost reduction. The conventional brushless motor shown in FIG. 45 needs nine electric wires for the three motors, while in the circuitry shown in FIG. 42, for the three motors, only 6 electric wires are in all needed which consist of three wires for the A-phase, B-phase, and C-phase, a common wire for the motor M1, a common wire for the motor M2 and a common wire for the motor M3.

When driving four or more motors, a control circuit portion dedicated to only motors being added is added to this circuitry as shown by an arrow R8K. Thus it is possible to increase the number of motors being driven, lowering production cost per motor.

Applications for the use of plural motors in a vehicle include attitude control of side mirrors, attitude control of a driver's seat, and control of wind for air conditioning. The side mirror control includes tilt control in the up-down direction, tilt control in the right-left direction, and control for folding the side mirror, so that 6 motors are needed in all for both of the right and left side mirrors. For the attitude control of a driver's seat, motors are used to control the seat in the front-back direction, its tilt angles, the seat in the up-down direction, its reclining attitude, and others. Recent seats are occasionally provided with massage functions which still need motors. In the control of wind for air conditioning, motors are used as a blowing motor to supply wind, a motor to select the outside air or the inside air, a motor to select the warm air and cool air, motors to select destinations to which the wind is blown, and others. In this way, many compact-size motors are used in the vehicle. The motor including the control circuit according to the present invention can be used in these applications, and can also be used as main machines to drive the vehicle itself. The motor system shown in FIG. 42 can drive two or more motors in parallel.

As above, the embodiments of the present invention has been described, but may be modified into various other forms and applications. For example, the widths of the stator and rotor salient poles in the circumferential direction CR may be selected into other values. The shape of each salient pole is not only a simple rectangular shown by the drawings, but also rounded shape or tapered shape. The poles can be asymmetric in the circumferential direction CR if it is desired to given different drive characteristics to a motor in both directions CCW and CW.

Concerning with types of rotors, other various forms may be possible, not limited to rotors having salient poles described mainly in the above. The present invention can also be applied to a flux barrier type of rotor having a flux barrier provided as elongated holes formed in the rotor or to an interior permanent magnet type of rotor in which various-shape permanent magnets are embedded.

Furthermore, the present invention can be applied to outer rotor motors, axial gap type of motors, liner motors, motors produced by combining various types of motors, and others.

As shown in FIG. 42, in cases where a plurality of motors are controlled, it is of course possible to use various types of motors in combination, in which DC motors can also be combined. The waveforms of currents and voltages to the motor windings may also be changed into various modifications, and may be superpose on one another. In the foregoing, a description has not been made about acquiring the rotor position information in the motor, but this acquisition can be developed to control that uses various types of encoders, detection of positions with no sensors, and detection of speed with no sensors. The control circuit can also be modified in various ways, in which there are various examples such that the control circuit is produced with or without the use of microprocessors, or using a one-chip circuit that contains a controller and a power section. Modified motors as above may be interpreted being within the scope of the present invention as long as the features of such modified motors belong to the gist of the present invention.

In the motor including the control circuit according to the present invention, the control circuit can be simplified in the configuration because of being driven on DC currents, whereby the motor can be made at lower production cost and compact in size. The motor has annular windings, enabling the motor to be produced easily. The winding shape is simple, obtaining a higher space factor of winding. In addition, as being the annular windings, the motor has no coil ends, being compact in size. As a result, the motor can be less production cost and made compact in size, so that the motor can be applied to various applications such as vehicles, home electric appliances, and various industrial devices.

What is claimed is:

1. An AC motor comprising:
   a stator having M pieces (M is an integer equal to or higher than 3) of stator pole groups SPG arranged in a rotor axial direction of the AC motor, each of the stator pole groups being composed of a plurality of stator poles arranged in a circumferential direction of the AC motor, the plurality of stator poles belonging to each of the stator pole groups arranged in the circumferential direction being assigned to each of phases of the AC motor;
   a back yoke mutually magnetically connects the stator pole groups;
   "M−1" pieces of annular slots SR each formed between two of the stator pole groups SPG;
   "M−1" pieces of annular windings WR each of which is arranged in each of the slots SR, wherein each of the annular windings is supplied with a one-way current; and
   current supply means for supplying the one-way current to each of the windings WR,
   wherein the current supply means comprises circuitry supply the one-way current such that
   i) the one-way current supplied through each of the windings WR is directed oppositely to each other in turn in the rotor axial direction, and
   ii) each of magnetic fluxes $\phi G$ induced by the stator pole groups SPG is directed in one way, and
   iii) the directions of the magnetic fluxes $\phi G$ are opposite to each other in turn in the rotor axial direction.

2. The AC motor of claim 1, wherein
   the number M of stator pole groups SPG is an even number which is 4 or more;
   the stator pole groups SPG are faced with a plurality of rotor pole groups RPG via an air gap, each of the rotor pole groups having K pieces of rotor poles arranged in a circumferential range of an electrical angle of 360 degrees in the circumferential direction, the number K being an even number which is 2 or more;
   the windings WR include first and second annular windings electrically connected in series with each other, but mutually opposite to each other in the circumferential direction, the first and second windings being located M/2 pieces of slots apart in the rotor axial direction; and
   each of the windings WR is supplied with the one-way current.

3. The AC motor of claim 1, wherein
   the number M of stator pole groups SPG is an even number which is 4 or more; and
   the stator pole groups SPG are faced with rotor pole groups RPG via an air gap, each of the rotor pole groups having K pieces of rotor poles arranged in a range defined by an electrical angle of 360 degrees in the circumferential direction, the number K being one.

4. The AC motor of claim 1, wherein
   the number M of stator pole groups SPG is an odd number which is 3 or more; and
   the stator pole groups SPG are faced with rotor pole groups RPG via an air gap, each of the rotor pole groups having K pieces of rotor poles arranged in a range defined by an electrical angle of 360 degrees in the circumferential direction, the number K being one.

5. The AC motor of claim 2, wherein one of the stator pole groups, which is located at one end of the stator in the rotor axial direction, is divided into two stator pole groups SPGA and SPGB, one of the stator pole groups, SPGB, being arranged at the other end in the rotor axial direction; and
   one of the annular windings WR is arranged in a slot produced at the stator by the divided stator pole group SPGB.

6. The AC motor of claim 1, wherein a permanent magnet is arranged between teeth of the stator pole groups, the teeth extending in the circumferential direction.

7. The AC motor of claim 1, wherein the stator pole groups SPG are faced with rotor pole groups RPG via an air gap, and a permanent magnet is arranged between salient poles of the rotor pole groups, the salient poles extending in the circumferential direction.

8. The AC motor of claim 1, wherein the M pieces of stator pole groups SPG include one stator pole group SPGC adjacent to anther stator pole group SPGD in the motor axial direction, a permanent magnet being arranged been the two stator pole groups mutually adjacent.

9. The AC motor of claim 1, wherein the stator pole groups SPG has teeth each having a permanent magnet.

10. The AC motor of claim 1, comprising:
    teeth ST2 provided at the stator pole groups SPG and formed to have permanent magnets; and
    teeth ST3 provided at the stator pole groups SPG so as to be arranged along a same circumference and formed to have no permanent magnets.

11. The AC motor of claim 1, comprising field windings WRF arranged parallel to the annular windings WR.

12. An AC motor apparatus comprising:
    an AC motor MM1 set forth in claim 1;
    an AC motor MM2 driven on DC currents, which is different from the AC motor Mm1; and
    power supply means ST that selectively supply voltage and current to the respective motors.

13. The AC motor of claim 1, wherein the annular windings includes an annular winding arranged outside the M pieces of stator poles in the rotor axial direction.

14. The AC motor of claim 1, wherein the current supply means comprise a circuit which supplies the same one-way current to the first and second annular windings.

15. The AC motor of claim 1, wherein the phase of the AC motor is three in number,
    the windings WR consist of three pairs of annular winding, each of the three pairs of annular windings being composed of the first and second annular windings and assigned to each of the three phases of the AC motor, and
    the current supply means comprises a circuit which supplies the same one-way current to each of the three pairs of annular windings.

16. The AC motor of claim 2, wherein the annular windings includes an annular winding arranged outside the M pieces of stator poles in the rotor axial direction.

17. The AC motor of claim 2, wherein the current supply means comprise a circuit which supplies the same one-way current to the first and second annular windings.

18. The AC motor of claim 2, wherein the phase of the AC motor is three in number,
- the windings WR consist of three pairs of annular winding, each of the three pairs of annular windings being composed of the first and second annular windings and assigned to each of the three phases of the AC motor, and
- the current supply means comprises a circuit which supplies the same one-way current to each of the three pairs of annular windings.

* * * * *